United States Patent
Suzuki

(10) Patent No.: US 8,051,254 B2
(45) Date of Patent: Nov. 1, 2011

(54) APPLICATION MIGRATION AND POWER CONSUMPTION OPTIMIZATION IN PARTITIONED COMPUTER SYSTEM

(75) Inventor: Tomohiko Suzuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 545 days.

(21) Appl. No.: 12/339,271

(22) Filed: Dec. 19, 2008

(65) Prior Publication Data

US 2010/0100696 A1  Apr. 22, 2010

(30) Foreign Application Priority Data

Oct. 20, 2008  (JP) ................................ 2008-269539

(51) Int. Cl.
| | |
|---|---|
| G06F 1/26 | (2006.01) |
| G06F 1/32 | (2006.01) |
| G06F 9/46 | (2006.01) |
| G06F 12/00 | (2006.01) |
| G06F 13/00 | (2006.01) |
| G06F 13/28 | (2006.01) |

(52) U.S. Cl. ........ 711/154; 711/112; 711/165; 711/173; 713/320; 718/104

(58) Field of Classification Search .................. 711/112, 711/154, 165, 173; 713/320; 718/104
See application file for complete search history.

(56) References Cited

U.S. PATENT DOCUMENTS

| | | | |
|---|---|---|---|
| 2003/0051104 A1* | 3/2003 | Riedel | 711/154 |
| 2004/0111596 A1* | 6/2004 | Rawson, III | 713/1 |
| 2007/0038819 A1 | 2/2007 | Miki et al. | |
| 2007/0079088 A1* | 4/2007 | Deguchi et al. | 711/162 |
| 2008/0065919 A1 | 3/2008 | Hatasaki et al. | |
| 2008/0098194 A1 | 4/2008 | Hashimoto et al. | |

FOREIGN PATENT DOCUMENTS

| | | |
|---|---|---|
| JP | 2007-47986 | 2/2007 |
| JP | 2007-310791 | 11/2007 |
| JP | 2008-102667 | 5/2008 |

* cited by examiner

*Primary Examiner* — Kevin Ellis
*Assistant Examiner* — Ryan Bertram
(74) *Attorney, Agent, or Firm* — Brundidge & Stanger, P.C.

(57) ABSTRACT

A storage device including a logical volume being a migration source of an application copies data stored in the logical volume being a migration source into a logical volume being a migration destination of the application. After such a copy process is started, the storage device stores the data written into the logical volume being a migration source as differential data without storing the data into the logical volume being a migration source. When the copy process is completed for the data stored in the logical volume being a migration source, a management computer starts copying of the differential data, and in a time interval after the copying of the data stored in the logical volume being a migration source is completed but before the copying of the differential data is completed, a computer being a migration destination of the application is turned ON. With such a logically-partitioned computer system, power consumption at the time of application migration can be reduced.

11 Claims, 32 Drawing Sheets

FIRST EXAMPLE OF PHYSICAL PARTITION

SECOND EXAMPLE OF PHYSICAL PARTITION

LOGICAL PARTITION

Partition MIGRATION OF APPLICATION (<APP>)

PARTITION-TO-PARTITION MIGRATION OF APPLICATION

INITIAL STATE

STATE IN WHICH LOGICAL VOLUME MIGRATION IS COMPLETED

STATE IN WHICH LOGICAL PATH MIGRATION IS COMPLETED

STATE IN WHICH VIRTUAL SERVER MIGRATION IS COMPLETED

Partition MIGRATION OF VIRTUAL
SERVER/LOGICAL PATH/LOGICAL VOLUME

THIRD EXAMPLE OF PHYSICAL PARTITION
(ONLY SERVER IS TURNED OFF)

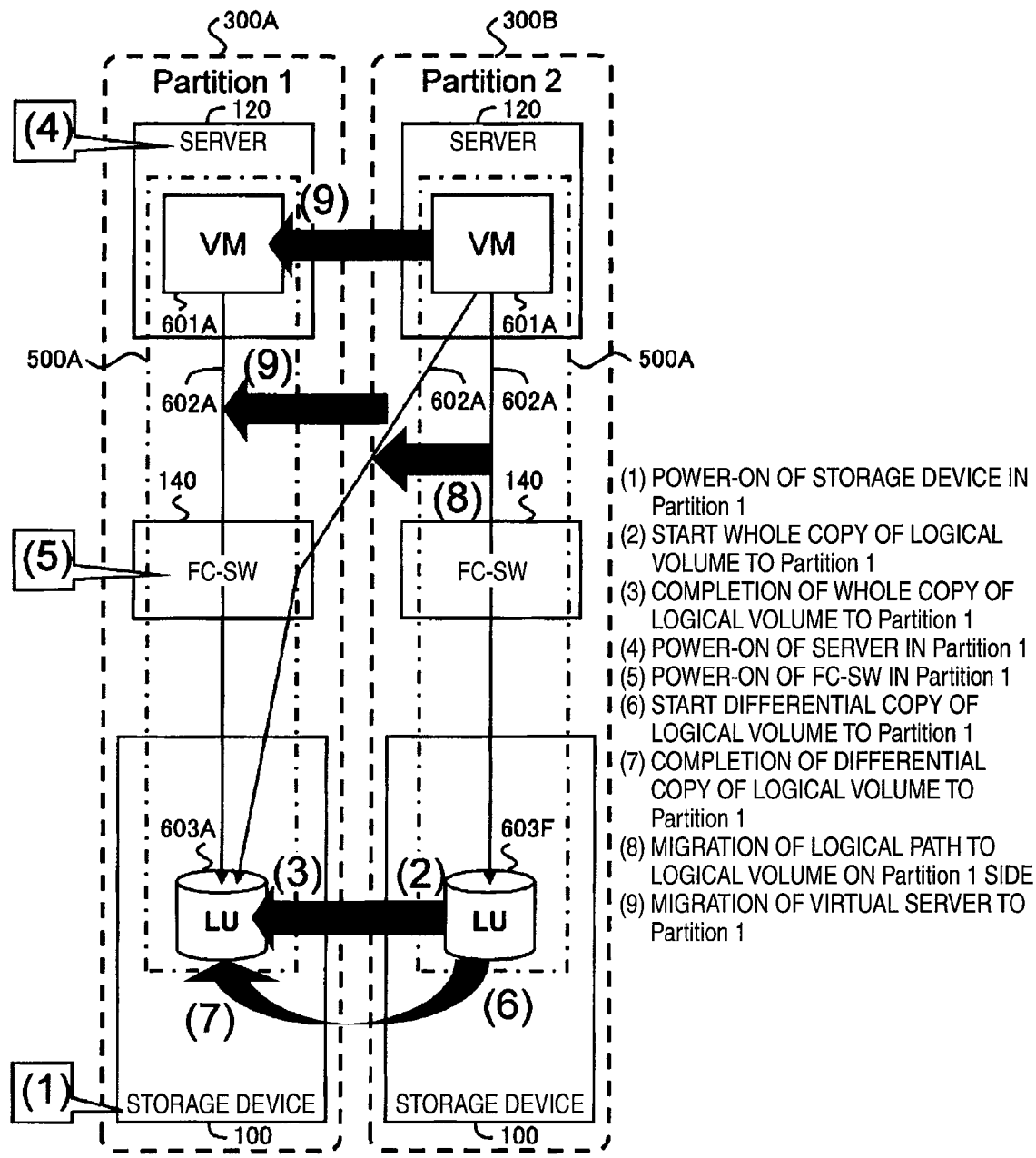

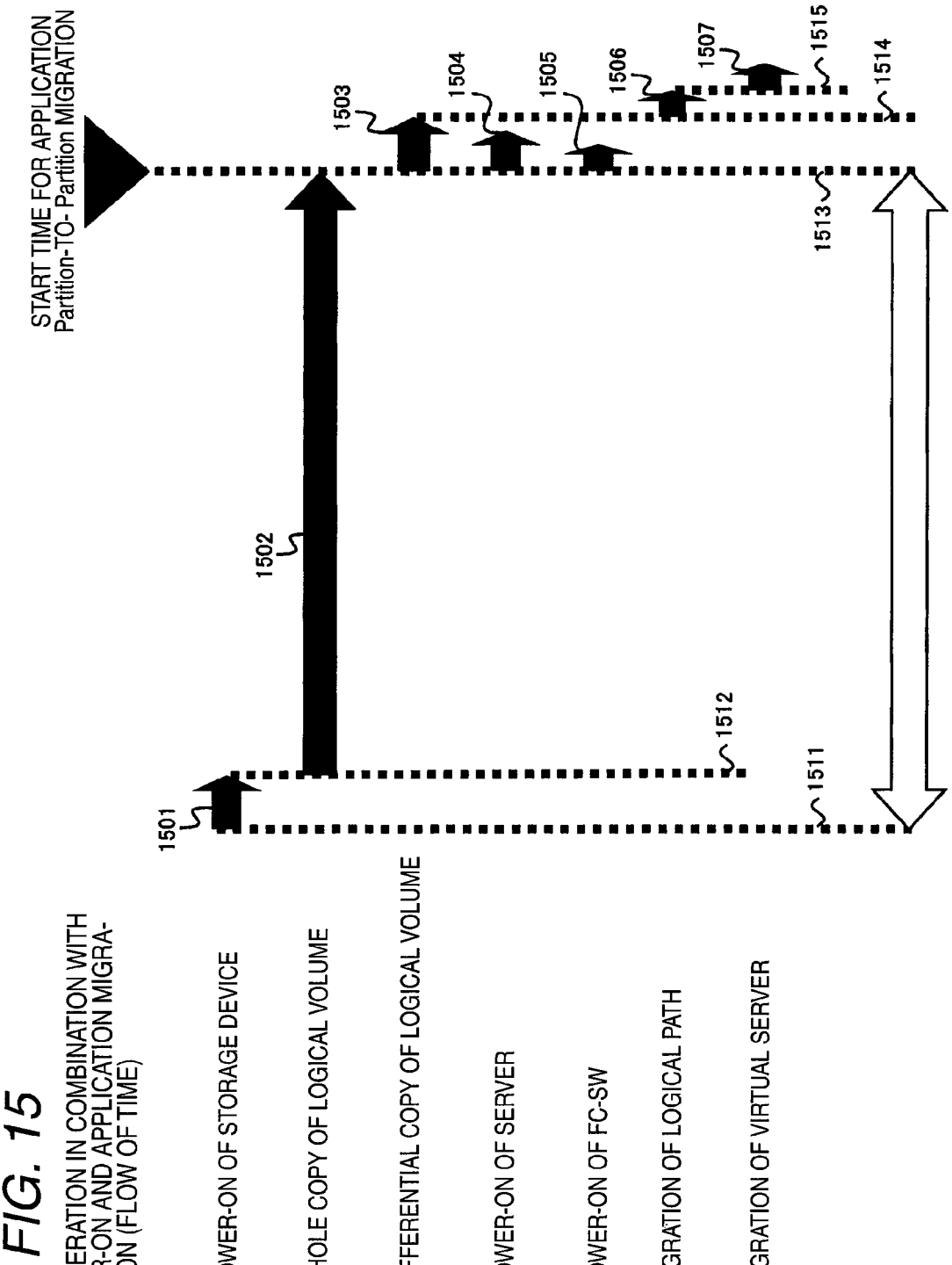

FIG. 16A
PARTITION MANAGEMENT TABLE 136A

| PARTITION NUMBER 1601 | HARDWARE TYPE 1602 | HARDWARE NAME 1603 | RESOURCE AMOUNT 1604 | REMAINING RESOURCE AMOUNT 1605 | POWER SUPPLY 1606 | LOCATED APP 1607 | APP RESOURCE AMOUNT 1608 |
|---|---|---|---|---|---|---|---|
| 1 | SERVER 1 | SERVER P1 | 10 | 10 | OFF | | |
|   | FC-SW1 | FC-SWP1 | 10 | 10 | OFF | | |
|   | STORAGE 1 | STORAGE P1 | 10 | 10 | OFF | | |
| 2 | SERVER 2 | SERVER P2 | 10 | 5 | ON | APP1 | 5 |
|   | FC-SW2 | FC-SWP2 | 10 | 9 | ON | APP1 | 1 |
|   | STORAGE 2 | STORAGE P2 | 10 | 4 | ON | APP1 | 6 |

FIG. 16B
APPLICATION MANAGEMENT TABLE 136B

| APPLICATION NAME 1621 | LOCATED Partition# 1622 | LOCATED SERVER NAME 1623 | LOCATED FC-SW NAME 1624 | LOCATED STORAGE NAME 1625 | SERVER RESOURCE AMOUNT 1626 | FC-SW RESOURCE AMOUNT 1627 | STORAGE RESOURCE AMOUNT 1628 |
|---|---|---|---|---|---|---|---|
| APP1 | 2 | | FC-SWP2 | | 5 | 1 | 6 |

Partition MIGRATION PROCESS FOR APPLICATION

STORAGE POWER-ON PROCESS

Partition MIGRATION OF LOGICAL VOLUME (WHOLE COPY)

WHOLE COPY OF LOGICAL VOLUME
(STORAGE-SIDE PROCESS)

- 2001 START OF WHOLE COPY OF LOGICAL VOLUME
- 2002 RESERVATION OF DIFFERENTIAL I/O STORAGE SPACE
- 2003 I/O CHANGE TO DIFFERENTIAL I/O STORAGE SPACE
- 2004 EXECUTION OF DIFFERENTIAL COPY
- 2005 COMPLETION OF WHOLE COPY OF LOGICAL VOLUME (TRANSMISSION OF END MESSAGE)

FC-SW POWER-ON PROCESS

Partition MIGRATION OF LOGICAL VOLUME
(DIFFERENTIAL COPY)

MIGRATION OF LOGICAL PATH

MIGRATION OF VIRTUAL SERVER

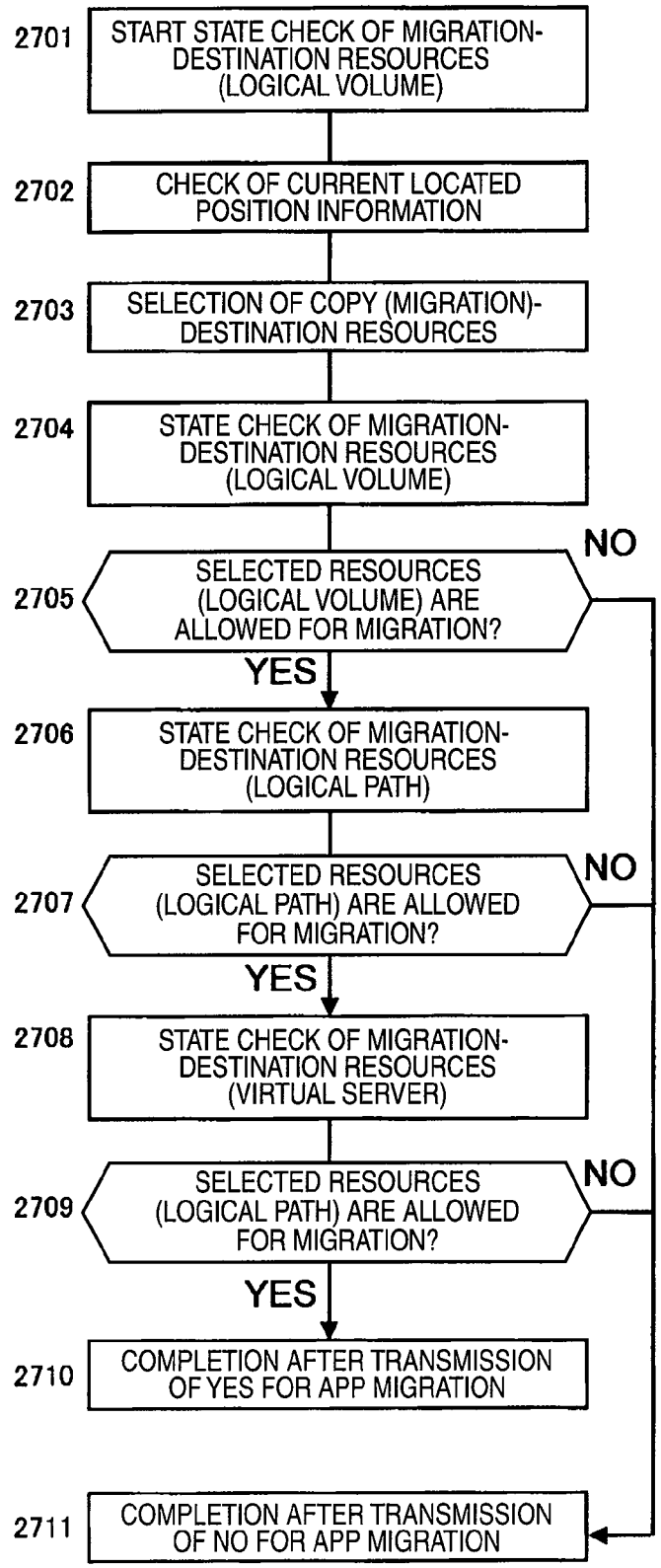

FIG. 28A
PARTITION MANAGEMENT TABLE 136A

| PARTITION NUMBER 1601 | HARDWARE TYPE 1602 | HARDWARE NAME 1603 | RESOURCE AMOUNT 1604 | REMAINING RESOURCE AMOUNT 1605 | POWER SUPPLY 1606 | LOCATED APP 1607 | APP RESOURCE AMOUNT 1608 |
|---|---|---|---|---|---|---|---|
| 1 | SERVER 1 | SERVER P1 | 10 | 5 | ON | APP1 | 5 |
|   | FC-SW1 | FC-SWP1 | 10 | 9 | ON | APP1 | 1 |
|   | STORAGE 1 | STORAGE P1 | 10 | 4 | ON | APP1 | 6 |
| 2 | SERVER 2 | SERVER P2 | 10 | 10 | OFF |   |   |
|   | FC-SW2 | FC-SWP2 | 10 | 10 | OFF |   |   |
|   | STORAGE 2 | STORAGE P2 | 10 | 10 | OFF |   |   |

FIG. 28B
APPLICATION MANAGEMENT TABLE 136B

| APPLICATION NAME 1621 | LOCATED Partition# 1622 | LOCATED SERVER NAME 1623 | LOCATED FC-SW NAME 1624 | LOCATED STORAGE NAME 1625 | SERVER RESOURCE AMOUNT 1626 | FC-SW RESOURCE AMOUNT 1627 | STORAGE RESOURCE AMOUNT 1628 |
|---|---|---|---|---|---|---|---|
| APP1 | 1 | SERVER P1 | FC-SWP1 | STORAGE P1 | 5 | 1 | 6 |

Partition MIGRATION PROCESS FOR APPLICATION
(DYNAMIC TIME SETTING OF SERVER POWER-ON AND FC-SW POWER-ON)

DIFFERENCE OF POWER-OFF STATE TIME BETWEEN
SERVER AND FC-SW DEPENDING ON SYSTEM SIZE

FOURTH EXAMPLE OF PHYSICAL PARTITION
(EXAMPLE OF DEFINING DATA CENTER AS ONE Partition)

FIFTH EXAMPLE OF PHYSICAL PARTITION
(EXAMPLE OF PARTITIONING DATA CENTER BY Tier AREA)

APPLICATION MIGRATION AND POWER CONSUMPTION OPTIMIZATION IN PARTITIONED COMPUTER SYSTEM

CROSS REFERENCES TO RELATED APPLICATIONS

This application relates to and claims priority from Japanese Patent Application No. 2008-269539, filed on Oct. 20, 2008, the entire disclosure of which is incorporated herein by reference.

BACKGROUND OF THE INVENTION

The present invention relates to resource management in a computer system and, more specifically, to application migration and power supply control in a partitioned computer system.

DESCRIPTION OF THE RELATED ART

Considering the recent tendency of asking information processing systems to be environmentally friendly, proposed is the technology for implementing the efficient use of resources and the reduction of power consumption by consolidating computers and storage devices by virtualization.

Patent Document 1 (JP-A-2007-47986) describes the technology for load sharing by optimally placing any virtualized servers, virtualized switches, and virtualized storage devices in physical servers, physical switches, and physical storage devices.

Patent Document 2 (JP-A-2007-310791) describes the technology for consolidating, in a computer system including a plurality of physical servers, virtual servers into a few of the physical servers, thereby cutting off the power supply to the remaining physical servers. In the resulting computer system, the power consumption can be accordingly reduced.

Patent Document 3 (JP-A-2008-102667) describes the technology for cutting off the power supply to any not-in-use virtual computers and corresponding virtual storage devices through management of the correlation between the virtual computers and the virtual storage devices used thereby. In the resulting computer system, the power consumption can be accordingly reduced.

SUMMARY OF THE INVENTION

In a computer system partitioned based on any predetermined policy for use, applications are required to be run in any desired partition at any desired time. There thus sometimes needs to migrate virtual servers and logical volumes from one partition to another. Such migration consumes power, and to reduce the power consumption at the time of such migration, there needs to appropriately control the timing of migration. The problem here is that there has been no such technology.

A typical aspect of the invention is directed to a computer system that includes: one or more computers; one or more storage devices to be connected to the one or more computers over a network; and a management computer to be connected to the one or more computers and the one or more storage devices. In the computer system, characteristically, the one or more computers each include, as hardware resources: a first interface to be connected to the network; a first processor to be connected to the first interface; a first memory to be connected to the first processor; and a power supply control section that controls power ON and OFF of the hardware resources in accordance with a request coming from the management computer. The one or more computers each further include a virtualization section that provides a plurality of virtual areas based on the hardware resources thereof, the plurality of virtual areas include first and second virtual areas, and the first virtual area operates as a virtual computer that runs an application program. The one or more storage devices each include: a storage medium that provides a storage area for storage of data written by any of the one or more computers; a controller that controls data input/output to/from the storage medium; and a second power supply control section that controls power ON and OFF of each of the one or more storage devices in accordance with a request coming from the management computer. The controller of each of the one or more storage devices provides, to the one or more computers, the storage area of the one or more storage devices as a plurality of logical volumes, the plurality of logical volumes include first and second logical volumes, and the first logical volume stores data written by the virtual computer. The management computer includes: a second interface to be connected to the one or more computers and the one or more storage devices; a second processor to be connected to the second interface; and a second memory to be connected to the second processor. The management computer transmits, to any of the one or more storage devices including the first logical volume, a request for copying the data stored in the first logical volume into the second logical volume. The storage device including the first logical volume stores, when receiving a request for writing data to the first logical volume from the virtual computer after receiving the request for copying the data stored in the first logical volume into the second logical volume, the data requested for writing as differential data without writing the data into the first logical volume, and reads the data stored in the first logical volume in accordance with the request for copying the data stored in the first logical volume into the second logical volume, and transmits the data to any of the one or more storage devices including the second logical volume. The management computer transmits, when detecting completion of the copying of the data stored in the first logical volume into the second logical volume, a request to the storage device including the first logical volume for copying the differential data in storage into the second logical volume, transmits, in a time interval after detecting the completion of the copying of the data stored in the first logical volume into the second logical volume but before completion of the copying of the differential data into the second logical volume, a request for turning ON any of the hardware resources of the one or more computers allocated to the second virtual area to the computer including the hardware resources allocated to the second virtual area, and transmits, after the completion of the copying of the differential data into the second logical volume, a request for migrating the virtual computer to the second virtual area. The virtual computer performs, after being migrated to the second virtual area, data input/output to/from the second logical volume.

According to the aspect of the invention, the power to be consumed at the time of application migration can be favorably reduced through control of the timing of turning ON the resources at the time of application migration.

BRIEF DESCRIPTION OF THE DRAWINGS

FIG. 14 is a diagram illustrating application migration and power supply control to be performed in the embodiment of the invention;

FIG. 15 is a diagram illustrating a timing of application migration and power supply control to be performed in the embodiment of the invention;

FIGS. 16A and 16B are each a diagram illustrating a management table in the embodiment of the invention;

FIG. 27 is a flowchart of a migration-destination partition state check process to be executed in the embodiment of the invention;

FIGS. 28A and 28B are each a diagram illustrating the management table after application migration in the embodiment of the invention;

DESCRIPTION OF THE PREFERRED EMBODIMENT

An embodiment of the invention is described in detail by referring to the accompanying drawings.

Figure 1:
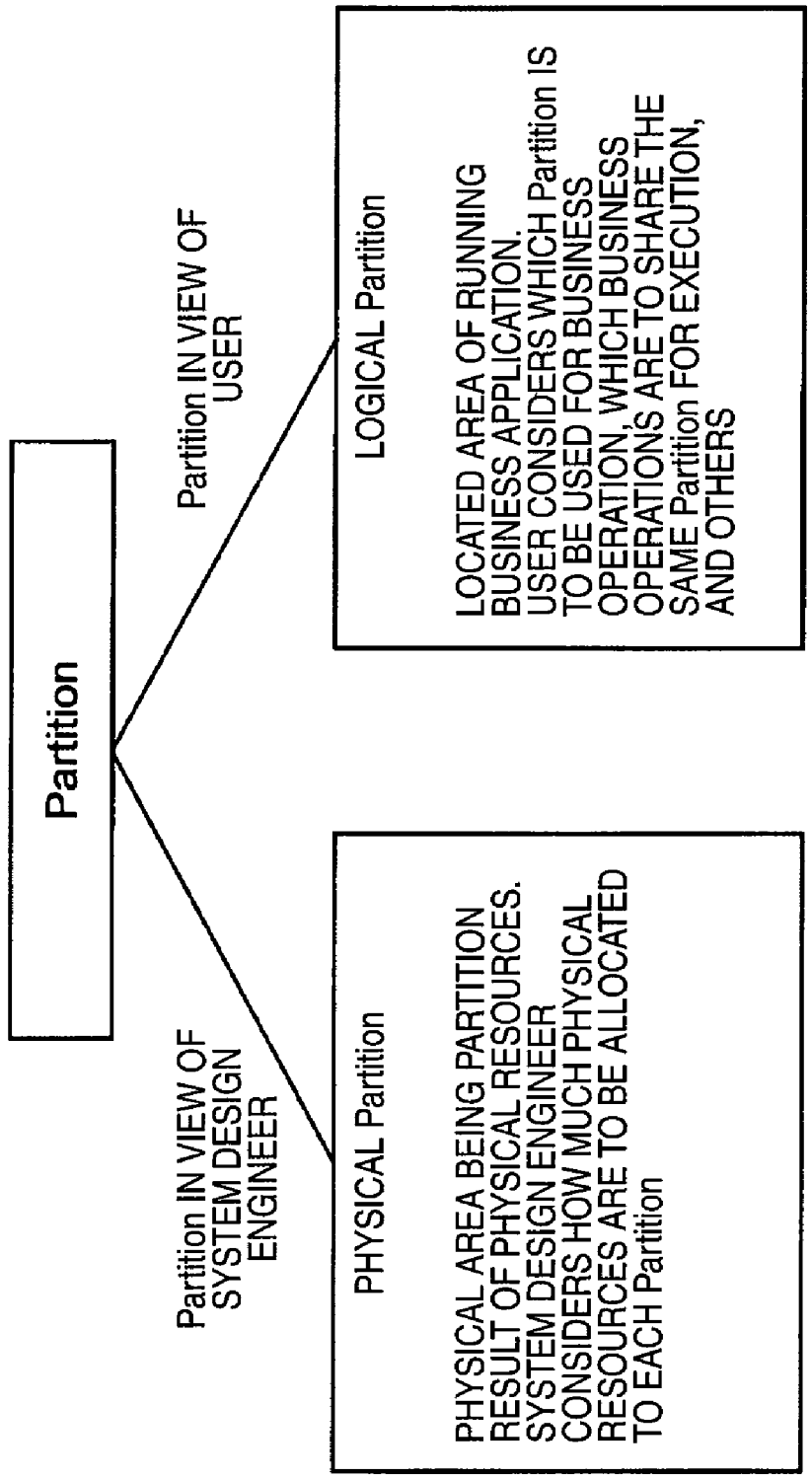
FIG. 1 is a diagram illustrating a partition in an embodiment of the invention.

FIG. 1 is a diagram illustrating a partition in the embodiment of the invention.

The term of "partition" means an area being a defined result of partitioning an information system based on a user's business application type and a policy for use of the information system. The partitions are each acknowledged as a physical partition from a system design engineer, and as a logical partition from a user.

The physical partition means a physical area being a defined result of partitioning any physical resources. The system design engineer is allowed to determine the amount of physical resources for allocation to each partition. The amount of physical resources includes the number of cores of a CPU (Central Processing Unit), the capacity of a storage area of a memory, the zone size of a switch device configuring a network, the capacity of a storage area of a storage device, and others.

The logical partition means an area where a business application (application) is located. The user is allowed to determine which partition will be used for the application running, and a combination of a plurality of applications for the running in a partition.

Figure 2:
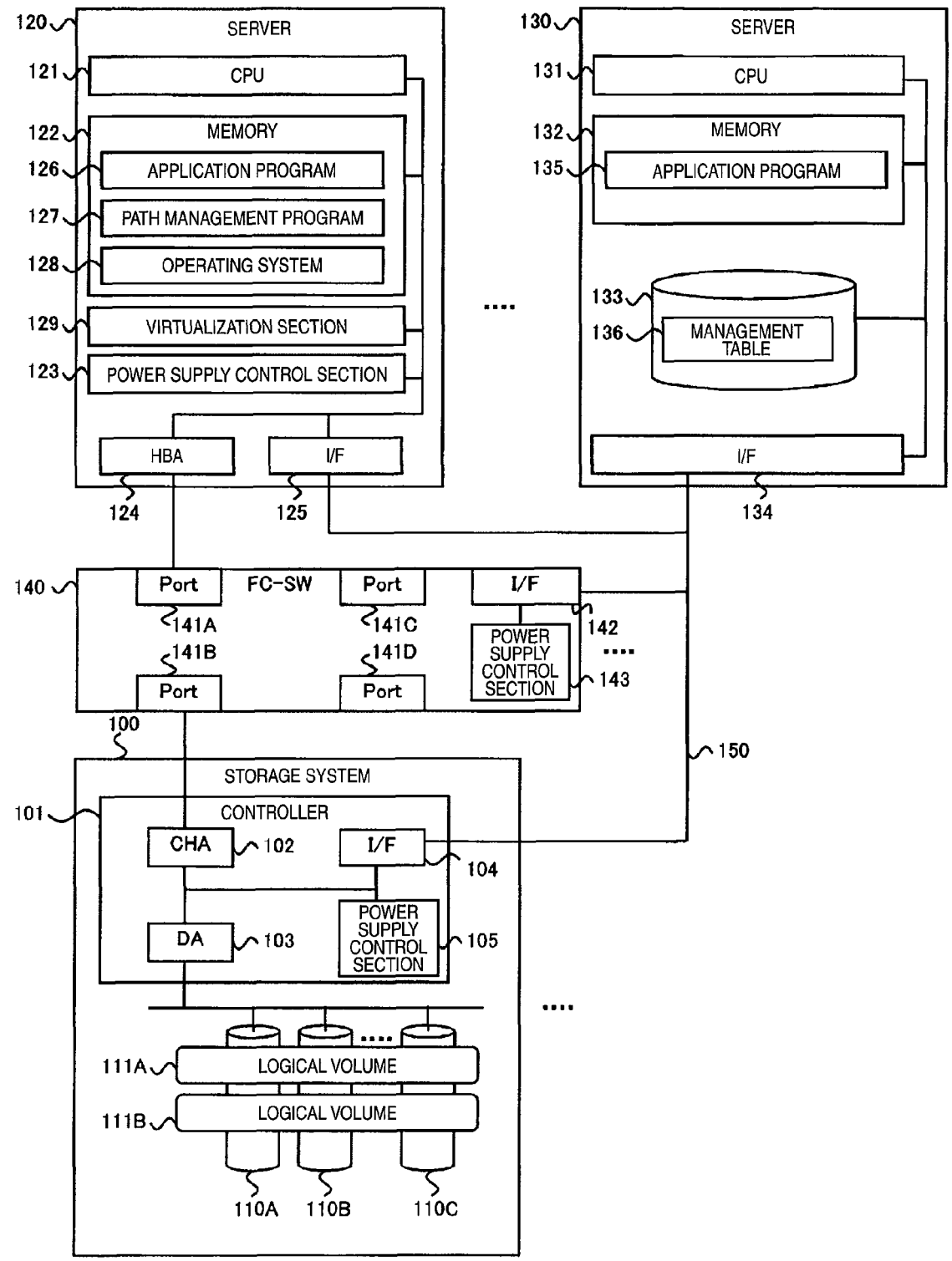
FIG. 2 is a block diagram showing the configuration of a computer system in the embodiment of the invention.

FIG. 2 is a block diagram showing the configuration of a computer system in the embodiment of the invention.

The computer system of the embodiment is configured to include one or more storage devices 100, one or more servers 120, one or more fiber channel switches (FC-SW) 140, a management server 130, and a management network 150.

The storage device 100 stores data written by the server 120. To be specific, the storage device 100 is provided with disk drives 110A to 110C, and a controller 101.

The disk drives 110A to 110C are each a memory device including a memory medium for storing data written by the server 120. In the below, the disk drives 110A to 110C are sometimes collectively referred to as disk drives 110 when no distinction thereamong is needed.

FIG. 2 shows three of the disk drives 110, but this is surely not restrictive, and the number of the disk drives 110 is not restrictive in the storage device 100. Alternatively, a plurality of disk drives 110 may configure a RAID (Redundant Arrays of Inexpensive Disks).

The disk drives 110 in the embodiment are each a hard disk drive including a magnetic disk serving as a memory medium. This is surely not restrictive, and any type of device may be used as an alternative thereto. For example, the disk drives 110 may be each replaced by a nonvolatile semiconductor memory device such as flash memory.

The controller 101 controls data writing to the disk drives 110, and data reading from the disk drives 110. The controller 101 is configured to include a channel adaptor (CHA) 102, a disk adaptor (DA) 103, an interface (I/F) 104, and a power supply control section 105, which are connected to one another.

The CHA 102 is connected to any one port in the FC-SW 140, e.g., port 141B, and processes a data input/output (I/O) request from the server 120, i.e., a data write request and a data read request.

The DA 103 is connected to the disk drives 110, and controls data writing/reading to/from the disk drives 110.

The CHA 102 and the DA 103 may respectively include a CPU (not shown) for execution of any requested process, and a local memory (not shown).

The I/F 104 is connected to the management network 150, and communicates with the management server 130 over the management network 150.

The power supply control section 105 controls power ON and OFF of the storage device 100, i.e., controls start and stop of the power supply to the storage device 100. More in detail, the power supply control section 105 controls the power supply to the components in the storage device 100 other than the power supply control section 105. Such control is performed in accordance with control information provided by the management server 130 via the I/F 104. Alternatively, the power supply control section 105 may perform such control over the power supply on a resource portion basis in the storage device 100, e.g., on the basis of the disk drive 110. Such a power supply control section 105 may be implemented by a so-called Baseboard Management controller (BMC), for example.

The controller 101 may further include a shared memory (not shown), and a cache memory (not shown). The shared memory stores therein various types of control information. The cache memory stores therein, on a temporary basis, data for writing into the disk drives 110, and data read from the disk drives 110.

The controller 101 manages a physical storage area as a plurality of logical volumes 111. The physical storage area is the one implemented by a memory medium of the disk drive 110. Logical volumes 111A and 111B of FIG. 2 are each a part of the logical volumes 111. The controller 101 can manage any arbitrary number of logical volumes 111.

The computer system of this embodiment may include a plurality of storage devices 100.

The server 120 is a computer configured to include a CPU 121, a memory 122, a power supply control section 123, a host bus adaptor (HBA) 124, an I/F 125, and a virtualization section 129, which are connected to one another.

The CPU 121 is a processor that serves to run a program stored in the memory 122. FIG. 2 shows only one CPU 121, but the server 120 may include a plurality of CPUs 121.

The memory 122 stores therein a program to be run by the CPU 121, and data to be referred to by the CPU 121. The memory 122 of this embodiment stores therein, at least, an operating system (OS) 128, a path management program 127, and an application program 126.

The OS 128 is basic software for management use of the server(s) 120, e.g., Windows™, or Unix™. As will be described later, a plurality of OSs 128 may be run on the server(s) 120. If this is the case, the OSs 128 may be of a type or not.

The path management program 127 controls access paths from the server(s) 120 to the logical volumes 111.

The application program 126 implements various types of business applications (applications). A user of the server 120 can install, to the server 120, and run any of the application programs 126 that can implement his or her desired application. The application program 126 issues a data I/O request to the logical volumes 111 if needed.

Such software programs (programs) are each run by the CPU 121. Accordingly, the processes to be executed by the above-described software programs (programs) in the below are actually executed by the CPU 121.

The virtualization section 129 provides a plurality of virtual areas, i.e., virtual computers, using resources of the one or more servers 120 in the computer system, i.e., the CPU(s) 121, the memory(ies) 122, and others. The virtualization section 129 is allowed to make one server 120 to run a plurality of Oss 128. Alternatively, the virtualization section 129 is allowed to implement so-called clustering, i.e., a plurality of servers 120 are used as a single virtual computer.

Such a virtualization section 129 may be a hardware resource mounted in the server 120, or may be a program stored in the memory 122, e.g., so-called virtual machine monitor or virtualization software such as hypervisor. When the virtualization section 129 is a program stored in the memory 122, the virtualization section 129 is functioned by the CPU 121 running the virtualization software.

The HBA 124 is an interface communicating with the storage device 100 through connection to any of the ports in the FC-SW 140, e.g., port 141A.

The I/F 125 is connected with the management network 150, and communicates with the management server 130 over the management network 150.

The power supply control section1 123 controls the power supply of the server 120. To be specific, the power supply control section 123 controls power ON and OFF of the server 120 in accordance with control information provided by the management server 130 via the I/F 125. The power supply control section 123 may be of a type similar to the power supply control section 105. The power control section 123 may control power ON and OFF on a resource portion basis in the server 120, e.g., when the server 120 includes a plurality of CPUs 121, on the basis of the CPU 121.

The CPU 121 runs the application program 126, and if needed, forwards requests to the storage device 100 via the HBA 124. The requests here are those for data writing and reading to/from the logical volumes 111. The destination of such requests, in other words, the logical path for use with data I/O of these requests, is controlled by the path management program 127.

The computer system of this embodiment may include a plurality of servers 120.

The FC-SW 140 configures a network for relaying data I/O between the server 120 and the storage device 100. The FC-SW 140 can change a data I/O path between the server 120 and the storage device 100. In this embodiment, the data I/O between the serve 120 and the storage device 100 is exchanged based on the fiber channel (FC) protocol.

The FC-SW 140 is configured to include a plurality of ports 141, e.g., ports 141A to 141D in FIG. 2 example, an I/F 142, and a power supply control section 143.

The ports are each connected to the HBA 124 of the server 120, or to the CHA 102 of the storage device 100.

The FC-SW 140 can set a data communications path between the server 120 and the storage device 100 through connection settings among the ports 141. The FC-SW 140 can also set so-called zones which are each independent.

The I/F 142 is connected to the management network 150, and communicates with the management server 130 over the management network 150.

The power supply control section 143 controls the power supply of the FC-SW 140. To be specific, the power supply control section 143 controls power ON and OFF of the FC- SW 143 in accordance with control information provided by the management server 130 via the I/F 142. The power supply control section 143 may be of a type similar to the power supply control section 105. The power supply control section 143 may perform such control over power ON and OFF on a resource portion basis in the FC-SW 140, e.g., on the basis of the port 141.

The computer system of the embodiment may include a plurality of FC-SWs 140.

The management server 130 is a computer configured to include a CPU 131, a memory 132, a database 133, and an I/F 134, which are connected to one another.

The CPU 131 is a processor that runs a program stored in the memory 132.

The memory 132 stores therein a program to be run by the CPU 131, and data to be referred to by the CPU 131. The memory 132 of the embodiment stores therein at least a management program 135.

The database 133 stores therein information for management use of the computer system. The database 133 may be stored in a disk drive connected to (or equipped) in the management server 130.

The database 133 of this embodiment stores therein a management table 136. If needed, the management table 136 may be entirely or partially copied into the memory 132, and may be referred to by the CPU 131. The contents of the management table 136 will be described later (refer to FIGS. 16A and 16B).

The I/F 134 is connected to the management network 150, and communicates with the components, i.e., the storage device 100, the server 120, and the FC-SW 140, over the management network 150. For example, a signal for use to control the power supplies of the components, i.e., the storage device 100, the server 120, and the FC-SW 140, is provided by the I/F 134 over the management network 150.

The management network 150 may be of any type. Typically, the management network 150 is an IP (Internet Protocol) network such as so-called LAN (Local Area Network). If this is the case, the I/Fs 104, 125, and 134 may be each a so-called network interface card.

Figure 3:
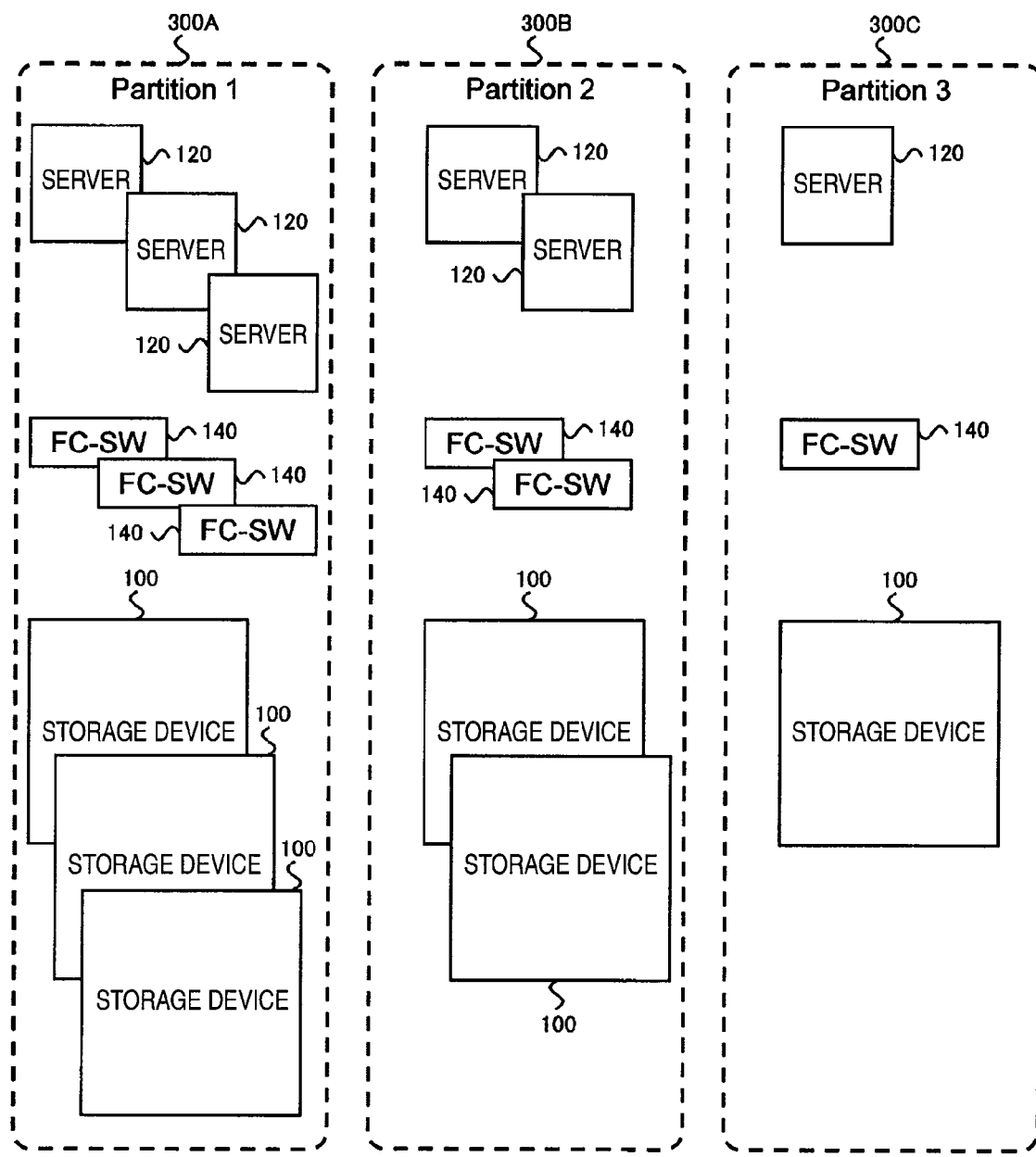
FIG. 3 is a diagram illustrating a first example of a physical partition in the embodiment of the invention.

FIG. 3 is a diagram illustrating a first example of the physical partition in the embodiment of the invention.

FIG. 3 shows an example in which three physical partitions, i.e., partitions 1_300A, 2_300B, and 3_300C, are defined. In this example, the partitions each include one or more servers 120, one or more FC-SWs 140, and one or more storage devices 100.

To be specific, the partition 1_300A includes three servers 120, three FC-SWs 140, and three storage devices 100. These three servers 120 form a cluster implemented by the virtualization section 129.

Similarly, the partition 2_300B includes two servers 120, two FC-SWs 140, and two storage devices 100. These two servers 120 form a cluster implemented by the virtualization section 129.

The partition 3_300C includes one server 120, one FC-SW 140, and one storage device 100.

Note that, FIG. 3 shows no connection among the server(s) 120, the FC-SW(s) 140, and the storage device(s) 100.

In the one or more servers 120 in each of the partitions, the OS 128 is run on the partition basis, and on the OS 128, the application program 126 is run also on the partition basis. The application program 126 to be run on the partition basis as such performs data I/O to/from any logical volume in the one or more storage devices 100 in the partition via the one or more FC-SWs 140 therein.

Figure 4:
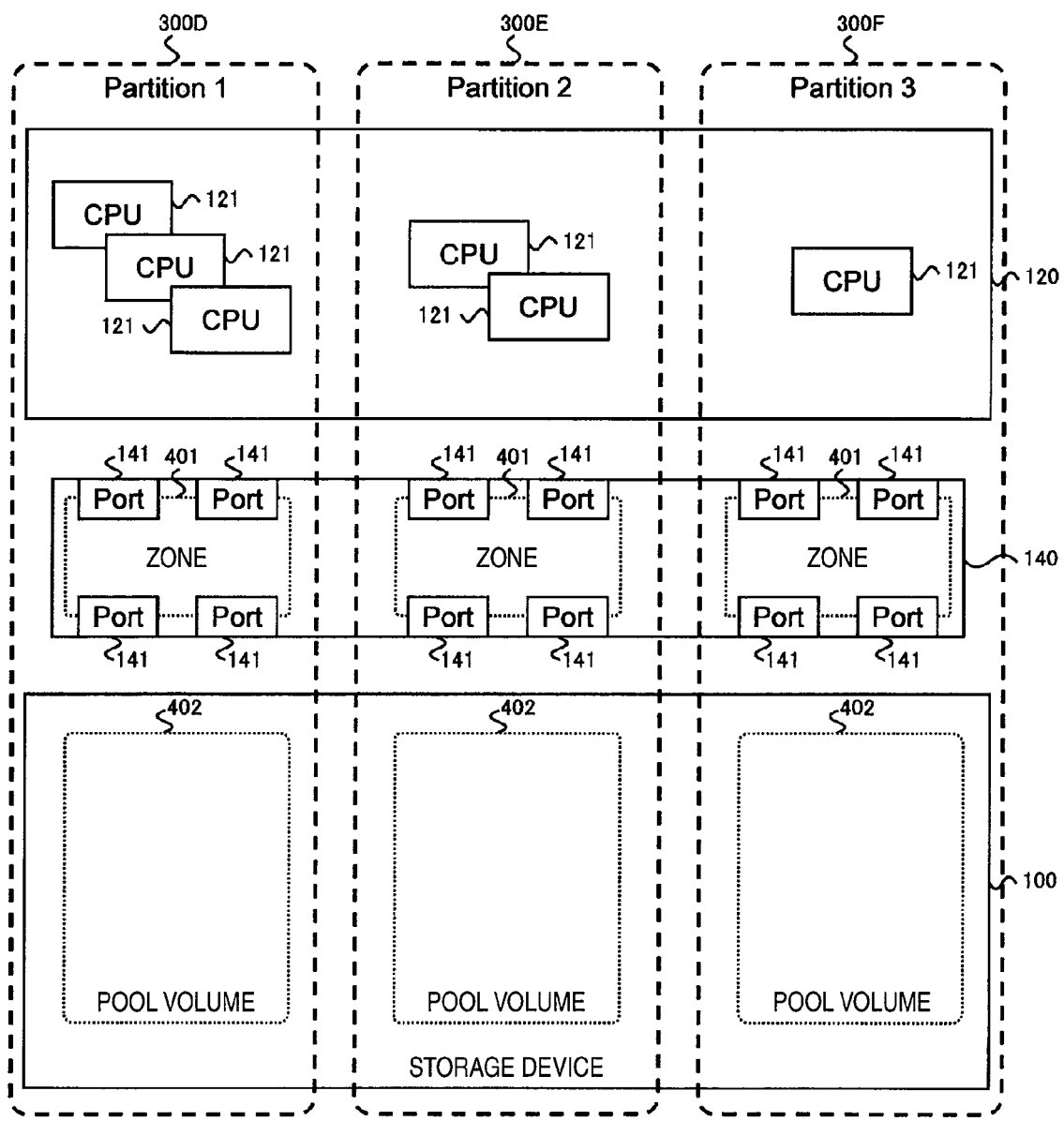
FIG. 4 is a diagram illustrating a second example of the physical partition in the embodiment of the invention.

FIG. 4 is a diagram illustrating a second example of the physical partition in the embodiment of the invention.

FIG. 4 shows an example in which three physical partitions, i.e., partitions 1_300D, 2_300E, and 3_300F, are defined in a computer system including one server 120, one FC-SW 140, and one storage device 100.

To be specific, the server 120 of FIG. 4 is provided with six of the CPUs 121, and three thereof are allocated to the partition 1_300D, two thereof are allocated to the partition 2_300E, and one thereof is allocated to the partition 3_300F.

The FC-SW 140 of FIG. 4 is provided with twelve of the ports 141, and four thereof are allocated to the partition 1_300D, four out of the remaining eight are allocated to the partition 2_300E, and the remaining four are allocated to the partition 3_300F. The four ports 141 allocated to each of the partitions as such form a zone 401.

As to the storage area provided by the storage device 100 of FIG. 4, a part thereof, e.g., partially a volume pool 402, is allocated to the partition 1_300D, another part of the volume pool 402 is allocated to the partition 2_300E, and the remaining part of the volume pool 402 is allocated to the partition 3_300F. Note here that the volume pool 402 denotes a management unit of the storage area configured by one or more logical volumes 111.

In such an example, in one or more CPUs 121 allocated to each of the partitions, the OS 128 is run on the partition basis, and on the OS 128, the application program 126 is also run on the partition basis. The application program to be run on the partition basis as such performs data I/O to/from the storage area allocated to the partition.

As described above, the partition may be defined by coupling the resources of a plurality of devices (refer to FIG. 3), or may be defined by dividing the resources of a device (refer to FIG. 4). In either case, the system design engineer acknowledges the partitions as physical partitions as the results of partitioning any physical resources.

Figure 5:
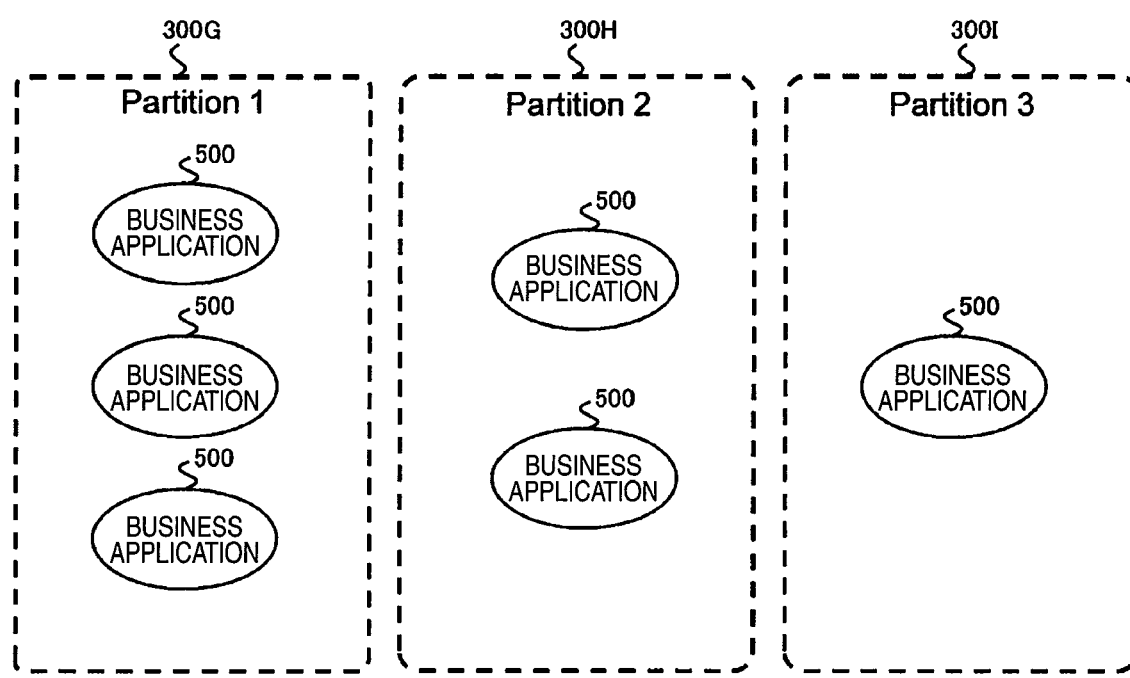
FIG. 5 is a diagram illustrating an exemplary logical partition in the embodiment of the invention.

FIG. 5 is a diagram illustrating an exemplary logical partition in the embodiment of the invention.

A user of the computer system acknowledges a partition as an area where his or her running business application is located. In the description below, the "business application" is referred to as "application". For example, the partitions of FIG. 3, i.e., the partitions 1_300A, the partition 2_300B, and the partition 3_300C, may be acknowledged by the user respectively as logical partitions, i.e., a partition 1_300G, a partition 2_300H, and a partition 3_300I. Alternatively, the partitions of FIG. 4, i.e., the partition 1_300D, the partition 2_300E, and the partition 3_300F, may be acknowledged by the user respectively as logical partitions, i.e., the partition 1_300G, the partition 2_300H, and the partition 3_300I.

In FIG. 5 example, three business applications (applications) 500 are run in the partition 1_300G, two applications 500 are run in the partition 2_300H, and one application 500 is run in the partition 3_300I.

Figure 6:
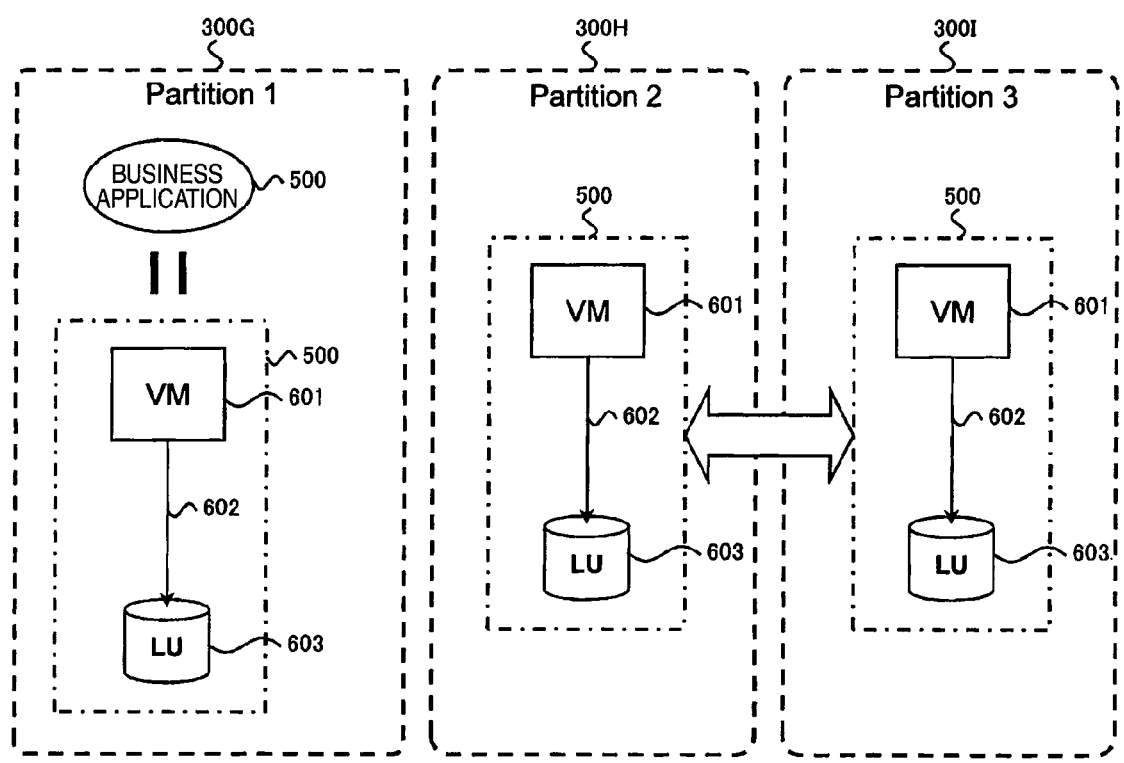
FIG. 6 is a diagram illustrating the configuration of an application in the embodiment of the invention.

FIG. 6 is a diagram illustrating the configuration of the application 500 in the embodiment of the invention.

The application 500 of FIG. 5 is configured by, as shown in FIG. 6, a virtual server (VM) 601, a logical path 602, and a logical volume (LU) 603.

The virtual server 601 is a virtual computer implemented by the virtualization section 129.

The logical path 602 is used by the virtual server 601 to access the logical volume 603. The logical path 602 is implemented by any physical path reaching the storage device 100 from the HBA 124 via the FC-SW 140.

The logical volume 603 is a logical storage area provided by the storage device 100 to the virtual server 601. The virtual server 601 acknowledges one logical volume 603 as one storage device. For example, one logical volume 111 may be provided as one logical volume 603, or a plurality of logical volumes 111 may be provided as one logical volume 603. Alternatively, when a request comes for data writing to the storage area of the logical volume 603, the storage area may be allocated with the storage area of the logical volume 111.

The OS 128 is run on the virtual server 601, and on the OS 128, the application program 126 is run. The application program 126 performs data I/O to/from the logical volume 603 via the logical path 602, thereby implementing the application 500.

The applications 500 are each allowed to migrate from one partition to another. Such migration of the applications 500 will be described later.

Figure 7:
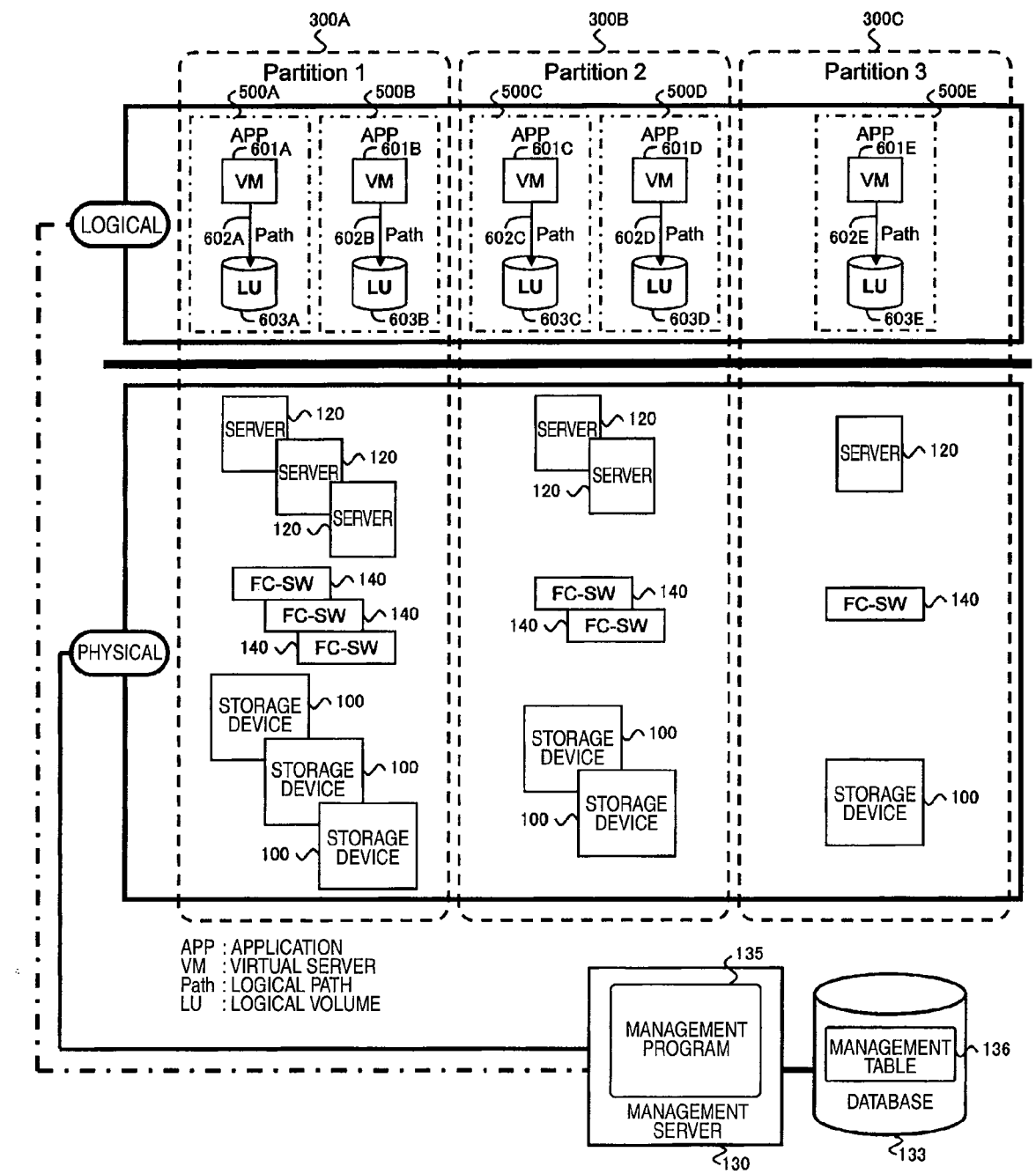
FIG. 7 is a diagram illustrating the system configuration in its entirety in the embodiment of the invention.

FIG. 7 is a diagram illustrating the system configuration in its entirety in the embodiment of the invention.

The partitions of FIG. 7, i.e., the partitions 1_300A, 2_300B, and 3_300C, are acknowledged by a system manager as physical partitions similar to those of FIG. 3.

On the other hand, a user acknowledges the partitions 1_300A, 2_300B, and 3_300C as logical partitions. In the partition 1_300A, two applications (APP) 500, i.e., applications 500A and 500B, are located, and in partition 2_300B, two applications 500, i.e., applications 500C and 500D, are located. In the partition 3_300C, one application, i.e., application 500E, is located.

The components configuring the application 500A, i.e., the virtual server 601, the logical path 602, and the logical volume 603, are referred to as virtual server 601A, logical path 602A, and logical volume 603A, respectively. Similarly, the application 500B is configured by a virtual server 601B, a logical path 602B, and a logical volume 603B. The application 500C is configured by a virtual server 601C, a logical path 602C, and a logical volume 603C. The application 500D is configured by a virtual server 601D, a logical path 602D, and a logical volume 603D. The application 500E is configured by a virtual server 601E, a logical path 602E, and a logical volume 603E.

In the description below, the applications 500A to 500E are collectively referred to as applications 500 when no distinction thereamong is needed. The virtual servers 601A to 601E are collectively referred to as virtual servers 601 when no distinction thereamong is needed. The logical paths 602A to 602E are collectively referred to as logical paths 602 when no distinction thereamong is needed. The logical volumes 603A to 603E are collectively referred to as logical volumes 603 when no distinction thereamong is needed.

The management program 135 of the management server 130 manages the partitions. To be specific, the management server 130 manages the components in each of the partitions, i.e., the server 120, the FC-SW 140, and the storage device 100, through connection thereto over the management network 150.

The management program 135 also manages allocation of hardware resources to the partitions, and locating of the applications 500 in the partitions. For example, the management program 135 can control migration of the applications 500 from one partition to another, to be specific, migration of the logical volumes 603, change of the logical paths 602, and migration of the virtual servers 601.

Described now is the migration of the applications 500 from one partition to another in the embodiment.

The management program 135 is allowed to migrate the applications 500 from one partition to another. Such application migration is performed for various types of purposes, e.g., for reduction of power consumption, or for load sharing.

To be specific, when the applications 500A to 500E of FIG. 7 are hardly used at nighttime, for example, the applications 500 may be controllably migrated, e.g., the applications 500A to 500E may be located in a partition at nighttime and scattered among a plurality of partitions at daytime. For example, the applications 500 may be located as shown in FIG. 7 at daytime, e.g., from 8:00 to 0:00 next day, and the applications 500A to 500E may be all located in the partition 3_300C at nighttime, e.g., 0:00 to 8:00.

In this case, the management program 135 takes charge of the process of migrating the applications 500A and 500B from the partition 1_300A to 3_300C at 0:00, and the process of migrating the applications 500C and 500D from the partition 2_300B to 3_300C also at 0:00. Thereafter, the partitions 1_300A and 2_300B are both turned OFF, i.e., cut off the power supply to the physical resources allocated to these partitions, thereby favorably reducing the power consumption of the computer system.

The management program 135 then takes charge of the process of migrating the applications 500A and 500B from the partition 3_300C to 1_300A at 8:00, and the process of migrating the applications 500C and 500D from the partition 3_300C to 2_300B also at 8:00. After the application migration at 0:00, when the partitions each being the migration destination are being turned OFF, there needs to turn on the partitions before application migration at 8:00 is started.

Figure 8:
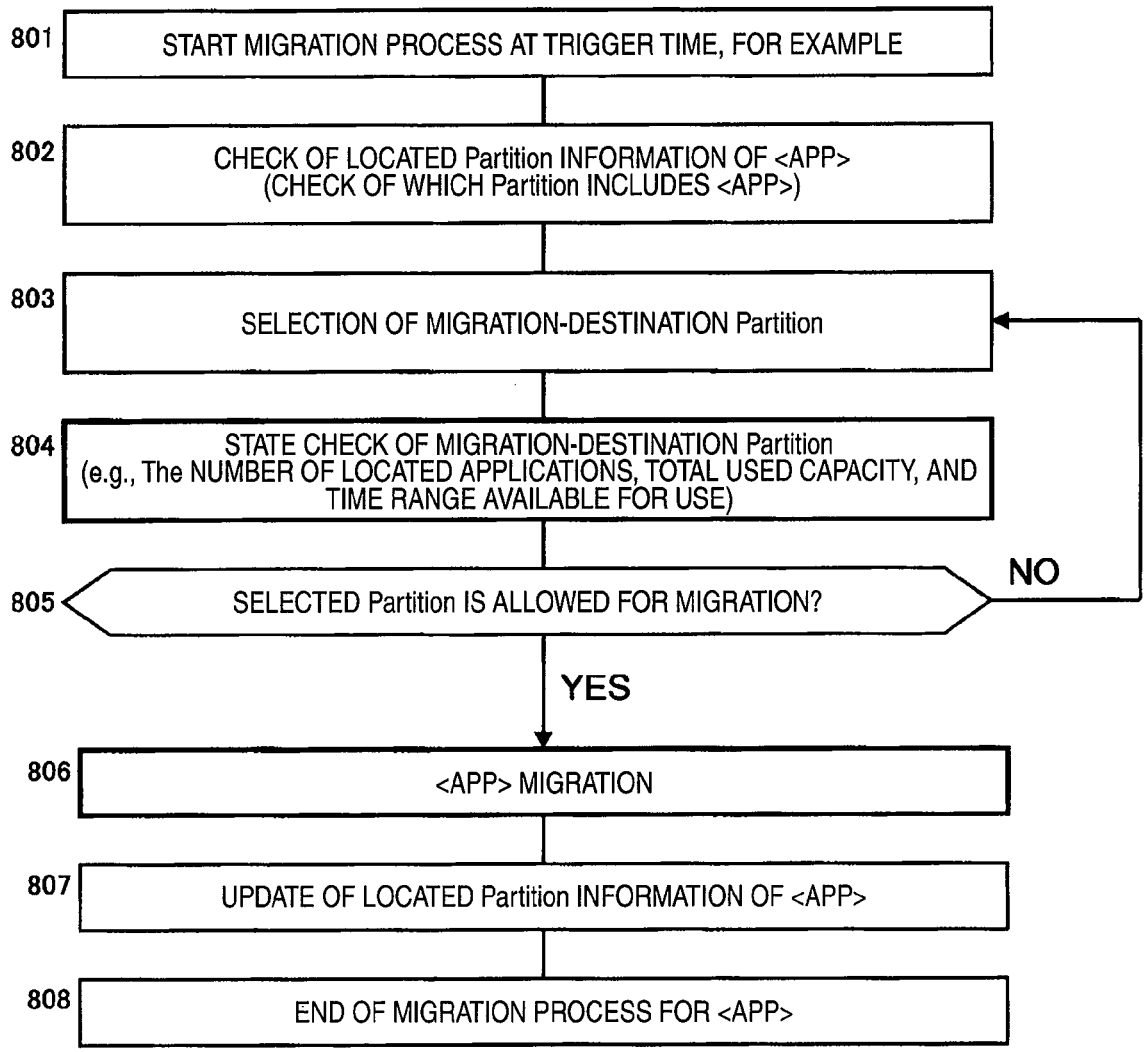
FIG. 8 is a flowchart of a partition-to-partition application migration process to be executed in the embodiment of the invention.
Figure 9A:
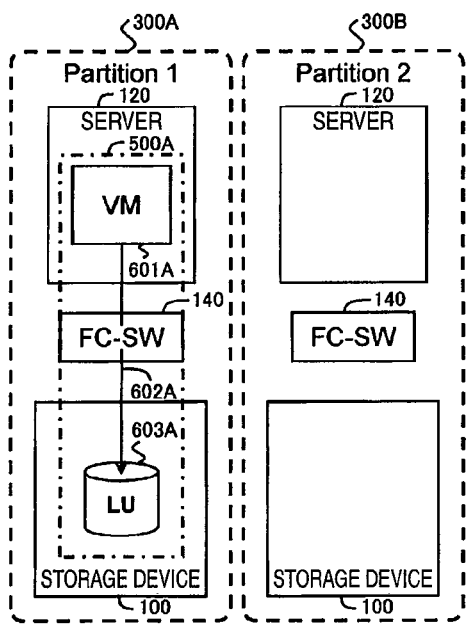
FIG. 9 is a diagram illustrating the detailed procedure of the partition-to-partition application migration process to be executed in the embodiment of the invention.
Figure 9B:
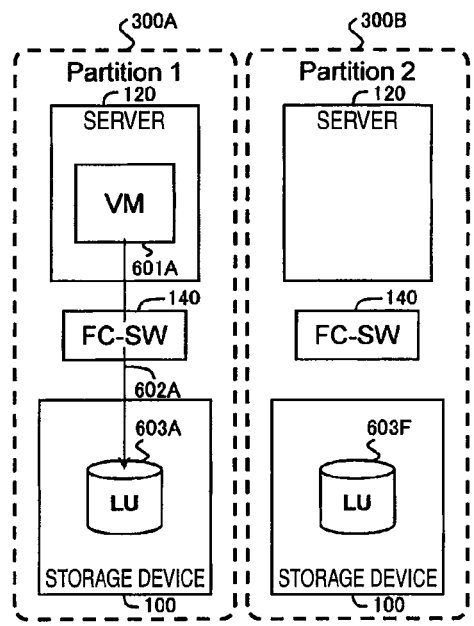
Figure 9C:
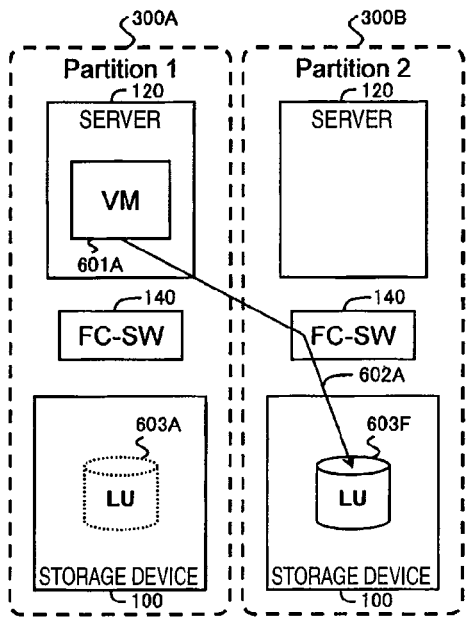
Figure 9D:
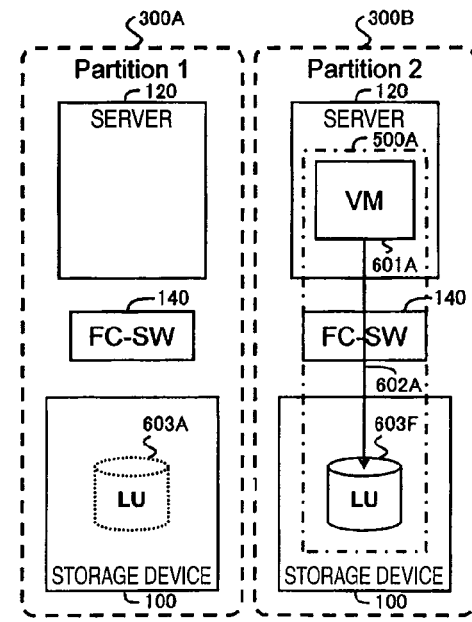

FIG. 8 is a flowchart of a partition-to-partition migration process for the application 500 to be performed in the embodiment of the invention.

The management program 135 starts the migration process for the application 500 at any specific time being a trigger, for example (step 801). In FIG. 7 example above, the migration process may be started at 0:00 and 8:00, for example. Alternatively, the migration process may be started at the time being the result of subtracting the time needed for the end process from 0:00 and 8:00. If this is the case, the migration process is ended at 0:00 and 8:00.

The management program 135 then checks in which partition the application 500 being a migration target is currently located (step 802). For such checking, the management table 136 that will be described later is referred to.

The management program 135 then selects any of the partitions as a migration destination (step 803). When the partition being a migration destination is already determined as in FIG. 7 example, the partition may be selected. When there are a plurality of partitions that can be selected as a migration destination, any one of those may be selected.

The management program 135 then checks the state of the partition selected as a migration destination (step 804). To be specific, the management program 135 refers to information about the number of the applications 500 already located in the partition selected as a migration destination, the capacity of the logical volume(s) 603 being already used by the application(s) 500, and a time range in which the partition is available for use, for example. The process executed in step 804 will be described in more detail later by referring to FIG. 27.

The management program 135 then determines whether the application 500 can be migrated to the selected partition based on the information referred to in step 804 (step 805). For reference in step 804 and for determination in step 805, the management table 136 is referred to.

In step 805, when the determination result tells that no migration is allowed for the application 500 to the selected partition, the procedure returns to step 803, and the management program 135 selects another partition as a migration destination. Note here that when the determination result tells that no application migration is allowed to all of the partitions that can be selected, the management program 135 may end the process of FIG. 8 without performing migration of the application 500.

In step 805, when the determination result tells that migration is allowed for the application 500 to the selected partition, the management program 135 performs the migration of the application 500 (step 806). This migration will be described in detail later by referring to FIGS. 9 and 10.

The management program 135 then updates information about the location of the application 500 to reflect the migration in step 806 (step 807). This information is specifically the one included in the management table 136. This update will be described in detail later by referring to the management table 136.

This is the end of the migration process for the application 500 (step 808).

FIG. 9 is a diagram illustrating the detailed procedure of the partition-to-partition migration process for the application 500 to be performed in the embodiment of the invention.

FIG. 9 shows, as an example, in the computer system of FIG. 7, the procedure of moving the application 500A from the partition 1_300A to the partition 2_300B. Herein, for the sake of simplicity, any not-necessary component is not shown.

In FIG. 9, A shows the initial state, i.e., the state before migration of the application 500A. In this state, the virtual server 601A is operating in the server 120 in the partition 1_300A. The logical volume 603A is managed by the storage device 100 in the partition 1_300A. The logical path 602A that is used by the virtual server 601A to access the logical volume 603A goes via the FC-SW 140 in the partition 1_300A.

In such a state, when migration of the application 500A is started, first of all, migration of the logical volume 603A is accordingly started. To be specific, a replica of the logical volume 603A is created in the storage device 100 in the partition 2_300B.

In FIG. 9, B shows the state after completion of the migration of the logical volume 603A. A logical volume 603F in B of FIG. 9 is the replica of the logical volume 603A. For creating such a replica, executed is a process of reading every data stored in the logical volume 603A, and copying the data into the logical volume 603F. In the state of B of FIG. 9, such data copying is completed but the virtual server 601A remains to access the logical volume 603A, and thus the logical volume 603F is not yet used.

Thereafter, migration of the logical path 602A is performed. To be specific, the logical path 602A is changed in setting to be able to access the logical volume 603F by going via the FC-SW 140 in the partition 2_300B. This setting change may be made by the path management program 127 of the server 120 in the partition 1_300A newly acknowledging the logical volume 603F as the logical volume 603A, and by a transmission destination of a data I/O request to the logical volume 603A being changed from the port 141 of the FC-SW 140 in the partition 1_300A to the port 141 of the FC-SW 140 in the partition 2_300B.

In FIG. 9, C shows the state after completion of the migration of the logical path 602A. In this state, the logical path 602A is so set that the virtual server 601A in the partition 1_300A can access the logical volume 603F by going via the FC-SW 140 in the partition 2_300B.

Thereafter, performed is migration of the virtual server 601A. This migration is performed by copying an image of the memory 122 of the server 120 in the partition 1_300A into the memory 122 of the server 120 in the partition 2_300B, for example. Such migration may be implemented by the function of the virtualization section 129.

In FIG. 9, D shows the state after completion of the migration of the virtual server 601A. In this state, the virtual server 601A having been migrated to the server 120 in the partition 2_300B can perform data I/O to/from the logical volume 603F, i.e., new logical volume 603A, using the logical path 602A going via the FC-SW 140 in the partition 2_300B. This accordingly migrates the application 500A to the partition 2_300B.

As will be described later, the migration of the logical volume 603A can be performed without stopping the operation of the application 500A. On the other hand, for migration of the logical path 602A and the virtual server 601A, there needs to stop the operation of the application 500A. However, the time required for such operation stop is sufficiently short so that the application 500A can be migrated without impairing user convenience.

Figure 10:
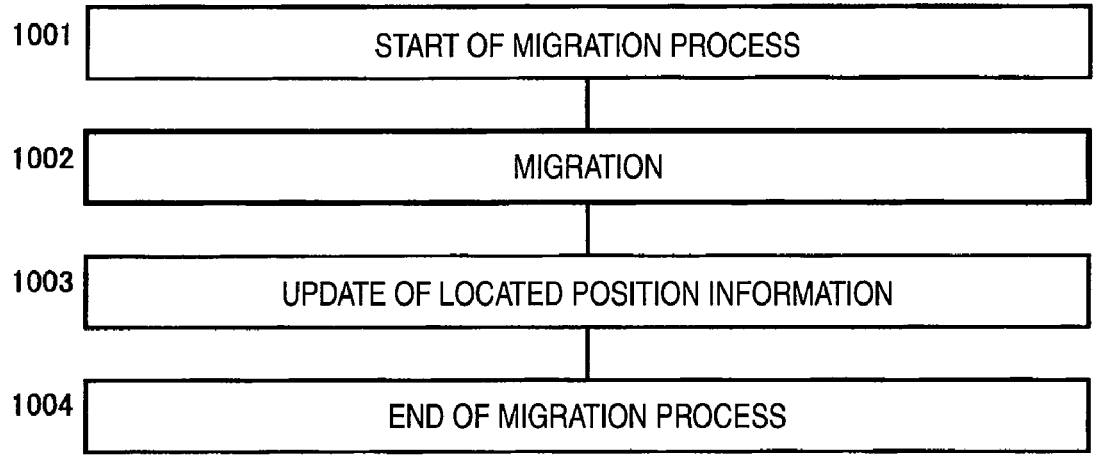
FIG. 10 is a detailed flowchart of the partition-to-partition application migration process to be executed in the embodiment of the invention.

FIG. 10 is a flowchart showing the detailed procedure of the partition-to-partition migration process for the application 500 to be executed in the embodiment of the invention.

The migration process of FIG. 10 is started in step 806 of FIG. 8 (step 1001). That is, when the process is started, the partition being a migration destination is already selected. Information for use to identify the selected partition is provided as an argument.

The management program 135 then starts migrating the application 500 to the selected partition (step 1002). To be specific, as shown in FIG. 9, the management program 135 first migrates the logical volume 603, then the logical path 602, and lastly the virtual server 601. The process of step 1002 will be described in detail later by referring to FIG. 17 and others.

The management program 135 then updates the management table 136 to reflect the migration result (step 1003).

This is the end of the migration process of FIG. 10 (step 1004). Thereafter, the procedure returns to the flowchart of FIG. 8, and the process of step 807 and onwards is repeated.

Described next is the detailed procedure for migration of the logical volume 603.

Figure 11:
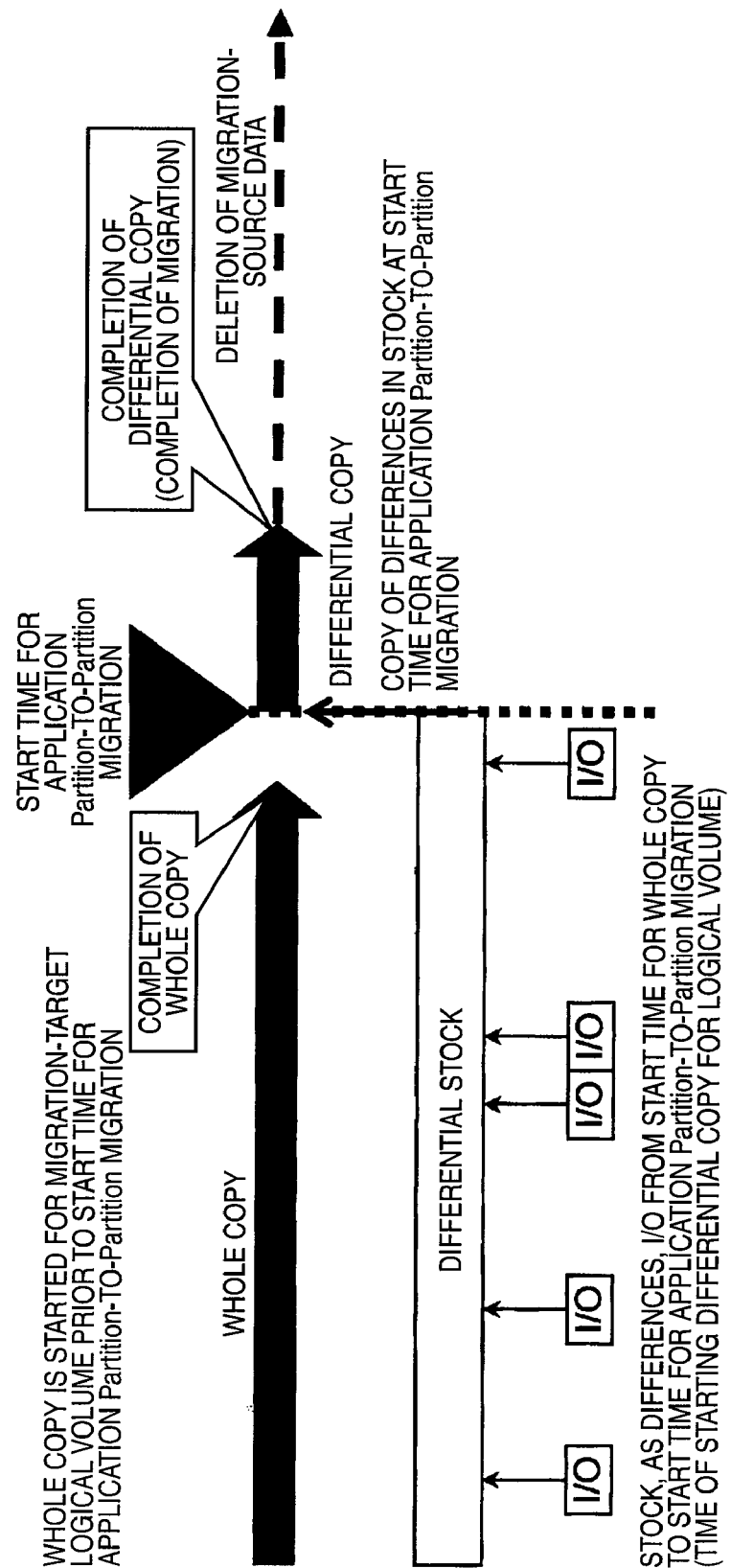
FIG. 11 is a diagram illustrating logical volume migration to be performed in the embodiment of the invention.

FIG. 11 is a diagram illustrating migration of the logical volume 603 to be performed in the embodiment of the invention.

As described above, migration of the logical volume 603 is performed without stopping the operation of the application 500. Accordingly, there may be a case where, until data copying started for migration of the logical volume 603 is completed, data I/O may be started to/from the logical volume currently on the move. In this embodiment, the data I/O after the data copying is started is not reflected to the logical volume 603 but is stored as a differential stock. After completion of copying of data entirely in the logical volume 603, the data I/O having been stored as a differential stock is reflected to the logical volume 603 being a copy destination.

As an example, as shown in FIG. 9, described is a case where the data in the logical volume 603A is copied into the logical volume 603F. Upon reception of a request for data writing into the logical volume 603A after data copying is started, the controller 101 of the storage device 100 stores the data as a differential stock without writing it into the logical volume 603A or 603F. This differential stock may be stored in any of the logical volumes 111 in the storage device 100, for example.

After completion of copying of the entire data stored in the logical volume 603A into the logical volume 603F (hereinafter, such copying is referred to as full copy), the data having been stored as a differential stock is then written into the logical volume 603F. Such writing of data stored as a differential stock into a copy destination is hereinafter referred to as differential copy.

Such full copy and differential copy are controlled by the controller 101. Alternatively, the full copy and the differential copy may be implemented by a control processor (not shown) in the controller 101 running an I/O control program (not shown) stored in a control memory (not shown), for example.

In this embodiment, in response to completion of a process of full copy, the server 120 and the FC-SW 140 are both turned ON. This is aimed to reduce the power consumption in the computer system. The timing control over power ON will be described in detail later (refer to FIGS. 14, 15, and others).

Note that, in the storage device of a previous type, the full copy and the differential copy are both dealt with as a single copy process, and thus any device located outside of the storage device, e.g., management server, had no way of knowing the timing when only the full copy is completed. Therefore, no control has been allowed to perform with a correlation between the completion of the full copy process (or the start of the differential copy process) and any other processes. On the other hand, in this embodiment, for favorably implementing the control as above, the storage device 100 may forward a message of completion of the full copy process to the management server 130 (refer to FIG. 20 that will be described later), or the management server 130 may calculate the end time of the full copy process.

Figure 12:
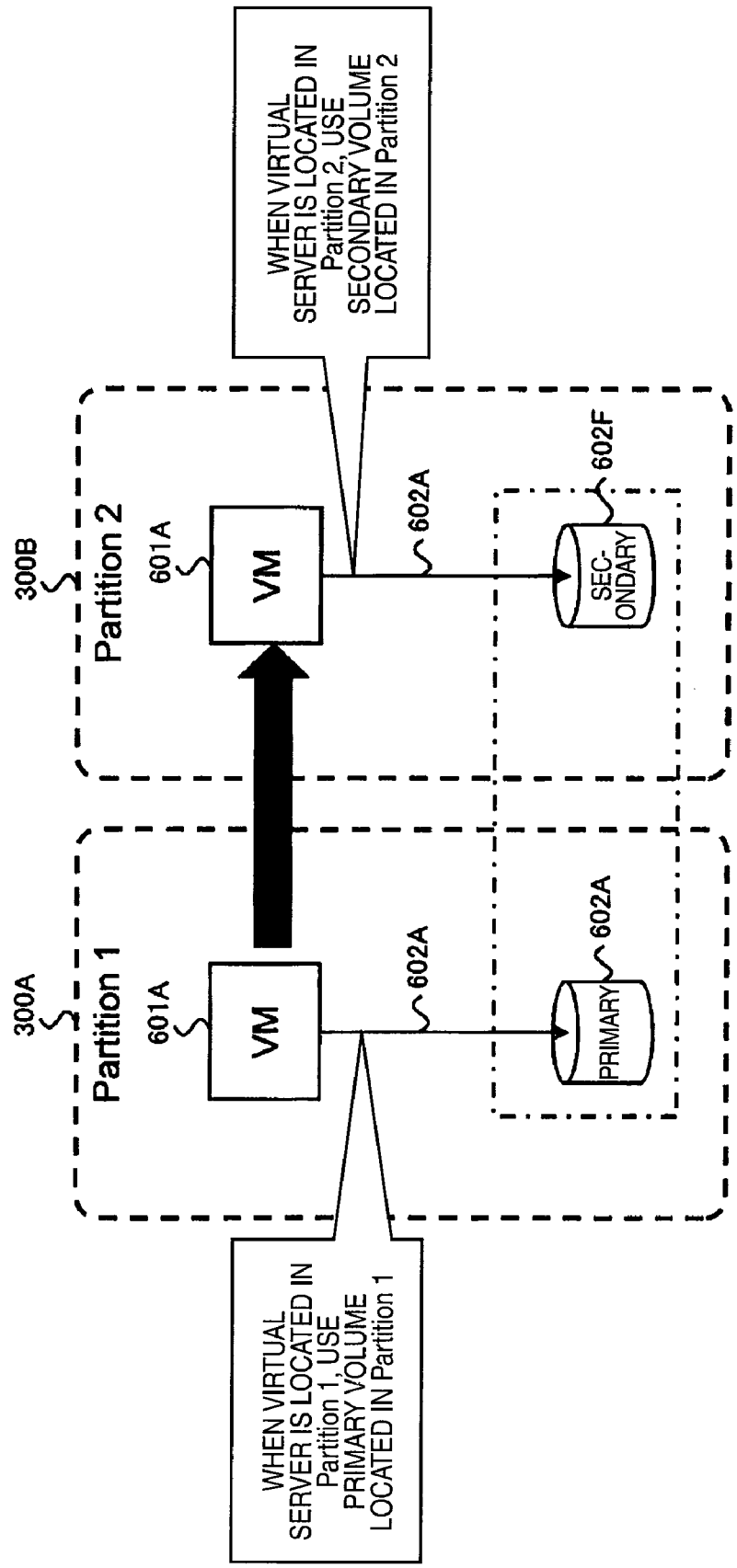
FIG. 12 is a diagram illustrating another exemplary logical volume migration to be performed in the embodiment of the invention.

FIG. 12 is a diagram illustrating another exemplary migration of the logical volume 603 to be performed in the embodiment of the invention.

When the storage device 100 is provided with a volume copy function, i.e., so-called remote copy function or local copy function, the logical volume 603 can be migrated using the volume copy function.

Assuming that when a volume pair is configured by the logical volume 603A being a primary volume and the logical volume 603F being a secondary volume, updating of the data stored in the logical volume 603A is reflected also to the logical volume 603F.

When the setting is so made that updating of the logical volume 603A is immediately reflected to the logical volume 603F, the logical volume 603F stores almost always the same data as in the logical volume 603A. Accordingly, the time needed for migration of the logical volume 603A for migration of the application 500A as in FIG. 9 is almost 0.

On the other hand, there may be a case where the setting is so made that updating of the logical volume 603A is not immediately reflected to the logical volume 603F. Alternatively, the setting may be so made that such updating is reflected at regular time intervals or reflected when the traffic amount of a data transfer path between the logical volumes 603A and 603F is smaller than a threshold value. If this is the case, during migration of the logical volume 603A for migration of the application 500A as in FIG. 9, only data of the logical volume 603A updated after reflection as above, i.e., differential data, is copied.

When the application 500A is located in the partition 1_300A, the logical volume 603A is used, and when the application 500A is located in the partition 2_300B, the logical volume 603F is used.

As described above, by using the volume copy function, the logical volume 603 can be migrated in a shorter time compared with the case of performing the full copy and the differential copy as in FIG. 11.

Figure 13:
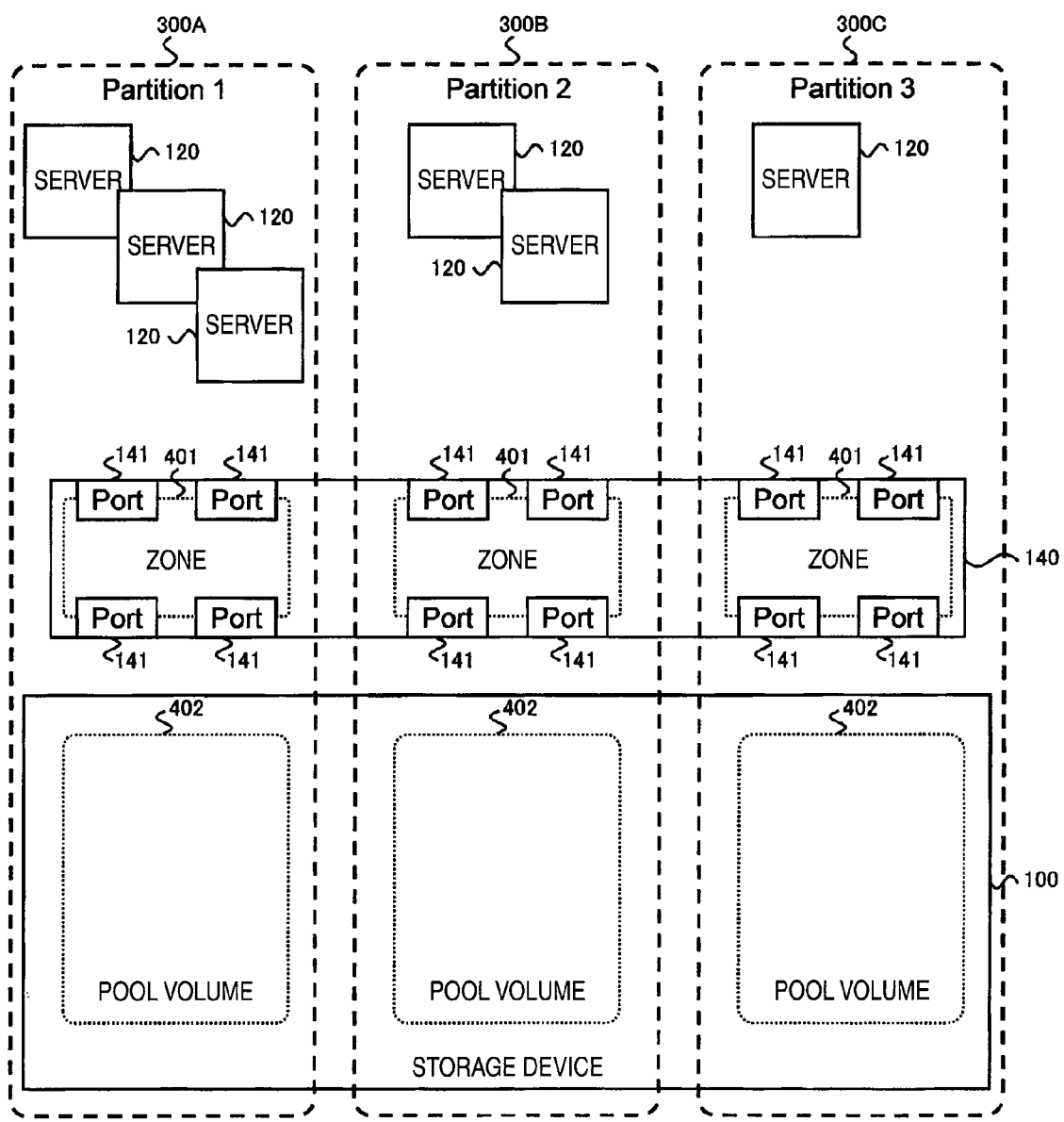
FIG. 13 is a diagram illustrating a third example of the physical partition in the embodiment of the invention.

FIG. 13 is a diagram illustrating a third example of the physical partition in the embodiment of the invention.

In FIG. 13 example, similarly to FIG. 3, one or more servers 120 are allocated to each of the partitions, and similarly to FIG. 4, one FC-SW 140 and one storage device 100 are shared for use by a plurality of partitions.

Even with such a configuration, if the FC-SW 140 and the storage device 100 are allowed to control the power supply on a portion basis, the power supply control similar to the above can be performed. For example, when the storage device 100 is provided with a plurality of disk drives 110, and is allowed to control power ON and OFF on the basis of the disk drive 110 (or on the basis of the RAID group configured by a plurality of disk drives (not shown), the power consumption can be favorably reduced as will be described later through control, at any appropriate timing, over the power supply of the disk drive 110 storing the logical volume 603 being a migration source, and over the power supply of the disk drive 110 including the logical volume 603 being a migration destination.

However, the reduction level of the power consumption as a result of the above-described portion-basis control by the storage device 100 or others is too small considering the power consumption of the computer system in its entirety, the effects of the reduction of power consumption by such portion-basis control are small. If this is the case, the devices shared for use by a plurality of partitions, e.g., the storage device 100, may remain turned ON, and the server 120 may be controlled in terms of power supply.

FIG. 14 is a diagram illustrating migration of the application 500 and power supply control to be performed in the embodiment of the invention.

FIG. 14 shows, in addition to the procedure for migration of the application 500 described by referring to FIG. 9, the procedure for power supply control to be performed during the application migration. Note here that FIG. 9 shows the example of migrating the application 500 from the partition 1_300A to the partition 2_300B, but FIG. 14 shows an example of migrating the application 500 from the partition 2_300B to the partition 1_300A. For example, the process of FIG. 14 is executed when the application 500A migrated to the partition 2_300B as a result of the process of FIG. 9 is put back to the partition 1_300A. Herein, also when the process of FIG. 9 is executed, the power supply control similar to FIG. 14 may be performed.

In FIG. 14, the hardware configuration such as the server 120 and the application configuration such as the virtual server 601A are the same as those in FIG. 9, and thus are not described again. Note that, however, FIG. 14 additionally show hardware identifiers, i.e., "server P1", "FC-SW P1", and "storage P1" respectively for the server 120, the FC-SW 140, and the storage device 100 in the partition 1_300A, and "server P2", "FC-SW P2", and "storage P2" respectively for the server 120, the FC-SW 140, and the storage device 100 in the partition 2_300B. These identifiers are registered in a table that will be described later (refer to FIGS. 16A, 16B, and others).

At the time immediately before the process execution of FIG. 14, the components allocated to the partition 1_300A, i.e., the server 120, the FC-SW 140, and the storage device 100, are being turned OFF.

In FIG. 14 example, first of all, the storage device 100 is turned ON in the partition 1_300A being a migration destination.

For migration of the logical volume 603 from the partition 2_300B to the partition 1_300A, the full copy is then started. In FIG. 14 example, the data stored in the logical volume 603F is entirely copied into the logical volume 603A. This copying is performed similarly to FIG. 11. That is, after full copy is started as such, updating of the logical volume 603F is prohibited, and the update details are stored as a differential stock.

The full copy is then ended.

In response to completion of the full copy, in the partition 1_300A, the server 120 and the FC-SW 140 are both turned ON. In this embodiment, there needs to migrate the logical path 602A before migration of the virtual server 601A, and thus the server 120 is not required to be through with an activation process before an activation process of the FC-SW 140. In consideration thereof, the FC-SW 140 may be turned ON first before the server 120 is turned ON. However, because the time needed to activate the server 120 is generally longer to activate the FC-SW 140, the server 120 may be turned ON first as shown in FIG. 14.

Thereafter, differential copy is performed from the logical volume 603F to 603A. To be specific, the data stored as a differential stock is written into the logical volume 603A.

Such migration of the logical volume 603 as above is implemented by the previous on-line migration function, for example.

After completion of the differential copy, the logical path 602A is migrated to the partition 1_300A, and then the virtual server 601A is migrated to the partition 1_300A.

FIG. 15 is a diagram illustrating migration of the application 500, and the timing for power supply control to be performed in the embodiment of the invention.

To be specific, FIG. 15 shows the execution timing for the processes of FIG. 14, and the time taken for execution thereof. In FIG. 15, the starting point of a one-way arrow (the left end of an arrow in FIG. 15 example), the tip thereof (the right end of the arrow in FIG. 15 example), and the length thereof are respectively corresponding to the starting time of the processes, the end time thereof, and the processing time thereof.

For example, an arrow 1501 denotes an activation process of the storage device 100. The starting point of the arrow 1501 denotes the time when the storage device 100 is turned ON (time 1511), and the tip of the arrow 1501 denotes the time when the activation process of the storage device 100 is ended (time 1512). Similarly, an arrow 1502 denotes the full copy process of the logical volume 603F, an arrow 1503 denotes the differential copy process of the logical volume 603F, an arrow 1504 denotes an activation process of the server 120, an arrow 1505 denotes an activation process of the FC-SW 140, an arrow 1506 denotes a migration process of the logical path 602A, and an arrow 1507 denotes a migration process of the virtual server 601A.

As shown also in FIG. 14, the storage device 100 is turned ON first (time 1511), and after the storage device 100 is activated (time 1512), the full copy is started for the logical volume 603F. Although being dependent on the amount of data stored in the logical volume 603F, and the transfer performance of a data transfer path to be used for the copying, the time needed for the full copy is generally often sufficiently longer than the time needed for hardware activation and the time needed for differential copy.

In response to completion of the full copy (time 1513), the server 120 and the FC-SW 140 are both turned ON, and the differential copy is started for the logical volume 603F.

After activation of the server 120 and the FC-SW 140, and after completion of the differential copy (time 1514), migration of the logical path 602A is started. After completion of the migration of the logical path 602A (time 1515), migration of the virtual server 601A is started.

Previously, the full copy process and the differential copy process are both dealt with as a single copy process, and thus the management server 130 had no way of knowing the end time of the full copy process, i.e., time 1513. Therefore, no control has been allowed to perform in response to completion of full copy. In consideration thereof, in the embodiment, the time 1511 or 1514 can be used as control criteria, for example.

When the server 120 and the FC-SW 140 are both turned ON at the time 1511, the arrows 1504 and 1505 of FIG. 15 are so moved that their starting points come at the time 1511. If this is the case, however, because the logical path 602A and the virtual server 601A are both allowed to migrate after the time 1514, the server 120 and the FC-SW 140 have to wait idle but consume power until the time 1514 comes after being activated. That is, until the time 1514, the server 120 and the FC-SW 140 waste power.

On the other hand, when the server 120 and the FC-SW 140 are both turned ON at the time 1514, i.e., the end time of the differential copy, the arrows 1506 and 1507 of FIG. 15 are moved to the later time, i.e., toward the right side. In this case, until the activation process is through for the server 120 and the FC-SW 140, the logical path 602A and the virtual server 601A cannot be migrated. As a result, the time until completion of the migration of the application 500A after the storage device 100 is turned ON becomes longer than the time in FIG. 15 example. That is, in the time interval until the activation process is through for the server 120 and the FC-SW 140 after the completion of the differential copy process, the storage device 100 wastes power.

For minimizing the amount of power consumption of the computer system in its entirety, it is desirable to control power ON of the server 120 and the FC-SW 140 in such a manner that various processes are to be completed at the same time, i.e., the differential copy process, the activation process for the server 120, and the activation process for the FC-SW 140, that is, in such a manner that the tips of the arrows 1503, 1504, and 1505 come at the same time. However, as described above, correctly estimating the time needed for the differential copy process is difficult. In consideration thereof, in this embodiment, the server 120 and the FC-SW 140 are both turned ON in response to completion of the full copy process.

If the data stored as a differential stock is large in amount, as shown in FIG. 15, the differential copy may not be completed even after activation of the server 120 and the FC-SW 140. If this is the case, in the time interval until the differential copy is completed after activation of the server 120 and the FC-SW 140, the server 120 and the FC-SW 140 waste power. On the other hand, when the data stored as a differential stock is small in amount, the differential copy may be completed even before activation of the server 120 and the FC-SW 140. If this is the case, in the time interval until the server 120 and the FC-SW 140 are activated after completion of the differential copy, the storage device 100 wastes power.

As such, the end time of the full copy process is not always strictly optimal as the timing of turning ON the server 120 and the FC-SW 140. However, generally, the migration time for the logical volume 603, i.e., sum of the time needed for the full copy and the time needed for the differential copy, is generally much longer than the time needed for the activation process for the server 120 and the FC-SW 140. As such, the optimal time for turning ON the server 120 and the FC-SW 140 is often just moments before the end time of the migration process for the logical volume 603. On the other hand, the time needed for the full copy process is much longer than the time needed for the differential copy process, and thus the end time of the while copying process is often very close to the end time of the migration process for the logical volume 603. Accordingly, the end time of the full copy process (time 1513)

can be used as an approximately-optimal time for turning ON the server 120 and the FC-SW 140.

In comparison with the case when the server 120 and the FC-SW 140 are both turned ON at the same time as the storage device 100, and when the server 120 and the FC-SW 140 are both turned ON after the completion of the differential copy process, the power consumption can be successfully reduced in the computer system by turning ON the server 120 and the FC-SW 140 in response to the completion of the full copy process, specifically, after the completion of the full copy process but before the completion of the differential copy process.

Such a migration process for the application 500 is described in more detail.

FIGS. 16A and 16B are each a diagram illustrating the management table 136 in the embodiment of the invention.

The management table 136 of the embodiment includes a partition management table 136A, and an application management table 136B. For the sake of simplicity, FIGS. 16A and 16B respectively show the partition management table 136A and the application management table 136B before migration of the application 500A in FIG. 14 example.

FIG. 16A is a diagram illustrating the partition management table 136A. The partition management table 136A includes information for management use of the partitions defined on the computer system under the management of the management server 130.

To be specific, the partition management table 136A includes elements of "partition number 1601", "hardware type 1602", "hardware name 1603", "resource amount 1604", "remaining resource amount 1605", "power supply 1606", "located application (APP) 1607", and "application resource amount 1608".

The element of "partition number 1601" is information for use to identify each of the partitions defined on the computer system. In FIG. 16A example, the element of "partition number 1601" stores "1" and "2". In this example, "1" denotes the identifier of the partition 1_300A, and "2" denotes the identifier of the partition 2_300B.

The element of "hardware type 1602" is information for use to identify the type of hardware resources allocated to each of the partitions. To be specific, the element of "hardware type 1602" is information for use to identify which of the server 120, the FC-SW 140, or the storage device 100 is the hardware resources allocated to each of the partitions.

In FIG. 16A example, "server 1", "FC-SW 1", and "storage 1" respectively denote the server 120, the FC-SW 140, and the storage device 100 in the partition 1_300A. On the other hand, "server 2", "FC-SW 2", and "storage 2" respectively denote the server 120, the FC-SW 140, and the storage device 100 in the partition 2_300B.

The element of "hardware name 1603" is information for use to identify the hardware resources allocated to each of the partitions. In FIG. 16A example, the element of "hardware name 1603" stores, for the partition 1_300A, "server P1" (entry 1611), "FC-SW P1" (entry 1612), and "storage P1" (entry 1613). In this example, the "server P1", the "FC-SW P1", and the "storage P1" are respectively identifiers of the server 120, the FC-SW 140, and the storage 100 all allocated to the partition 1_300A.

Also in FIG. 16A example, the element of "hardware name 1603" stores, for the partition 2_300B, "server P2" (entry 1614), "FC-SW P2" (entry 1615), and "storage P2" (entry 1616). In this example, the "server P2", the "FC-SW P2", and the "storage P2" are respectively identifiers of the server 120, the FC-SW 140, and the storage 100 all allocated to the partition 2_300B.

In FIG. 16A example, for consistency with the diagram of FIG. 14, one partition is allocated with one server 120, one FC-SW 140, and one storage device 100. However, for actual use, one partition may be allocated with a plurality of servers 120, a plurality of FC-SWs 140, and a plurality of storage devices 100. If this is the case, the element of "hardware name 1603" stores the identifiers of such a plurality of hardware resources.

Assuming that the partition 1_300A is allocated with two servers 120 having the identifiers of "server P1" and "server P10" (not shown), respectively, the "server 1" in the element of "hardware type 1602" is correlated with two entries, and for these entries, the element of "hardware name 1603" respectively store "server P1" and "server P10".

The element of "resource amount 1604" indicates the entire amount of resources in each of the hardware resources. The measurement method for the resources is not restrictive. For example, the resource amount of the server 120 may be the number of the CPUs 121 provided to the server 120, or may be the use rate of the CPU(s) 121. The resource amount of the FC-SW 140 may be the number of the ports 141 provided thereto, or may be the number of the logical paths 602 available for connection therewith. The resource amount of the storage device 100 may be the storage capacity that can be provided as the logical volume(s) 111.

In FIG. 16A example, the element of "resource amount 1604" stores "10" for each of the hardware resources. FIG. 16A example does not show the unit, but for actual use, may explicitly show the unit for each of the resource amounts, e.g., "terabytes" for the resource amount of the storage device 100.

The element of "remaining resource amount 1605" indicates the amount of resources of each of the hardware resources not yet allocated to any of the applications 500. In other words, the element of "remaining resource amount 1605" indicates the amount of resources being a result of subtracting the amount of resources having been allocated to any of the applications 500 from the amount of resources of each of the hardware resources.

The element of "power supply 1606" is information indicating the state of power supply in each of the hardware resources. In FIG. 16A example, "ON" in the element of "power supply 1606" indicates the state of power ON, and "OFF" therein indicates the state of power OFF.

The element of "located application 1607" is information for use to identify the application 500 located in each of the partitions.

The element of "application resource amount 1608" indicates the amount of resources having been allocated to the application 500 in each of the hardware resources.

The time frame of FIG. 16A example is, in FIG. 14, before the application 500A is migrated from the partition 2_300B to the partition 1_300A. That is, at the point in time, the resources of each of the hardware resources in the partition 1_300A are not yet allocated to any of the applications 500.

The element of "remaining resource amount 1605" thus shows the same value as in the element of "resource amount 1604" for each of the hardware resources in the partition 1_300A. The hardware resources in the partition 1_300A are not yet turned ON, and thus the element of "power source 1606" stores "OFF" for each of the hardware resources. Moreover, the elements of "located application 1607" and "application resource amount 1608" are both blank for each of the hardware resources in the partition 1_300A.

On the other hand, at the point in time before migration of the application 500A in FIG. 14, the partition 2_300B includes the application 500A. Therefore, the element of "located application 1607" for the partition 2_300B stores the identifier of the application 500A, e.g., "APP1" in FIG. 16A example. In this state, the hardware resources in the partition 2_300B are all turned ON, and thus the element of "power supply 1606" stores "ON" for each of the hardware resources.

Assuming that, in the partition 2_300B, when the resources of "5" of the server 120 are allocated to the application 500 out of "10" being the entire resource amount, when the resources of "1" of the FC-SW 140 are allocated to the application 500 out of "10" being the entire resource amount, and when the resources of "6" of the storage device 100 are allocated to the application 500 out of "10" being the entire resource amount, the element of "application resource amount 1608" stores "5", "1", and "6" respectively for the server 120, the FC-SW 140, and the storage device 100 in the partition 2_300B. The element of "remaining resource amount 1605" thus stores "5", "9", and "4" therefor respectively.

FIG. 16B is a diagram illustrating the application management table 136B. The application management table 136B includes information for management use of the applications 500 running on the computer system under the management of the management server 130.

To be specific, the application management table 136B includes elements of "application name 1621", "located partition number 1622", "located server name 1623", "located FC-SW name 1624", "located storage name 1625", "server resource amount 1626", "FC-SW resource amount 1627", and "storage resource amount 1628".

The element of "application name 1621" is information for use to identify the application 500 running in the computer system.

The element of "located partition number 1622" is information for use to identify the partition including each of the applications 500.

The element of "located server name 1623" is information for use to identify the server 120 including the virtual server 601 of each of the applications 500.

The element of "located FC-SW name 1624" is information for use to identify the FC-SW 140 including the logical path 602 of each of the applications 500.

The element of "located storage name 1625" is information for use to identify the storage device 100 including the logical volume 603 of each of the applications 500.

The element of "server resource amount 1626" indicates the amount of resources of the server 120 allocated to each of the applications 500.

The element of "FC-SW resource amount 1627" indicates the amount of resources of the FC-SW 140 allocated to each of the applications 500.

The element of "storage resource amount 1628" indicates the amount of resources of the storage device 100 allocated to each of the applications 500.

The time frame of FIG. 16B example is, in FIG. 14, before the application 500A is migrated from the partition 2_300B to the partition 1_300A. That is, at the point in time, the application 500A is located in the partition 2_300B. Therefore, in FIG. 16B example, for the elements corresponding to "APP1" in the element of "application name 1621", i.e., elements of "located partition number 1622", "located server name 1623", "located FC-SW name 1624", and "located storage name 1625", "2", "server P2", "FC-SW P2", and "storage P2" are respectively stored. These values are consistent with in FIG. 16A example. Moreover, as shown in FIG. 16A, "5", "1", and "6" are respectively stored in the elements of "server resource amount 1626", "FC-SW resource amount 1627", and "storage resource amount 1628".

Described next is a process of migrating the application 500, and a process of power supply control in association therewith by referring to the flowchart. In the description below, as a specific exemplary process, the processes of FIGS. 14 and 15 are referred to, i.e., the process of migrating the application 500A, and the process of power supply control therefor.

Figure 17:
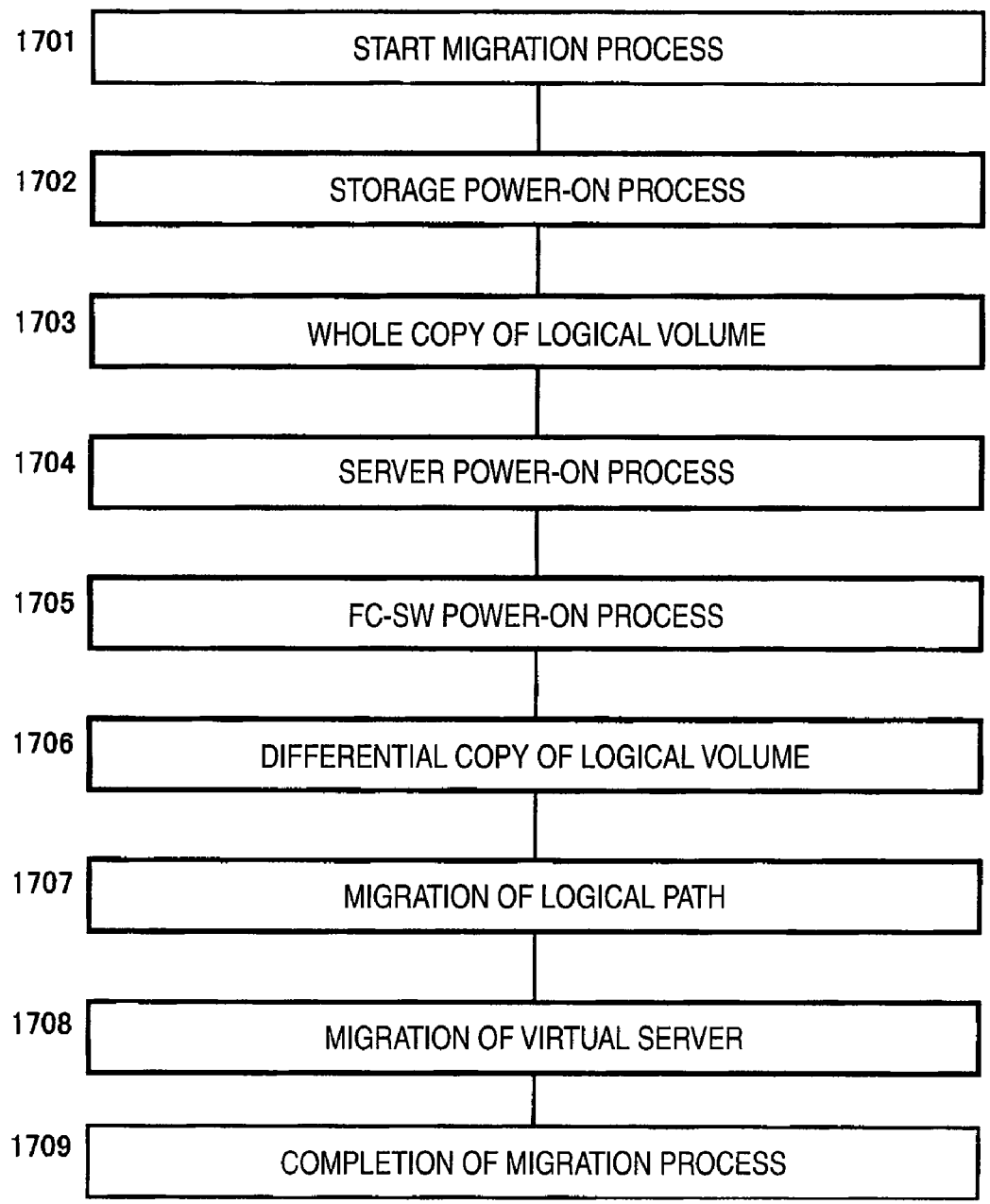
FIG. 17 is an overall flowchart of an application migration process and a power supply control process to be executed in the embodiment of the invention.

FIG. 17 is an overall flowchart of the process of migrating the application 500 and the process of power supply control to be executed in the embodiment of the invention.

This process is executed in step 1002 of FIG. 10.

After the migration process is started for the application 500 (step 1701), first of all, the management program 135 of the management server 130 starts executing a storage power-ON process (step 1702). This is the process of turning ON the storage device 100 being a migration destination, i.e., the storage device 100 in the partition 1_300A in FIG. 14 example.

The storage power-ON process to be executed in step 1702 will be described in detail later by referring to FIG. 18.

After completion of the storage power-ON process, i.e., after completion of the activation process of the storage device 100 being a migration destination, the management program 135 starts executing a full copy process of the logical volume 603 (step 1703). The full copy process to be executed in step 1703 will be described in detail later by referring to FIGS. 19 and 20.

After completion of the full copy process in step 1703, the management program 135 executes a server power-ON process (step 1704). This is the process of turning ON the server 120 being a migration destination. The server power-ON process to be executed in step 1704 will be described in detail later by referring to FIG. 21.

After completion of the full copy process in step 1703, the management program 135 then executes an FC-SW power-ON process (step 1705). This is the process of turning ON the FC-SW 140 being a migration destination. The FC-SW power-ON process to be executed in step 1705 will be described in detail later by referring to FIG. 22.

After completion of the full copy process in step 1703, the management program 135 then executes a differential copy process of the logical volume 603 (step 1706). The differential copy process to be executed n step 1706 will be described in detail later by referring to FIGS. 23 and 24.

To determine whether the full copy process is completed or not, the management program 135 may use as a basis a message of completion provided by the storage device 100, or may use as a basis a full copy processing time of its own calculation.

If with the former case, the end time of the full copy process is the time when the management server 130 is provided with the message of completion by the storage device 100, and when the time comes, the processes in steps 1704 to 1706 are responsively executed. The message of completion will be described later (refer to FIG. 20).

If with the latter case, the end time of the full copy process is after the expiration of time of the full copy process, and when the time comes, the processes in steps 1704 to 1706 are responsively executed. The full copy processing time is calculated by dividing the capacity of the logical volume 603F being a copy source by the data transfer speed from the logical volume 603F to the logical volume 603A being a copy destination. The data transfer speed may be calculated based on the specifications of the hardware resources, or may be any actual measurement value.

Note that FIG. 17 shows steps 1704 to 1706 in sequential order for the sake of convenience, but this order is just an example. These three steps are required to be executed in response to completion of the full copy process in step 1703, but the execution order thereof is not restrictive. If possible, these three steps may be executed all at once. However, as described by referring to FIG. 15, to produce the effects of reduction of power consumption in this embodiment, steps 1704 and 1705 are required to be started before no later than the completion of the differential copy process.

After completion of the server power-ON process, the FC-SW power-ON process, and the differential copy process (steps 1704 to 1706), the management program 135 executes the migration process for the logical path 602 (step 1707). This process will be described in detail later by referring to FIG. 25.

After completion of the migration process for the logical path 602 in step 1707, the management program 135 executes the migration process for the virtual server 601 (step 1708). This process will be described in detail later by referring to FIG. 26.

After completion of the migration process for the virtual server 601 in step 1708, the management program 135 ends the migration process for the application 500 (step 1709). Note that after completion of the migration process for the virtual server 601, e.g., in step 1709, the hardware resources in the partition being a migration source, i.e., the server 120, the FC-SW 140, and the storage device 100 in the partition 2_300B in FIG. 14 example, may be turned OFF.

Figure 18:
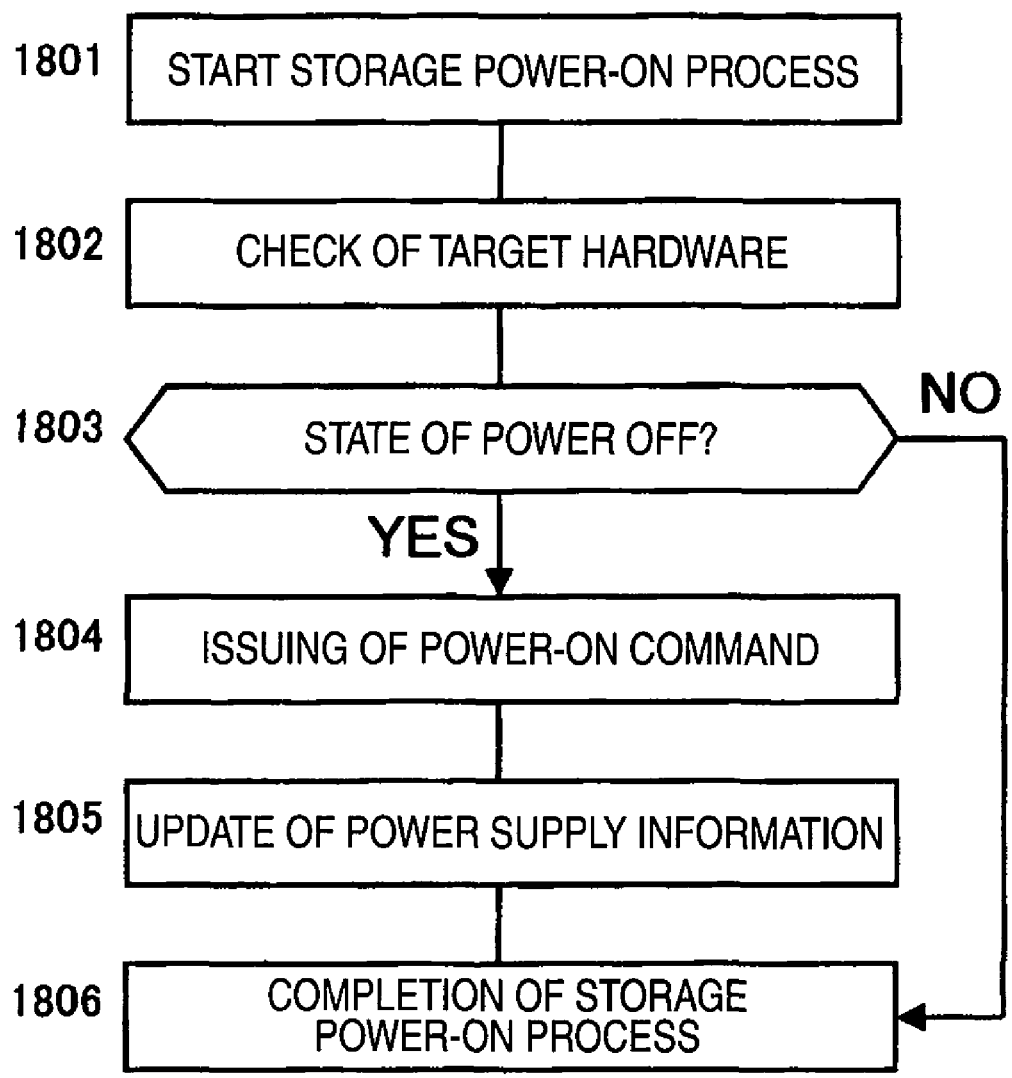
FIG. 18 is a flowchart of a storage power-ON process to be executed in the embodiment of the invention.

FIG. 18 is a flowchart of the storage power-ON process to be executed in the embodiment of the invention.

This process is to be executed in step 1702 of FIG. 17.

When the storage power-ON process is started (step 1801), the management program 135 checks the hardware resources being a target (step 1802). To be specific, the management program 135 refers to the partition management table 136A, and checks the state of the storage device 100 found in the partition being a migration destination, i.e., the storage device being a migration destination.

When the partition 1_300A is designated as a migration destination as in FIG. 14 example, for example, the management program 135 refers to the partition management table 136A, and specifies every entry corresponding to "1" in the element of "partition number 1601" and "storage 1" in the element of "hardware type 1602". The management program 135 then checks the values in the element of "power supply 1606" for the specified every entry.

The management program 135 then determines whether or not the storage device 100 being a migration destination is in the state of power OFF, i.e., "OFF" state (step 1803). To be specific, the management program 135 determines whether the value acquired in step 1802 is "ON" or "OFF".

When the storage device 100 being a migration destination has been already turned ON, there is no more need to execute the process of power ON, and thus the management program 135 ends the storage power-ON process (step 1806).

When the storage device 100 being a migration destination has been turned OFF, the management program 135 forwards a power-ON command to the storage device 100 being a migration destination over the management network 150 (step 1804). Upon reception of the power-ON command via the I/F 104, the power supply control section 105 of the storage device 100 turns ON the storage device 100. Note that, for execution of such a process, at least the I/F 104 and the power supply control section 105 in the storage device 100 are required to be turned ON when the storage power-ON process is started.

The storage device 100 is turned ON in accordance with the power-ON command, and when the activation process is through, may forward a notification to the management server 130 that the activation process is now completed.

The management program 135 then updates the information about the power supply in the management table 136 to reflect the result of the storage power-ON process (step 1805).

When a plurality of entries are specified in step 1802, i.e., when the partition being a migration destination includes a plurality of storage devices 100, each of the entries is subjected to the processes in steps 1803 to 1805.

This is the end of the storage power-ON process (step 1806).

In FIG. 16A example, in step 1802, specified is only the entry of 1613 including "storage P1" for the element of "hardware name 1603". Because the value in the element of "power supply 1606" for the entry 1613 is "OFF", in step 1804, the management program 135 forwards the power-ON command to the storage device 100 being a migration destination, i.e., the storage device 100 identified by "storage P1". This accordingly turns ON the storage device 100 in the partition 1_300A being a migration destination, and in step 1805, the value in the element of "power supply 1606" for the entry 1613 is updated to "ON".

Figure 19:
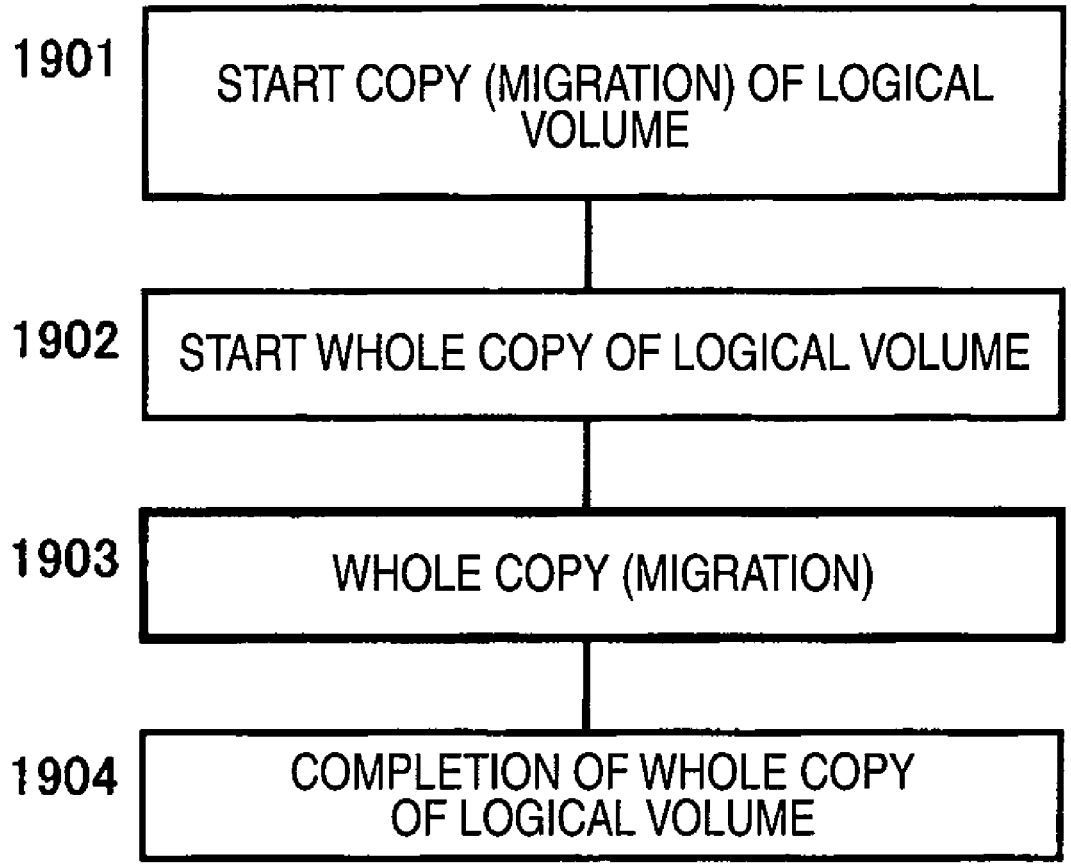
FIG. 19 is a flowchart of a logical volume full copy process to be executed by a management server in the embodiment of the invention.

FIG. 19 is a flowchart of the full copy process for the logical volume 603 to be executed by the management server 130 in the embodiment of the invention.

The full copy process for the logical volume 603 is a part of the migration process for the logical volume 603 as described by referring to FIG. 15. This process is executed in step 1703 of FIG. 17.

When the migration process is started for the logical volume 603 (step 1901), the management program 135 starts the full copy process for the logical volume 603 (step 1902), performs the full copy (step 1903), and ends the full copy process (step 1904).

To be specific, in step 1903, the management program 135 forwards a full copy command to the storage device 100 being a migration source. The process to be executed by the storage device 100 provided with such a command will be described in detail later by referring to FIG. 20.

Figure 20:
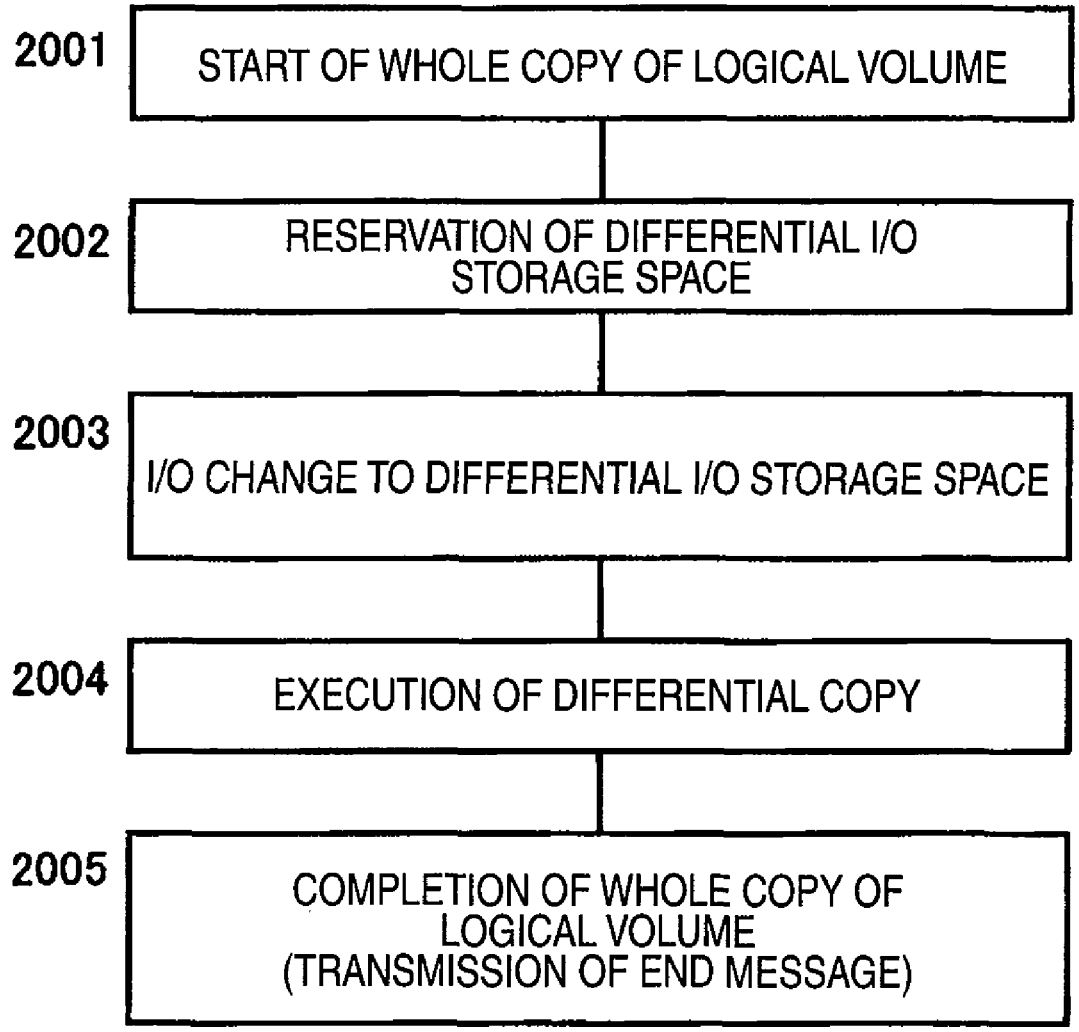
FIG. 20 is a flowchart of a logical volume full copy process to be executed by a storage device in the embodiment of the invention.

FIG. 20 is a flowchart of the full copy process for the logical volume 603 to be executed by the storage device 100 in the embodiment of the invention.

This process is executed by the controller 101 of the storage device 100 provided by the command forwarded in step 1903 of FIG. 19, i.e., the storage device 100 in the partition 2_300B in FIG. 14 example.

When the full copy process is started for the logical volume 603 (step 2001), the controller 101 reserves the storage area for storage of a differential I/O (step 2002). This storage area may be reserved in the vacant storage area of any of the logical volumes 111 under the management of the storage device 100, for example.

The controller 101 then changes the execution target for data I/O to/from the logical volume 603 being a migration target to the storage area reserved in step 2002 (step 2003). Thereafter, upon reception of the data I/O to/from the logical volume 603 being a migration target, i.e., the logical volume 603F in FIG. 14 example, the controller 101 stores the resulting data updated thereby in the storage area reserved in step 2002 as a differential stock without reflecting the data to the logical volume 603 (refer to FIG. 11).

The controller 101 then performs the full copy of the logical volume 603 (step 2004). In FIG. 14 example, the controller 101 reads the data of the logical volume 603F in its entirety, and forwards a request to the storage device 100 in the partition 1_300A for writing the data being the reading result into the logical volume 603A. Note here that the logical volume 603 being a copy source and destination is designated by an argument found in the command provided in step 1903 of FIG. 19.

After completion of the transmission of the entire data being the reading result, the controller 101 ends the full copy process for the logical volume 603 (step 2005). At this time, the controller 101 forwards a message of completion to the management server 130 to notify that the full copy process is now ended.

Upon reception of the message of completion provided in step 2005, the management program 135 responsively executes the processes in steps 1704 to 1706.

Herein, as described by referring to FIG. 17, the management program 135 may calculate the full copy processing time based on the specifications of the hardware resources, for example, and based on the full copy processing time being the calculation result, may controllably execute the processes in steps 1704 to 1706. If this is the case, the controller 101 has no more need to forward the message of completion in step 2005.

Figure 21:
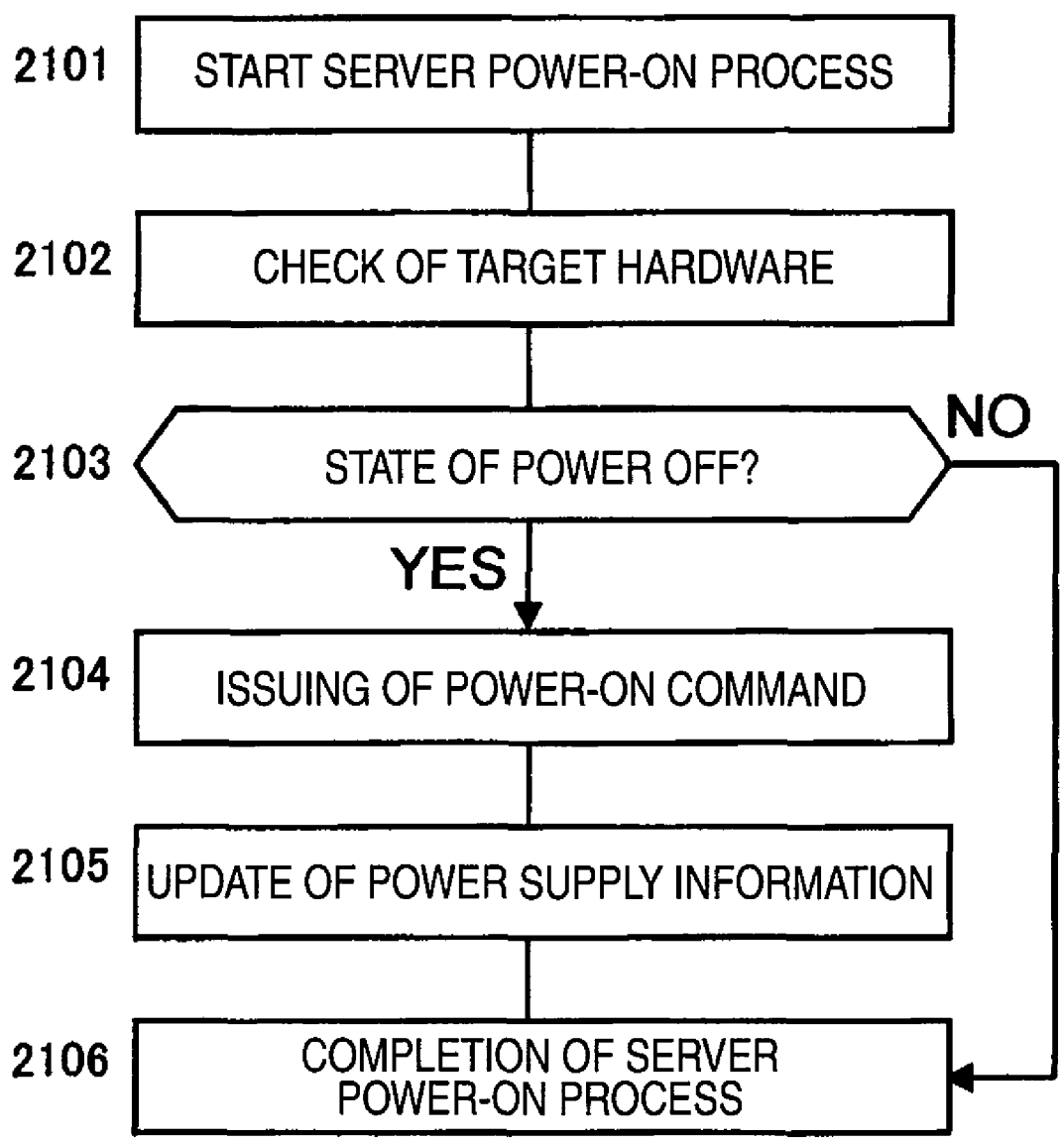
FIG. 21 is a flowchart of a server power-ON process to be executed in the embodiment of the invention.

FIG. 21 is a flowchart of the server power-ON process to be executed in the embodiment of the invention.

This process is executed in step 1704 of FIG. 17. That is, this process is executed in response to the management server 130 receiving the message of completion provided in step 2005 of FIG. 20.

When the storage power-ON process is started (step 2101), the management program 135 checks the hardware resources being a target (step 2102). To be specific, the management program 135 refers to the partition management table 136A, and checks the state of the server 120 found in the partition being a migration destination, i.e., the server being a migration destination.

When the partition 1_300A is designated as a migration destination as in FIG. 14 example, the management program 135 refers to the partition management table 136A, and specifies every entry corresponding to "1" in the element of "partition number 1601", and "server 1" in the element of "hardware type 1602". The management program 135 then checks the value in the element of "power supply 1606" for every specified entry.

The management program 135 then determines whether or not the server 120 being a migration destination is in the state of power OFF, i.e., "OFF" state (step 2103). To be specific, the management program 135 determines whether the value acquired in step 2102 is "ON" or "OFF".

When the server 120 being a migration destination has been already ON, there is no more need to execute the process of power ON, and thus the management program 135 ends the server power-ON process (step 2106).

When the server 120 being a migration destination has been turned OFF, the management program 135 forwards a power-ON command to the server 120 being a migration destination over the management network 150 (step 2104). Upon reception of the power-ON command via the I/F 125, the power supply control section 123 of the server 120 turns ON the server 120. Note that, for execution of such a process, at least the I/F 125 and the power supply control section 123 in the server 120 are required to be turned ON when the server power-ON process is started.

The server 120 is turned ON in accordance with the power-ON command, and when the activation process is through, may forward a notification to the management server 130 that the activation process is now completed.

The management program 135 then updates the information about the power supply in the management table 136 to reflect the result of the server power-ON process (step 2105).

When a plurality of entries are specified in step 2102, i.e., when the partition being a migration destination includes a plurality of servers 120, each of the entries is subjected to the processes in steps 2103 to 2105.

This is the end of the server power-ON process (step 2106).

In FIG. 16A example, in step 2102, specified is only the entry of 1611 including "server P1" for the element of "hardware name 1603". Because the value in the element of "power supply 1606" for the entry 1611 is "OFF", in step 2104, the management program 135 forwards the power-ON command to the server 120 being a migration destination, i.e., the server 120 identified by "server P1". This accordingly turns ON the server 120 in the partition 1_300A being a migration destination, and in step 2105, the value in the element of "power supply 1606" for the entry 1611 is updated to "ON".

Note that, as in FIG. 14 example, when one or more servers 120 are allocated to each of the partitions, in step 2104, a command is transmitted for turning ON the server(s) 120 in the partition being a migration destination, i.e., a command for turning ON the entire resources in the server(s) 120. However, as shown in FIG. 4, for example, when the resource portions of one server 120, e.g., CPUs 121, are respectively allocated to the partitions, and when the resource portions can be separately turned ON, in step 2104, a command is forwarded to the server 120 including the resource portion for turning ON the resource portions of the server(s) 120 in the partition being a migration destination. Upon reception of the command, the power supply control section 123 of the server 120 accordingly turns ON the resource portion designated by the command, e.g., the designated CPU.

Figure 22:
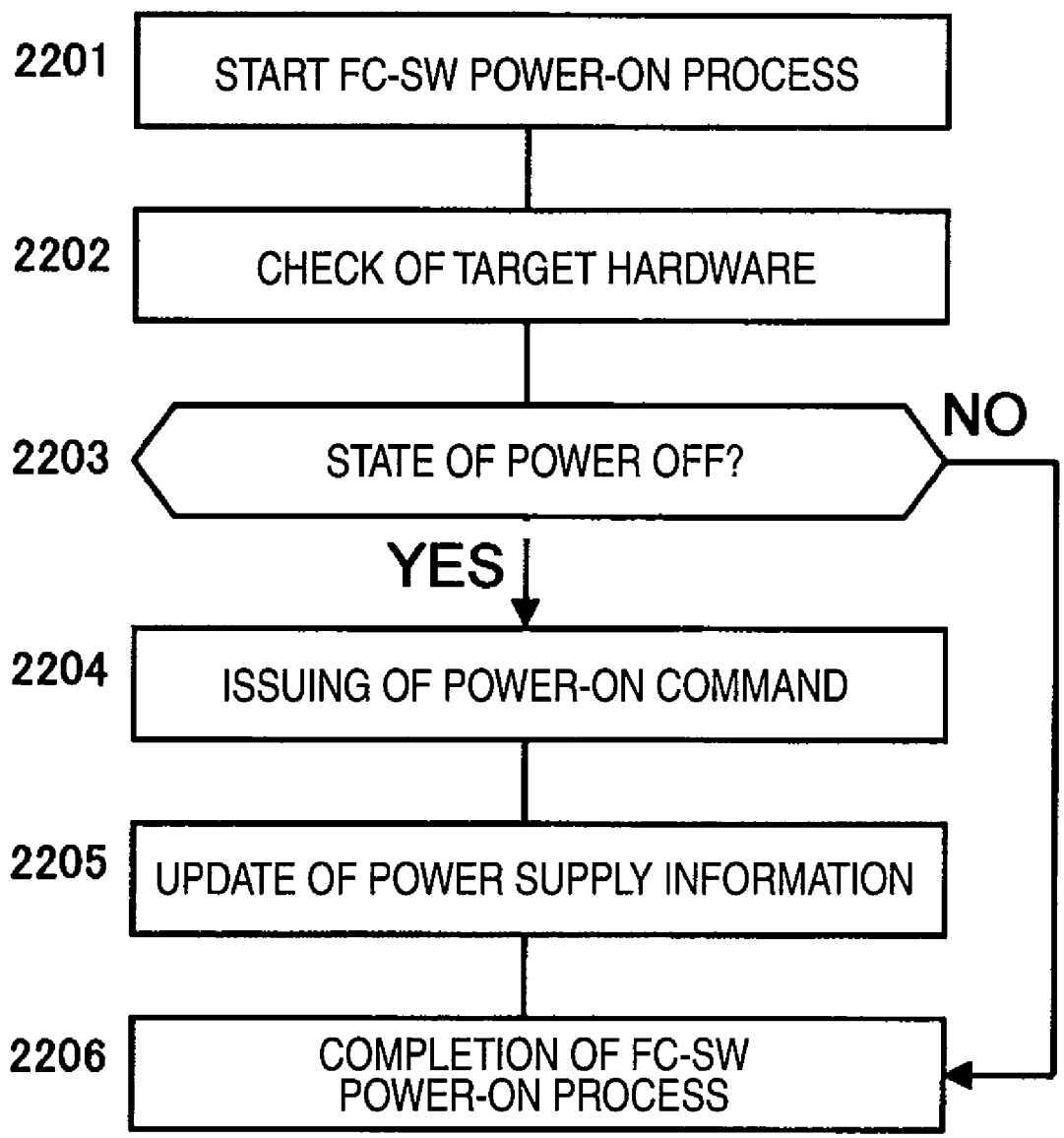
FIG. 22 is a flowchart of an FC-SW power-ON process to be executed in the embodiment of the invention.

FIG. 22 is a flowchart of the FC-SW power-ON process to be executed in the embodiment of the invention.

This process is executed in step 1705 of FIG. 17. That is, this process is executed in response to the management server 130 receiving the message of completion provided in step 2005 of FIG. 20.

When the FC-SW power-ON process is started (step 2201), the management program 135 checks the hardware resources being a target (step 2202). To be specific, the management program 135 refers to the partition management table 136A, and checks the state of the FC-SW 140 found in the partition being a migration destination, i.e., the FC-SW being a migration destination.

When the partition 1_300A is designated as a migration destination as in FIG. 14 example, the management program 135 refers to the partition management table 136A, and specifies every entry corresponding to "1" in the element of "partition number 1601", and "FC-SW 1" in the element of "hardware type 1602". The management program 135 then checks the value in the element of "power supply 1606" for every specified entry.

The management program 135 then determines whether or not the FC-SW 140 being a migration destination is in the state of power OFF, i.e., "OFF" state (step 2203). To be specific, the management program 135 determines whether the value acquired in step 2202 is "ON" or "OFF".

When the FC-SW 140 being a migration destination has been already ON, there is no more need to execute the process of power ON, and thus the management program 135 ends the FC-SW power-ON process (step 2206).

When the FC-SW 140 being a migration destination has been turned OFF, the management program 135 forwards the power-ON command to the FC-SW 140 being a migration destination over the management network 150 (step 2204). Upon reception of the power-ON command via the I/F 142, the power supply control section 143 of the FC-SW 140 turns ON the FC-SW 140. Note that, for execution of such a process, at least the I/F 142 and the power supply control section 143 in the FC-SW 140 are required to be turned ON when the FC-SW power-ON process is started.

The FC-SW 140 is turned ON in accordance with the power-ON command, and when the activation process is through, may forward a notification to the management server 130 that the activation process is now completed.

The management program 135 then updates the information about the power supply in the management table 136 to reflect the result of the FC-SW power-ON process (step 2205).

When a plurality of entries are specified in step 2202, i.e., when the partition being a migration destination includes a plurality of FC-SWs 140, each of the entries is subjected to the processes in steps 2203 to 2205.

This is the end of the FC-SW power-ON process (step 2206).

In FIG. 16A example, in step 2202, specified is only the entry of 1612 including "FC-SW P1" for the element of "hardware name 1603". Because the value in the element of "power supply 1606" for the entry 1612 is "OFF", in step 2204, the management program 135 forwards the power-ON command to the FC-SW 140 being a migration destination, i.e., the FC-SW 140 identified by "FC-SW P1". This accordingly turns ON the FC-SW 140 in the partition 1_300A being a migration destination, and in step 2205, the value in the element of "power supply 1606" for the entry 1612 is updated to "ON".

Figure 23:
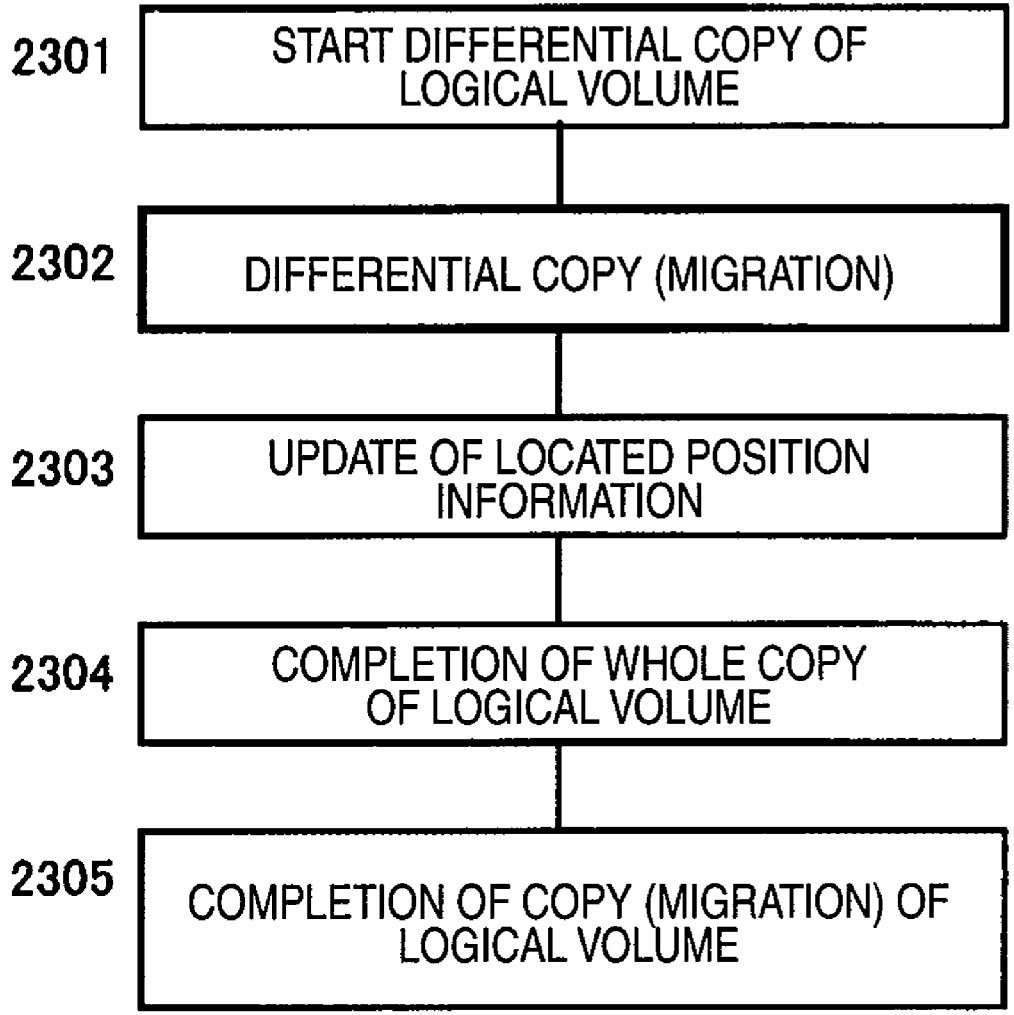
FIG. 23 is a flowchart of a logical volume differential copy process to be executed by the management server in the embodiment of the invention.

FIG. 23 is a flowchart of the differential copy process for the logical volume 603 to be executed by the management server 130 in the embodiment of the invention.

The differential copy process for the logical volume 603 is a part of the migration process for the logical volume 603 as described by referring to FIG. 15. This process is executed in step 1706 of FIG. 17.

When the differential copy process is started for the logical volume 603 (step 2301), the management program 135 starts the differential copy process (step 2302). To be specific, the management program 135 forwards a differential copy command to the storage device 100 being a migration source. The process to be executed by the storage device 100 provided such a command will be described in detail later by referring to FIG. 24.

The management program 135 then updates the management table 136 to reflect the result of copying executed as above (step 2303). When the copy process is executed from the logical volume 603F to 603A as shown in FIG. 14, in the partition management table 136A, the entries 1613 and 1616 related to the storage device 100 are updated.

In FIG. 16A example, the storage device 100 including the logical volume 603A corresponds to the entry 1613, and the storage device 100 including the logical volume 603F corresponds to the entry 1616. In this case, the element of "resource amount 1604" shows "6" for the logical volume 603F before the copy process. As a result of the copy process from the logical volume 603F to 603A, the logical volume 603F being a part of the application 500A does not use the resources any more, but the logical volume 603A instead starts using the resources as a part of the application 500A.

As such, in step 2303, the elements for the entry 1613, i.e., the elements of "remaining resource amount 1605", "located application 1607", and "application resource amount 1608", are updated to "4", "APP1", and "6", respectively. On the other hand, the element of "remaining resource amount 1605" for the entry 1616 is updated to "10", and the elements of "located application 1607" and "application resource amount 1608" for the entry 1616 are both updated to blank.

Then in step 2303, the application management table 136B is also updated. To be specific, the element of "located storage name 1625" for the "APP1" in the element of "application name 1621" is updated to "storage P1".

After execution of the process in step 2303, the management program 135 ends the differential copy process for the logical volume 603 (step 2304). As such, the migration process is ended for the logical volume 603 (step 2305).

Figure 24:
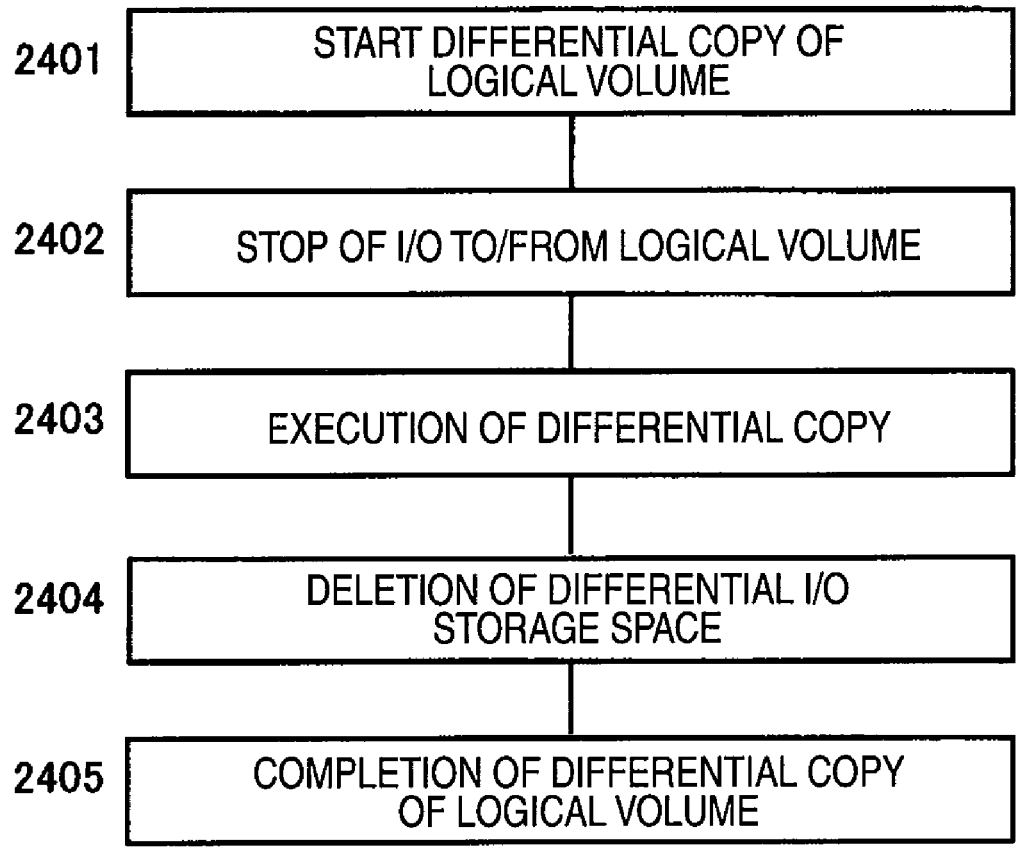
FIG. 24 is a flowchart of a logical volume differential copy process to be executed by the storage device in the embodiment of the invention.

FIG. 24 is a flowchart of the differential copy process for the logical volume 603 to be executed by the storage device 100 in the embodiment of the invention.

This process is executed by the controller 101 of the storage device 100 provided with the command transmitted in step 2302 of FIG. 23, i.e., the storage device 100 in the partition 2_300B in FIG. 14 example.

After the differential copy process is started for the logical volume 603 (step 2401), the controller 101 stops data I/O to/from the logical volume 603 being a copy source, i.e., the logical volume 603F in FIG. 14 example (step 2402). Herein, because the execution destination for the data I/O has been already changed in step 2003 of FIG. 20, in step 2402, the data I/O to/from the storage area of the differential data I/O is stopped.

The controller 101 then performs the differential copy (step 2403). To be specific, the controller 101 forwards a request, to the storage device 100 in the partition 1_300A, for data reading from the storage area of the differential data I/O, and for writing the data being the reading result to the logical volume 603A being a copy destination.

After completion of transmission of the differential data in its entirety, the controller 101 deletes the reserved storage area of the differential data I/O (step 2404).

As such, the controller 101 ends the differential copy process for the logical volume 603 (step 2405).

Note here that the data I/O stopped in step 2402 is resumed by a migration process for the logical path 602 that will be described later (refer to FIG. 25).

Figure 25:
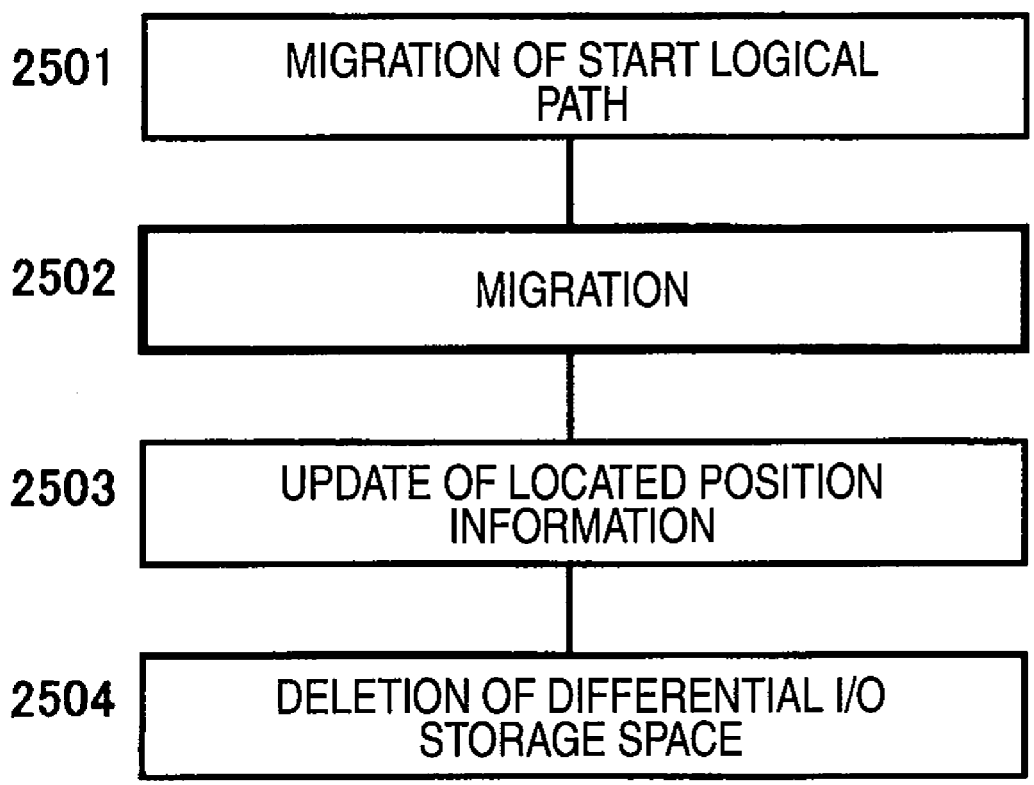
FIG. 25 is a flowchart of a logical path migration process to be executed in the embodiment of the invention.

FIG. 25 is a flowchart of the migration process for the logical path 602 to be executed in the embodiment of the invention.

This process is executed in step 1707 of FIG. 17.

After the migration process is started for the logical path 602 (step 2501), the management program 135 migrates the logical path 602 (step 2502). For migration of the logical path 602A as shown in FIG. 14, for example, the management program 135 may forward a command to the server 120 in the partition 2_300B for migrating the logical path 602A. Upon reception of this command, the server 120 may change the settings of the path management program 127 to allow the logical path 602A to be connected to the logical volume 603A via the FC-SW 140 in the partition 1_300A.

After migration of the logical path 602A in step 2502, the storage device 100 in the partition 1_300A resumes data I/O to/from the logical volume 603A.

The management program 135 then updates the management table 136 to reflect the migration of the logical path 602 in step 2502 (step 2503). When the logical path 602A is migrated as shown in FIG. 14, for example, in the partition management table 136A, the entries of 1612 and 1615 related to the FC-SW 140 are updated.

In FIG. 16A example, the FC-SW 140 in the partition 1_300A corresponds to the entry 1612, and the FC-SW 140 in the partition 2_300B corresponds to the entry 1615. In this case, the FC-SW 140 in the partition 2_300B used by the logical path 602A before the migration shows the resource amount of "1". As a result of the migration in step 2502, the logical path 602A does not use the resources of the FC-SW 140 in the partition 2_300B any more, but instead starts using the resources of the FC-SW 140 in the partition 1_300A.

As such, in step 2503, the elements for the entry 1612, i.e., the elements of "remaining resource amount 1605", "located application 1607", and "application resource amount 1608", are updated to "9", "APP1", and "1", respectively. On the other hand, the element of "remaining resource amount 1605" for the entry 1615 is updated to "10", and the elements of "located application 1607" and "application resource amount 1608" for the entry 1615 are both updated to blank.

Then in step 2503, the application management table 136B is also updated. To be specific, the element of "located FC-SW name 1624" for the "APP1" in the element of "application name 1621" is updated to "FC-SW P1".

As such, the migration process is ended for the logical path 602 (step 2504).

Figure 26:
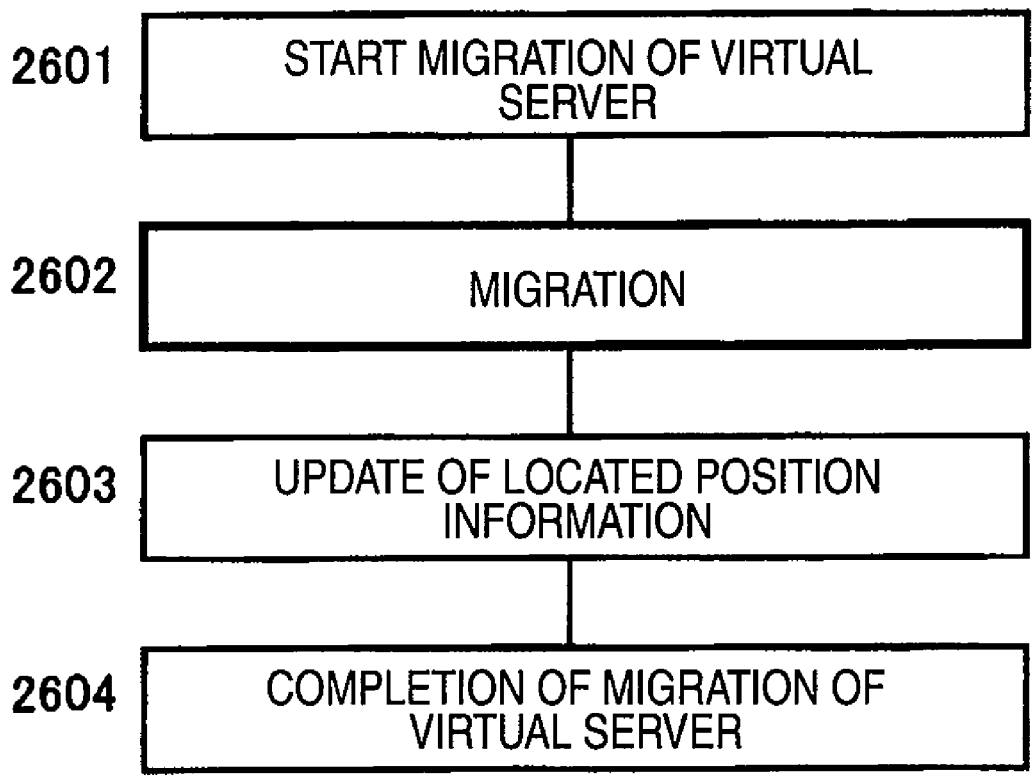
FIG. 26 is a flowchart of a virtual server migration process to be executed in the embodiment of the invention.

FIG. 26 is a flowchart of a migration process for the virtual server 601 to be executed in the embodiment of the invention.

This process is executed in step 1708 of FIG. 17.

When the migration process is started for the virtual server 601 (step 2601), the management program 135 migrates the virtual server 601 (step 2602). As described by referring to FIG. 9, for example, this migration is performed by copying an image of the memory 122.

The management program 135 then updates the management table 136 to reflect the migration of the virtual server 601 in step 2602 (step 2603). When the virtual server 601A is migrated as shown in FIG. 14, for example, in the partition management table 136A, the entries of 1611 and 1614 related to the server 120 are updated.

In FIG. 16A example, the server 120 in the partition 1_300A corresponds to the entry 1611, and the server 120 in the partition 2_300B corresponds to the entry 1614. In this case, the server 120 in the partition 2_300B used by the virtual server 601A before the migration shows the resource amount of "1". As a result of the migration in step 2602, the virtual server 601A does not use the resources of the server 120 in the partition 2_300B any more, but instead starts using the resources of the server 120 in the partition 1_300A.

As such, in step 2603, the elements for the entry 1611, i.e., the elements of "remaining resource amount 1605", "located application 1607", and "application resource amount 1608", are updated to "5", "APP1", and "5", respectively. On the other hand, the element of "remaining resource amount 1605" for the entry 1614 is updated to "10", and the elements of "located application 1607" and "application resource amount 1608" for the entry 1614 are both updated to blank.

Then in step 2603, the application management table 136B is also updated. To be specific, the element of "located server name 1623" for the "APP1" in the element of "application name 1621" is updated to "server P1".

As such, the migration process is ended for the virtual server 601 (step 2604).

FIG. 27 is a flowchart of a migration-destination partition state check process to be executed in the embodiment of the invention.

This process is executed in step 804 of FIG. 8.

When the migration-destination partition state check process is started (step 2701), the management program 135 checks the partition currently including the application 500 being a migration target (step 2702). For check as such, the application management table 136B is referred to, i.e., the elements of "located partition number 1622" to "located storage name 1625".

The management program 135 then selects the resources being a migration destination, i.e., the partition being a migration destination (step 2703).

The management program 135 then refers to the partition management table 136A, and checks the state of the storage device 100 found in the partition selected as a migration destination (hereinafter, referred to as selected storage device) (step 2704).

Based on the check result in step 2704, the management program 135 determines whether or not the application 500 is allowed for migration to the selected storage device 100, i.e., allowed for copy of the data in the logical volume 603 (step 2705).

When the determination result tells that the application 500 is allowed for migration to the selected storage device 100, the management program 135 refers to the partition management table 136A, and checks the state of the FC-SW 140 found in the partition selected as a migration destination (hereinafter, referred to as selected FC-SW) (step 2706).

Based on the check result in step 2706, the management program 135 then determines whether or not the application 500 is allowed for migration to the selected FC-SW 140, i.e., for migration of the logical path 602 (step 2707).

When the determination result tells that the application 500 is allowed for migration to the selected FC-SW 140, the management program 135 refers to the partition management table 136A, and checks the state of the server 120 found in the partition selected as a migration destination (hereinafter, referred to as selected server) (step 2708).

Based on the check result in step 2708, the management program 135 then determines whether or not the application 500 is allowed for migration to the selected server 120, i.e., for migration of the virtual server 601 (step 2709).

In step 2709, when the determination result tells that the application 500 is allowed for migration to the selected server 120, it means that the application 500 can be migrated to the partition selected as a migration destination. The management program 135 thus ends the process after forwarding a response to notify that the application is allowed for migration (step 2710). In this case, in step 805 of FIG. 8, the determination is so made that the application 500 is allowed for migration to the selected partition.

On the other hand, when the application 500 is determined as not being allowed for migration at least one of steps 2705, 2707, or 2709, it means that the application 500 cannot be migrated to the partition selected as a migration destination. The management program 135 thus ends the process after forwarding a response to notify that the application is not allowed for migration (step 2711). In this case, in step 805 of FIG. 8, the determination is so made that the application 500 is not allowed for migration to the selected partition.

Described now is a specific example of the process of FIG. 27 by taking as an example the migration of the application 500A of FIG. 14.

The management table 136 before the migration of the application 500A of FIG. 14 is as shown in FIG. 16. In this case, in step 2702, the values in the elements confirm that the application 500A is located in the partition 2_300B, i.e., "2" in the element of "located partition number 1622", "server P2" in the element of "located server name 1623", "FC-SW P2" in the element of "located FC-SW name 1624", and "storage P2" in the element of "located storage name 1625".

Then in step 2703, the element of "partition number 1601" is referred to, and the partition other than the partition 2_300B currently including the application 500A is selected as a migration destination, i.e., the partition 1_300A.

In step 2704, the element of "remaining resource amount 1605" is referred to for the entry corresponding to the storage device 100 found in the partition 1_300A, i.e., the entry 1613 in FIG. 16A example.

In step 2705, a value comparison is made between in the element of "remaining resource amount 1605" referred to in step 2704 and in the element of "storage resource amount 1628". When the value in the element of "remaining resource amount 1605" is smaller than the value in the element of "storage resource amount 1628", migrating the application 500A will cause a shortage of the resources of the partition 1_300A being a migration destination, e.g., the capacity of the storage device 100, whereby the application 500A cannot be migrated. In FIG. 16A example, the value of "10" in the element of "remaining resource amount 1605" is larger than the value of "6" in the element of "storage resource amount 1628" so that the application 500A is determined as being possible for migration.

In step 2706, the element of "remaining resource amount 1605" is referred to for the entry corresponding to the FC-SW 140 found in the partition 1_300A, i.e., the entry 1612 in FIG. 16A example.

In step 2707, a value comparison is made between in the element of "remaining resource amount 1605" referred to in step 2706 and in the element of "FC-SW resource amount 1627". When the value in the element of "remaining resource amount 1605" is smaller than the value in the element of "FC-SW resource amount 1627", migrating the application 500A will cause a shortage of the resources of the partition 1_300A being a migration destination, e.g., the port 141 of the FC-SW 140, whereby the application 500A cannot be migrated. In FIG. 16A example, the value of "10" in the element of "remaining resource amount 1605" is larger than the value of "1" in the element of "FC-SW resource amount 1627" so that the application 500A is determined as being possible for migration.

In step 2708, the element of "remaining resource amount 1605" is referred to for the entry corresponding to the server 120 found in the partition 1_300A, i.e., the entry 1611 in FIG. 16A example.

In step 2709, a value comparison is made between in the element of "remaining resource amount 1605" referred to in step 2708 and in the element of "server resource amount 1626". When the value in the element of "remaining resource amount 1605" is smaller than the value in the element of "server resource amount 1626", migrating the application 500A will cause a shortage of the resources of the partition 1_300A being a migration destination, e.g., the CPU 121 of the server 120, whereby the application 500A cannot be migrated. In FIG. 16A example, the value of "10" in the element of "remaining resource amount 1605" is larger than the value of "5" in the element of "server resource amount 1626" so that the application 500A is determined as being possible for migration.

FIGS. 28A and 28B are each a diagram illustrating the management table 136 after migration of the application 500 in the embodiment of the invention.

To be specific, FIG. 28A shows the partition management table 136A of FIG. 16A, and FIG. 28B shows the application management table 136B of FIG. 16B. The partition management table 136A and the application management table 136B are both being the update results by the processes of FIGS. 17 to 26. That is, FIGS. 28A and 28B respectively show the partition management table 136A and the application management table 136B after the application 500A is migrated as shown in FIG. 14.

The application 500A identified by the application name of "APP1" is now migrated to the partition 1_300A. Therefore, in the application management table 136B, the elements corresponding to the application name of "APP1", i.e., the elements of "located partition number 1622", "located server name 1623", "located FC-SW name 1624", and "located storage name 1625", are updated to "1", "server P1", "FC-SW P1", and "storage P1", respectively.

Then in the partition management table 136A, the element of "power supply 1606" is entirely updated to "ON" for the entries 1611 to 1613 corresponding to the partition 1_300A, and the element of "located application 1607" is entirely updated to "APP1" therefor. Moreover, the elements of "remaining resource amount 1605" and "application resource amount 1608" corresponding to the "server P1" are respectively updated to "5" and "5", the elements of "remaining resource amount 1605" and "application resource amount 1608" corresponding to the "FC-SW P1" are respectively updated to "9" and "1", and the elements of "remaining resource amount 1605" and "application resource amount 1608" corresponding to the "storage P1" are respectively updated to "4" and "6".

On the other hand, the element of "remaining resource amount 1605" for the entries 1614 to 1616 corresponding to the partition 2_300B is entirely updated to "10" to be the same as in the element of "resource amount 1604". The element of "power supply 1606" is entirely updated to "OFF", and the elements of "located application 1607" and "application resource amount 1608" are entirely updated to blank.

Figure 29:
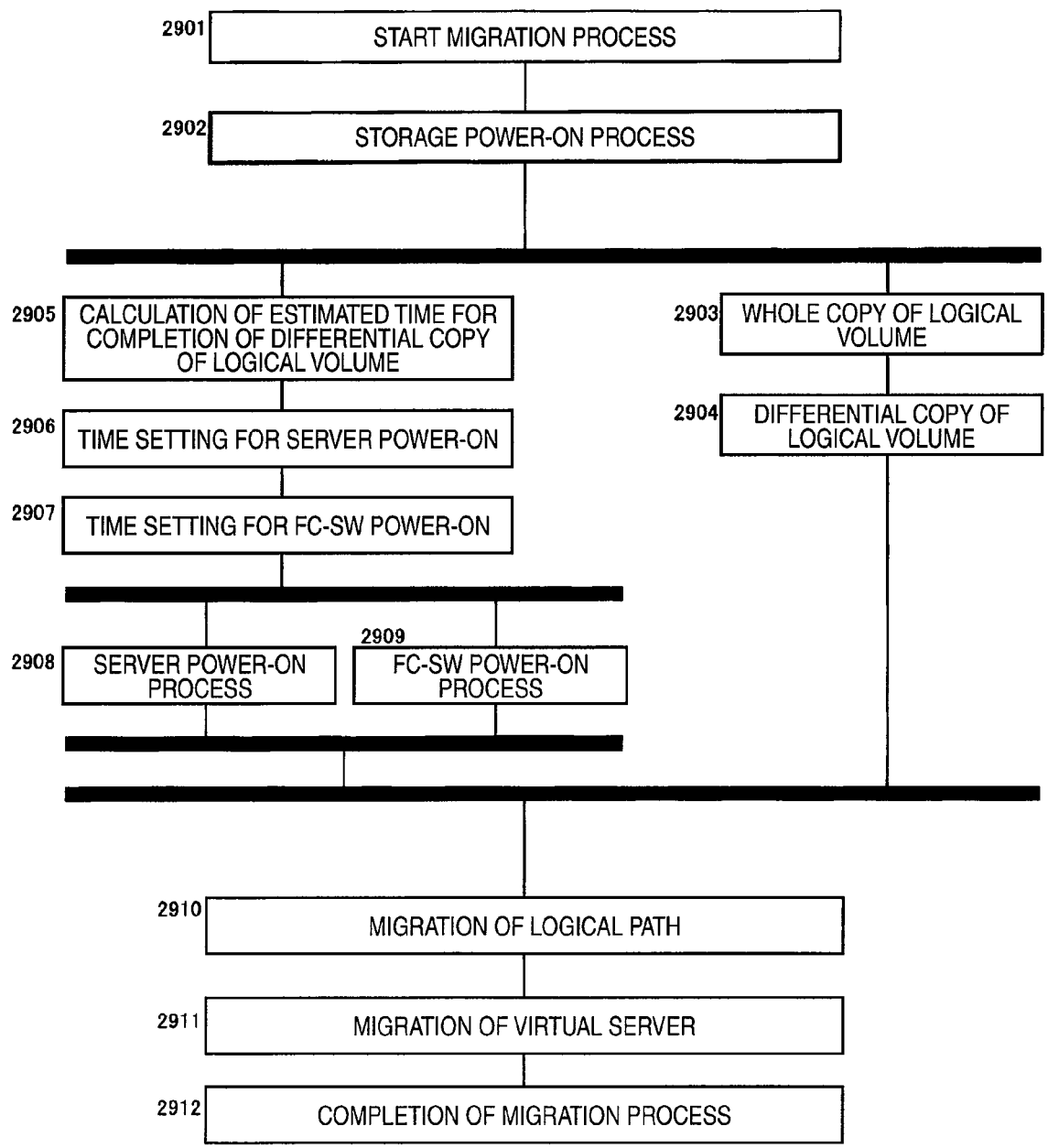
FIG. 29 is a diagram illustrating a modified example of the application migration process and that of the power supply control process to be executed in the embodiment of the invention.

FIG. 29 is a diagram illustrating a modified example of the migration process for the application 500 and the power supply control process to be executed in the embodiment of the invention.

In the process of FIG. 17 described above, the server power-ON process (step 1704) and the FC-SW power-ON process (step 1705) are both started in response to completion of the full copy process of the logical volume 603. On the other hand, in FIG. 29, the start time is calculated for both the server power-ON process and the FC-SW power-ON process.

As described by referring to FIG. 15, it is desirable to start the server power-ON process and the FC-SW power-ON process in such a manner that the various processes are to be completed at the same time, i.e., the differential copy process, the activation process for the server 120, and the activation process for the FC-SW 140, that is, in such a manner that the tips of the arrows 1503, 1504, and 1505 come at the same time. However, correctly estimating the time needed for the differential copy process is difficult, and thus in the process of FIG. 17, the end time for the full copy process is used as the time optimally approximate to start the server power-ON process and the FC-SW power-ON process.

On the other hand, in the process of FIG. 29, by approximately calculating the time needed for the differential copy process, the time is set for starting the server power-ON process and the FC-SW power-ON process.

Described now is the process of FIG. 29. The process of FIG. 29 is executed as an alternative to the process of FIG. 17, i.e., executed in step 1002 of FIG. 10.

When the migration process is started for the application 500 (step 2901), first of all, the management program 135 of the management server 130 executes the storage power-ON process (step 2902). These processes are similarly executed to the processes in steps 1701 and 1702 of FIG. 17, respectively, and thus are not described twice.

After completion of the storage power-ON process, the management program 135 executes the full copy process of the logical volume 603 (step 2903). This process is similar to the process in step 1703 of FIG. 17.

After completion of the full copy process of the logical volume 603, the management program 135 executes the differential copy process of the logical volume 603 (step 2904). This process is similar to the process in step 1706 of FIG. 17.

The management program 135 goes through steps 2905 to 2909 at the same time as steps 2903 and 2904.

To be specific, after the full copy process is started for the logical volume 603, calculated is a time when the differential copy process will be ended for the logical volume 603, i.e., estimated end time (step 2905). This process is started in response to completion of copying of a predetermined proportion of data to be copied by the full copy process, e.g., 80%, 90%, or 100%. Exemplified here is a case where the predetermined proportion is 90% in step 2905. Note here that the process in step 2905 may be executed for a plurality of times in one full copy process, e.g., at the time of completion of 80%, and at the time of completion of 90%.

The management program 135 estimates the amount of differential data at the time of completion of the full copy process, i.e., done with 100%. This estimation is made using the amount of data stored as a differential stock (hereinafter, referred to as differential data) when 90% of the copying is completed for the data to be copied by the full copy process. When an estimation is made that the differential I/O is generated at regular time intervals, the amount of differential data at the time when 90% of the full copy process is completed is divided by 0.9, i.e., multiplied by reciprocal of 0.9, thereby being able to calculate the amount of differential data at the time of completion of the full copy process. Although the interval of the differential I/O is generally not constant, the value being a result of calculation as above may be used as an approximate estimation value.

The management program 135 then calculates the time needed for copying of the differential data from the estimated value of the amount of differential data, and the transfer speed of the data transfer path for copy use. At the time of calculation as such, as the transfer speed of the data transfer path, the value being a result of actual measurement during the previous full copy process may be used.

The time calculated as such is added to the end time for the full copy process so that the estimated end time can be calculated for the differential copy process.

Herein, as described above, the end time of the full copy process for the logical volume 603 can be calculated based on the data amount of the logical volume 603, and the transfer speed of the data transfer path.

Based on the estimated end time for the differential copy process calculated as such, the management program 135 then sets the time for starting the server power-ON process and the time for starting the FC-SW power-ON process (steps 2906 and 2907).

To be specific, the management program 135 calculates the time for starting the server power-ON process by subtracting the value of time needed for the activation process of the server 120 from the estimated end time for the differential copy process. When the time comes, the server power-ON process is responsively started (step 2908). This process is similar to the process in step 1704 of FIG. 17.

The management program 135 then calculates the time for starting the FC-SW power-ON process by subtracting the value of time needed for the activation process of the FC-SW 140 from the estimated end time for the differential copy process. When the time comes, the FC-SW power-ON process is responsively started (step 2909). This process is similar to the process in step 1705 of FIG. 17.

Note here that the management program 135 stores in advance information about the time needed for the activation process of the server 120 and the time needed for the activation process of the FC-SW 140. Such time may be calculated from the specifications of the hardware resources of each of the devices, or may be values being the results of actual measurement.

After completion of steps 2904, 2908, and 2909, the management program executes the migration process for the logical path 602 (step 2901), and the migration process for the virtual server 601 (step 2911), thereby ending the migration process for the application 500 (step 2912). These steps are similar to steps 1707, 1708, and 1709 of FIG. 17.

Such estimation for the end time for the differential copy process can be made with better accuracy with the smaller degree of deviation of the differential I/O, and the smaller degree of variation of the transfer speed. If with such smaller degree of deviation and variation, the power consumption in the computer system can be reduced with good efficiency.

Note that, as described above, the process of FIG. 29 is executed as an alternative to the process of FIG. 17. The processes of FIGS. 17 and 29 are those for turning ON the server 120 and the FC-SW 140 at any approximately optimal time for reduction of power consumption in the computer system. In either process, the time approximately optimal for turning ON the server 120 and the FC-SW 140 is calculated based on the time needed for the full copy process and for the differential copy process. As such, the technical sense of the process of FIG. 17 is the same as that of the process of FIG. 29.

Figure 30A:
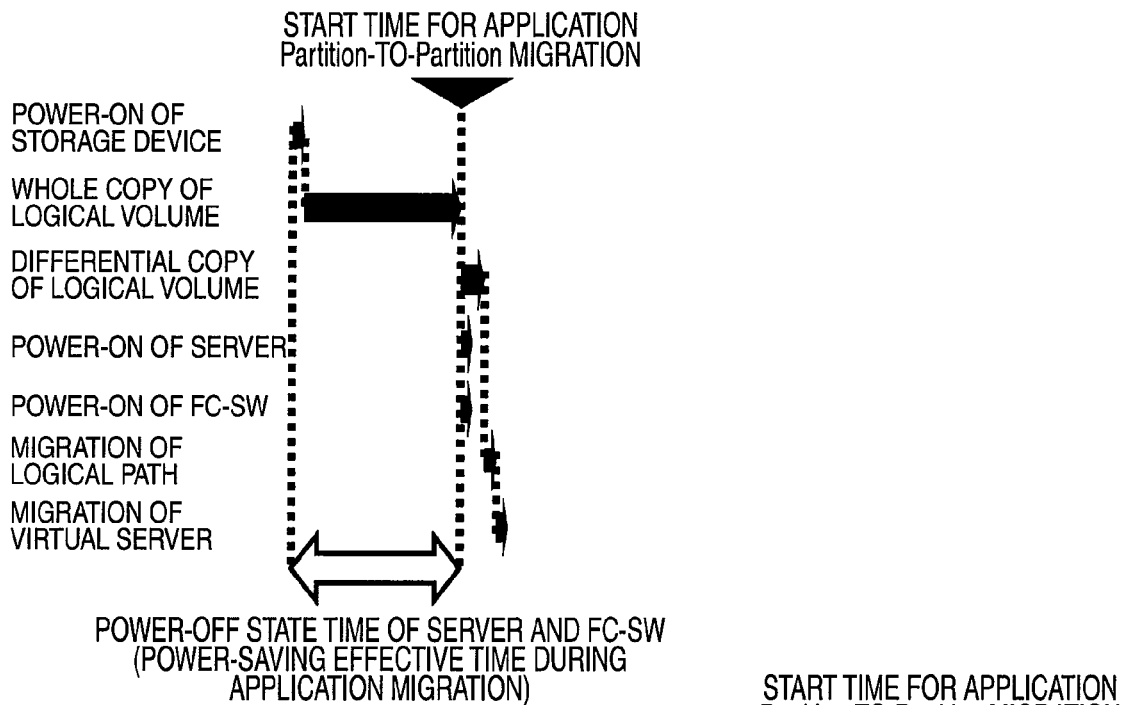
FIGS. 30A and 30B are each a diagram illustrating the relationship between the size of the computer system and effects thereby in the embodiment of the invention.
Figure 30B:
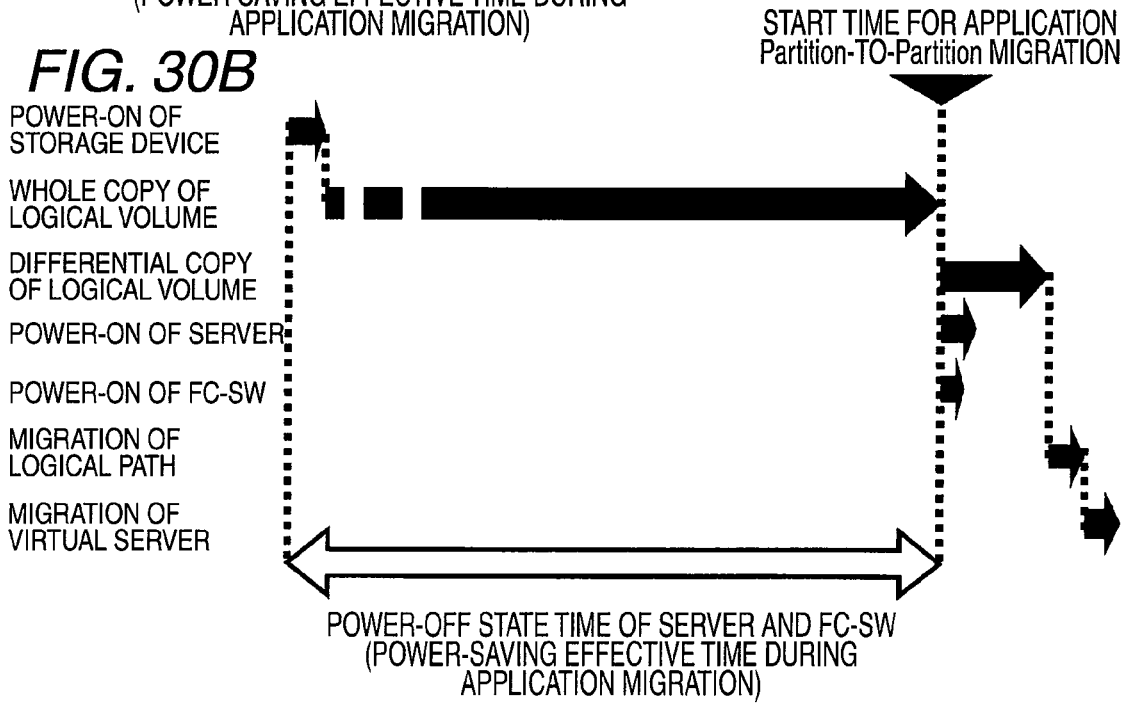

FIGS. 30A and 30B are each a diagram illustrating the relationship between the size of the computer system and the effects thereby in the embodiment of the invention.

FIG. 30A shows the application migration and the timing for power supply control in a computer system of a relatively small size, e.g., as shown in FIG. 3 or 4, the computer system including one to a few hardware resources in one physical partition, i.e., the server 120, the FC-SW 140, and the storage device 100. The details of FIG. 30A are the same as those of FIG. 15, and thus are not described twice.

FIG. 30B shows the application migration and the timing for power supply control in a computer system of a relatively large size, e.g., the computer system including several tens to several hundreds of hardware resources in one physical partition, i.e., the server 120, the FC-SW 140, and the storage device 100. Such a physical partition is used as a data center, for example. The details of FIG. 30B are also basically the same as those of FIG. 15, but generally, the larger the size of the computer system, the longer time will take to activate the devices and migrate the applications.

For example, the time needed for migration of the logical volume 603 is dependent on the amount of transferring data as described above, but generally the time is often about a few hours in a small-size system. On the other hand, with a large-size system such as data center, migrating the logical volume 603 may sometimes take a few weeks or longer.

In this embodiment, as described by referring to FIG. 15, the power-ON time for the server 120 and that for the FC-SW 140 are made later than the start time for migration of the logical volume 603 so that the end time for migration of the logical volume 603 is controlled to be almost the same as the end time for the activation process of the server 120 and that of the FC-SW 140. That is, the server 120 and the FC-SW 140 are not turned ON most of the time during the migration of the logical volume 603, e.g., time during the full copy process. As such, the effects of the embodiment are enhanced if the embodiment is applied to a large-size computer system requiring a long time to migrate the logical volume 603.

Figure 31:
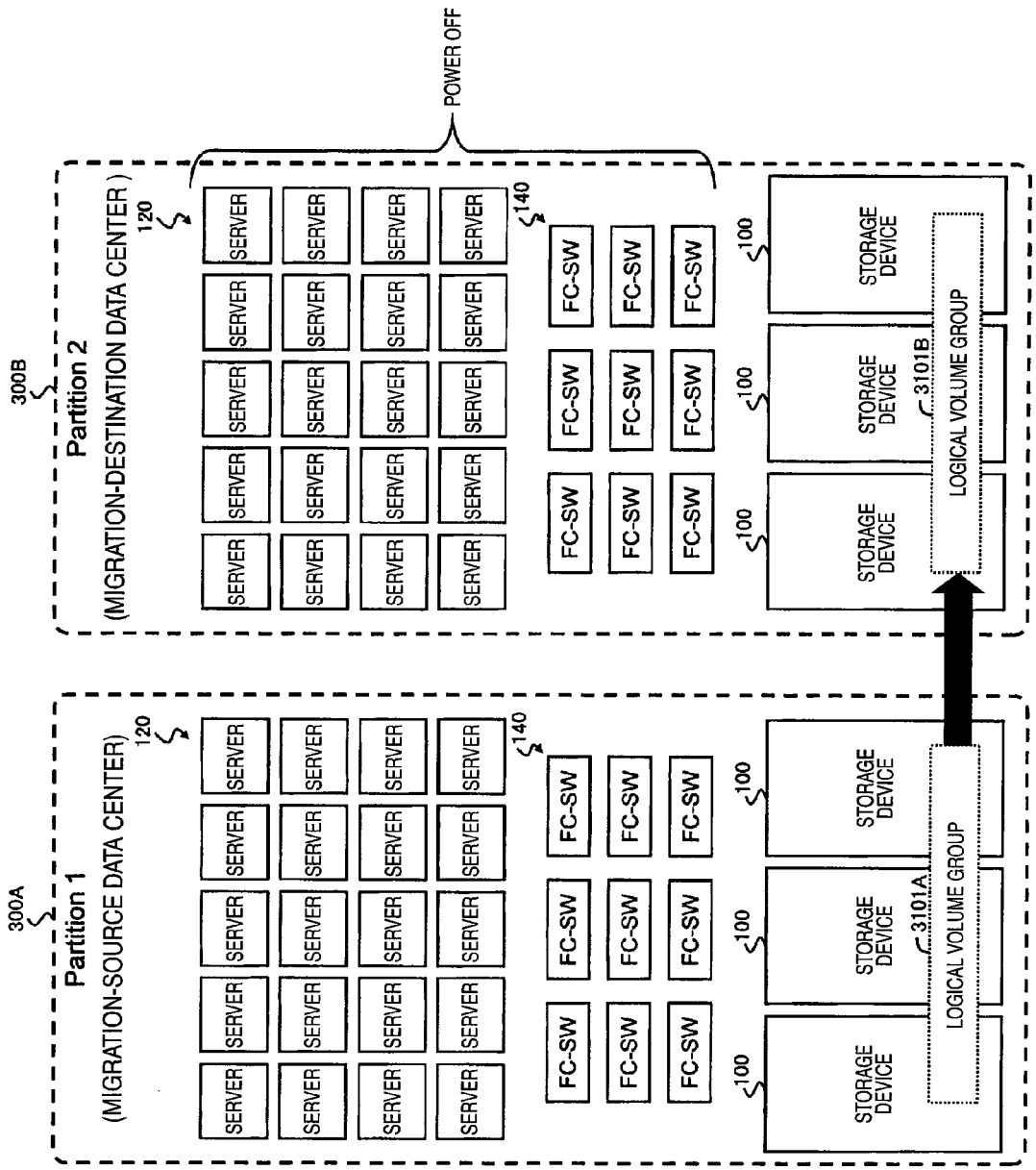
FIG. 31 is a diagram illustrating a fourth example of the physical partition in the embodiment of the invention.

FIG. 31 is a diagram illustrating a fourth example of the physical partition in the embodiment of the invention.

A physical partition of FIG. 31 is of a large size for use as a data center, for example. In FIG. 31 example, the partitions 1_300A and 2_300B respectively include 20 servers, nine FC-SWs 140, and three storage devices 100. Note here that these numbers are each just an example, and may be much larger in a larger-sized data center.

In such a computer system, for migrating the data center, the need may arise for migration of applications located in the partitions. For example, for migrating a logical volume group in an application being a migration target, i.e., a group of the logical volumes 603, 3101A to a logical volume group 3101F in the partition being a migration destination, it may take a few weeks or longer as described by referring to FIGS. 30A and 30B. By applying the embodiment to such a computer system, the server 120 and the FC-SW 140 can be favorably reduced in power consumption.

If the power ON time for the server 120 and that for the FC-SW 140 can be each delayed by a day through application of the embodiment, the server 120 and the FC-SW 140 can be reduced in power consumption of the day. As such, with the servers 120 being large in number and the FC-SWs 140 being large in number, the effects can be enhanced to a further degree.

Figure 32:
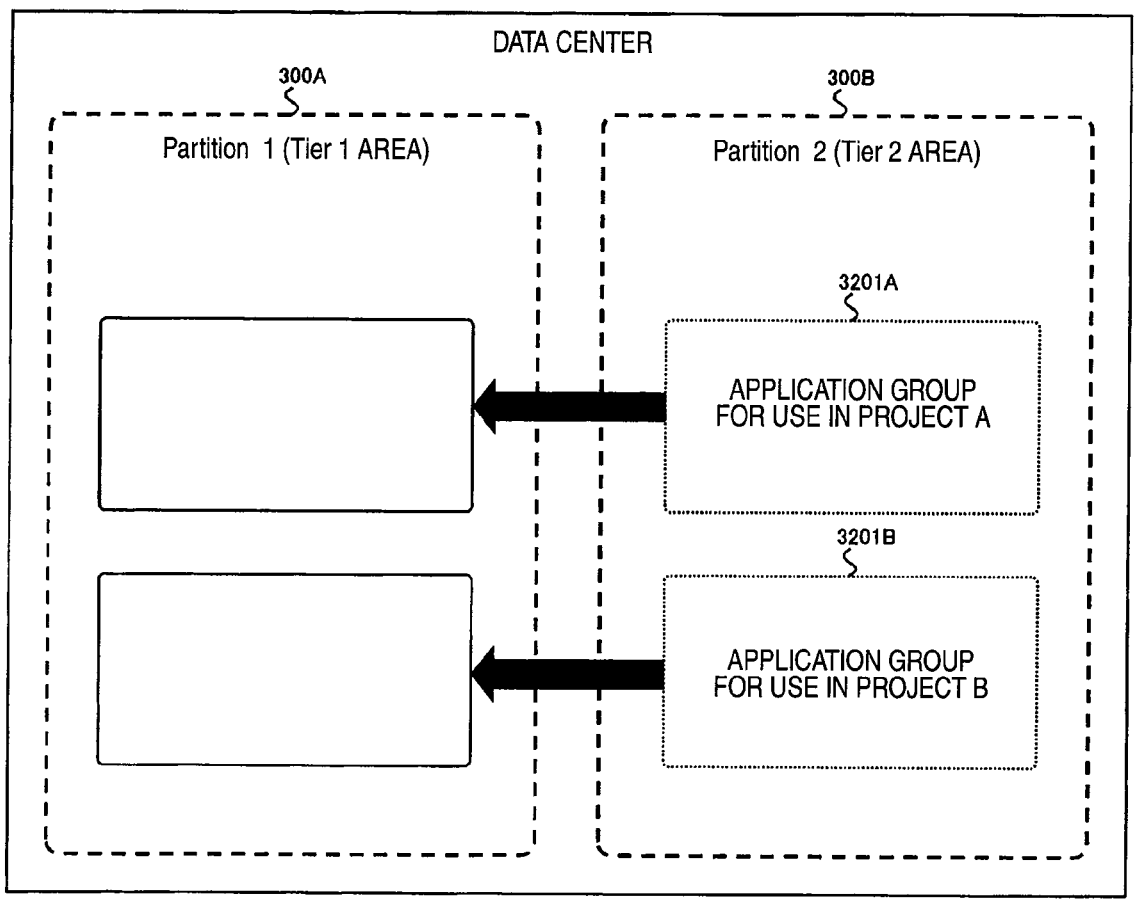
FIG. 32 is a diagram illustrating a fifth example of the physical partition in the embodiment of the invention.

FIG. 32 is a diagram illustrating a fifth example of the physical partition in the embodiment of the invention.

FIG. 32 shows an exemplary hierarchically-organized data center by partitions. In this example, the partition 1_300A is higher in hierarchy, and the partition 2_300B is lower in hierarchy. That is, the partition 1_300A has the higher processing capabilities than those of the partition 2_300B. For example, the partition 1_300A may be allocated with hardware resources of higher capabilities than those allocated to the partition 2_300B.

When an application group for use in a specific project is required to be executed in a partition higher in hierarchy, i.e., partition of higher performance capabilities, only for a specific time period, the copy process can be started in advance for the logical volume 603 in the application group so as to complete the migration of the application group by the time before the period.

In FIG. 32 example, the partition 2_300B corresponding to a lower hierarchy (Tier 2) includes an application group 3201A for use in a project A, and a application group 3201B for use in a project (or business application) B. If this is the case, in this embodiment, any migration to the partition 1_300A being a higher hierarchy (Tier 1) can be controlled if needed on an application group basis. This accordingly enables to implement migration of the application groups at any desired time while reducing the power consumption in the computer system.

What is claimed is:
1. A computer system, comprising:
one or more computers;
one or more storage devices to be connected to the one or more computers over a network; and
a management computer to be connected to the one or more computers and the one or more storage devices, wherein
the one or more computers each include, as hardware resources:
a first interface to be connected to the network;
a first processor to be connected to the first interface;
a first memory to be connected to the first processor; and
a power supply control section that controls power ON and OFF of the hardware resources in accordance with a request coming from the management computer,
the one or more computers each further include a virtualization section that provides a plurality of virtual areas based on the hardware resources thereof,
the plurality of virtual areas include first and second virtual areas,
the first virtual area operates as a virtual computer that runs an application program,
the one or more storage devices each include:
a storage medium that provides a storage area for storage of data written by any of the one or more computers;
a controller that controls data input/output to/from the storage medium; and
a second power supply control section that controls power ON and OFF of each of the one or more storage devices in accordance with a request coming from the management computer,
the controller of each of the one or more storage devices provides, to the one or more computers, the storage area of the one or more storage devices as a plurality of logical volumes,
the plurality of logical volumes include first and second logical volumes,
the first logical volume stores data written by the virtual computer,
the management computer includes:
a second interface to be connected to the one or more computers and the one or more storage devices;
a second processor to be connected to the second interface; and
a second memory to be connected to the second processor,
the management computer
transmits, to any of the one or more storage devices including the first logical volume, a request for copying the data stored in the first logical volume into the second logical volume,
the storage device including the first logical volume
stores, when receiving a request for writing data to the first logical volume from the virtual computer after receiving the request for copying the data stored in the first logical volume into the second logical volume, the data requested for writing as differential data without writing the data into the first logical volume, and
reads the data stored in the first logical volume in accordance with the request for copying the data stored in the first logical volume into the second logical volume, and transmits the data to any of the one or more storage devices including the second logical volume,
the management computer
transmits, when detecting completion of the copying of the data stored in the first logical volume into the second logical volume, a request to the storage device including the first logical volume for copying the differential data in storage into the second logical volume,
transmits, in a time interval after detecting the completion of the copying of the data stored in the first logical volume into the second logical volume but before completion of the copying of the differential data into the second logical volume, a request for turning ON any of the hardware resources of the one or more computers allocated to the second virtual area to the computer including the hardware resources allocated to the second virtual area, and
transmits, after the completion of the copying of the differential data into the second logical volume, a request for migrating the virtual computer to the second virtual area, and the virtual computer performs, after being migrated to the second virtual area, data input/output to/from the second logical volume.

2. The computer system according to claim 1, wherein
the storage device including the first logical volume transmits, after completion of the reading and the transmitting of the data in accordance with the request for copying the data stored in the first logical volume into the second logical volume, a message of completion to the management computer, and
when receiving the message of completion, the management computer detects the completion of the copying.

3. The computer system according to claim 1, wherein
the management computer calculates a time to be taken for the copying of the data stored in the first logical volume into the second logical volume based on a capacity of the first logical volume, and a data transfer speed from the first to second logical volume, and
with a lapse of the calculated time, the completion of the copying is detected.

4. The computer system according to claim 1, wherein
the network includes a plurality of switch devices for relaying data transfer between the one or more computers and the one or more storage devices,
the plurality of switch devices each include:
a plurality of ports;
a third interface to be connected to the management computer; and
a third power supply control section that controls power ON and OFF of each of the plurality of switch devices in accordance with a request coming from the management computer,
the ports are each connected to any of the one or more computers or any of the one or more storage devices,
the plurality of switch devices include first and second switch devices,
the virtual computer operating on the first virtual area performs data input/output to/from the first logical volume via the first switch device,
the management computer
transmits, in the time interval after detecting the completion of the copying of the data stored in the first logical volume into the second logical volume but before the completion of the copying of the differential data into the second logical volume, a request for turning ON the second switch device, and
transmits, after the completion of the copying of the differential data into the second logical volume, a request for changing a path for the virtual computer to perform the data input/output to/from the second logical volume via the second switch device before transmitting the request for migrating the virtual computer to the second virtual area, and
the virtual computer performs, after being migrated to the second virtual area, the data input/output to/from the second logical volume via the second switch device.

5. A computer system, comprising:
one or more computers;
one or more storage devices to be connected to the one or more computers over a network; and
a management computer to be connected to the one or more computers and the one or more storage devices, wherein
the one or more computers each include, as hardware resources:
a first interface to be connected to the network;
a first processor to be connected to the first interface;
a first memory to be connected to the first processor; and
a power supply control section that controls power ON and OFF of the hardware resources in accordance with a request coming from the management computer,
the one or more computers each further include a virtualization section that provides a plurality of virtual areas based on the hardware resources thereof,
the plurality of virtual areas include first and second virtual areas,
the first virtual area operates as a virtual computer that runs an application program,
the one or more storage devices each include:
a storage medium that provides a storage area for storage of data written by any of the one or more computers;
a controller that controls data input/output to/from the storage medium; and
a second power supply control section that controls power ON and OFF of each of the one or more storage devices in accordance with a request coming from the management computer,
the controller of each of the one or more storage devices provides, to the one or more computers, the storage area of the one or more storage devices as a plurality of logical volumes,
the plurality of logical volumes include first and second logical volumes,
the first logical volume stores data written by the virtual computer,
the management computer includes:
a second interface to be connected to the one or more computers and the one or more storage devices;
a second processor to be connected to the second interface; and
a second memory to be connected to the second processor,
the management computer
transmits, to any of the one or more storage devices including the first logical volume, a request for copying the data stored in the first logical volume into the second logical volume,
the storage device including the first logical volume
stores, when receiving a request for writing data to the first logical volume from the virtual computer after receiving the request for copying the data stored in the first logical volume into the second logical volume, the data requested for writing as differential data without writing the data into the first logical volume, and
reads the data stored in the first logical volume in accordance with the request for copying the data stored in the first logical volume into the second logical volume, and transmits the data to any of the one or more storage devices including the second logical volume,
the management computer
estimates, after completion of the copying of a predetermined proportion of the data stored in the first logical volume into the second logical volume, based on an amount of the differential data at the time of the completion of the copying of the predetermined proportion of the data, an end time of the copying of the differential data into the second logical volume at a time of completion of the copying of the data stored in the first logical volume in its entirety,
calculates a power ON time for the one or more computers to complete an activation process of the one or more computers at the estimated end time of the copying,
transmits, when the power ON time calculated for the one or more computers comes, a request for turning ON any of the hardware resources of the one or more computers allocated to the second virtual area to the computer including the hardware resources allocated to the second virtual area, transmits, when detecting completion of the copying of the data stored in the first logical volume into the second logical volume, a request to the storage device including the first logical volume for copying the differential data in storage into the second logical volume, and transmits, after completion of the copying of the differential data into the second logical volume, a request for migrating the virtual computer to the second virtual area, and the virtual computer performs, after being migrated to the second virtual area, data input/output to/from the second logical volume.

6. The computer system according to claim 5, wherein
the network includes a plurality of switch devices for relaying data transfer between the one or more computers and the one or more storage devices,
the plurality of switch devices each include:
a plurality of ports;
a third interface to be connected to the management computer; and
a third power supply control section that controls power ON and OFF of each of the plurality of switch devices in accordance with a request coming from the management computer,
the ports are each connected to any of the one or more computers or any of the one or more storage devices,
the plurality of switch devices include first and second switch devices,
the virtual computer operating on the first virtual area performs data input/output to/from the first logical volume via the first switch device,
the management computer
calculates a power ON time for the second switch device to complete an activation process of the second switch device at the estimated end time of the copying,
transmits, when the power ON time calculated for the second switch device comes, a request for turning ON the second switch device, and
transmits, after the completion of the copying of the differential data into the second logical volume, a request for changing a path for the virtual computer to perform the data input/output to/from the second logical volume via the second switch device before transmitting the request for migrating the virtual computer to the second virtual area, and
the virtual computer performs, after being migrated to the second virtual area, the data input/output to/from the second logical volume via the second switch device.

7. The computer system according to claim 6, wherein
the management computer
stores, in advance, information about a time needed for the activation process of the one or more computers, and a time needed for the activation process of the second switch device,
estimates, by multiplying the amount of the differential data at the time of the completion of the copying of the predetermined proportion of the data by a reciprocal of the predetermined proportion, the amount of the differential data at the time of the completion of the copying of the data stored in the first logical volume in its entirety,
estimates, based on the estimated amount of the differential data, and a data transfer speed from the storage device including the first logical volume to the storage device including the second logical volume, an end time of the copying of the differential data into the second logical volume at the time of the completion of the copying of the data stored in the first logical volume in its entirety,
calculates a power ON time for the one or more computers by subtracting the time needed for the activation process of the one or the more computers from the estimated end time of the copying, and
calculates a power ON time for the second switch device by subtracting the time needed for the activation process of the second switch device from the estimated end time of the copying.

8. A method for controlling a computer system including:
one or more computers;
one or more storage devices to be connected to the one or more computers over a network; and
a management computer to be connected to the one or more computers and the one or more storage devices, wherein
the one or more computers each include, as hardware resources:
a first interface to be connected to the network;
a first processor to be connected to the first interface;
a first memory to be connected to the first processor; and
a power supply control section that controls power ON and OFF of the hardware resources in accordance with a request coming from the management computer,
the one or more computers each further include a virtualization section that provides a plurality of virtual areas based on the hardware resources thereof,
the plurality of virtual areas include first and second virtual areas,
the first virtual area operates as a virtual computer that runs an application program,
the one or more storage devices each include:
a storage medium that provides a storage area for storage of data written by any of the one or more computers;
a controller that controls data input/output to/from the storage medium; and
a second power supply control section that controls power ON and OFF of each of the one or more storage devices in accordance with a request coming from the management computer,
the controller of each of the one or more storage devices provides, to the one or more computers, the storage area of the one or more storage devices as a plurality of logical volumes,
the plurality of logical volumes include first and second logical volumes,
the first logical volume stores data written by the virtual computer,
the management computer includes:
a second interface to be connected to the one or more computers and the one or more storage devices;
a second processor to be connected to the second interface; and
a second memory to be connected to the second processor,
the method comprising the steps of:
transmitting, by the management computer, to any of the one or more storage devices including the first logical volume, a request for copying the data stored in the first logical volume into the second logical volume;
storing, by the storage device including the first logical volume, when receiving a request for writing data to the first logical volume from the virtual computer after receiving the request for copying the data stored in the first logical volume into the second logical volume, the data requested for writing as differential data without writing the data into the first logical volume;

reading, by the storage device including the first logical volume, the data stored in the first logical volume in accordance with the request for copying the data stored in the first logical volume into the second logical volume, and transmitting the data to any of the one or more storage devices including the second logical volume;

transmitting, by the management computer, after detecting completion of the copying of the data stored in the first logical volume into the second logical volume, a request for copying the differential data in storage into the second logical volume to the storage device including the first logical volume;

transmitting, by the management computer, in a time interval after detecting the completion of the copying of the data stored in the first logical volume into the second logical volume but before completion of the copying of the differential data into the second logical volume, a request for turning ON any of the hardware resources of the one or more computers allocated to the second virtual area to the computer including the hardware resources allocated to the second virtual area;

transmitting, by the management computer, after the completion of the copying of the differential data into the second logical volume, a request for migrating the virtual computer to the second virtual area; and performing, by the virtual computer, after being migrated to the second virtual area, data input/output to/from the second logical volume.

9. The method according to claim 8, further comprising the step of:

transmitting, by the storage device including the first logical volume, after completion of the reading and the transmitting of the data in accordance with the request for copying the data stored in the first logical volume into the second logical volume, a message of completion to the management computer, wherein in the step of transmitting the request for copying the differential data in storage into the second logical volume, when receiving the message of completion, the completion of the copying is detected.

10. The method according to claim 8, wherein in the step of transmitting the request for copying the differential data in storage into the second logical volume, the management computer calculates a time needed for the copying of the data stored in the first logical volume into the second logical volume based on a capacity of the first logical volume, and a data transfer speed from the first to second logical volume, and with a lapse of the calculated time, the completion of the copying is detected.

11. The method according to claim 8, wherein the network includes a plurality of switch devices for relaying data transfer between the one or more computers and the one or more storage devices, the plurality of switch devices each include:

a plurality of ports;

a third interface to be connected to the management computer; and a third power supply control section that controls power ON and OFF of each of the plurality of switch devices in accordance with a request coming from the management computer, the ports are each connected to any of the one or more computers or any of the one or more storage devices, the plurality of switch devices include first and second switch devices, the virtual computer operating on the first virtual area performs data input/output to/from the first logical volume via the first switch device, and the method further includes the steps of:

transmitting, by the management computer, in the time interval after detecting the completion of the copying of the data stored in the first logical volume into the second logical volume but before the completion of the copying of the differential data into the second logical volume, a request for turning ON the second switch device;

transmitting, by the management computer, after the completion of the copying of the differential data into the second logical volume, a request for changing a path for the virtual computer to perform the data input/output to/from the second logical volume via the second switch device before transmitting the request for migrating the virtual computer to the second virtual area; and performing, by the virtual computer, after being migrated to the second virtual area, the data input/output to/from the second logical volume via the second switch device.

* * * * *